United States Patent
Fujimoto

(10) Patent No.: US 10,479,866 B1
(45) Date of Patent: Nov. 19, 2019

(54) BLOCK COPOLYMERS INCLUDING POLY(PHENYLENE) AND METHODS THEREOF

(71) Applicant: National Technology & Engineering Solutions of Sandia, LLC, Albuquerque, NM (US)

(72) Inventor: Cy Fujimoto, Albuquerque, NM (US)

(73) Assignee: National Technology & Engineering Solutions of Sandia, LLC

( * ) Notice: Subject to any disclaimer, the term of this patent is extended or adjusted under 35 U.S.C. 154(b) by 0 days.

(21) Appl. No.: 15/908,507

(22) Filed: Feb. 28, 2018

(51) Int. Cl.
| | |
|---|---|
| C08G 81/00 | (2006.01) |
| C08G 61/10 | (2006.01) |
| C08G 75/20 | (2016.01) |
| H01M 8/1032 | (2016.01) |
| H01M 8/1027 | (2016.01) |
| H01M 8/1023 | (2016.01) |
| H01M 8/1018 | (2016.01) |

(52) U.S. Cl.
CPC ............ *C08G 81/00* (2013.01); *C08G 61/10* (2013.01); *C08G 75/20* (2013.01); *H01M 8/1023* (2013.01); *H01M 8/1027* (2013.01); *H01M 8/1032* (2013.01); *C08G 2261/124* (2013.01); *C08G 2261/228* (2013.01); *C08G 2261/312* (2013.01); *C08G 2261/74* (2013.01); *C08G 2261/75* (2013.01); *H01M 2008/1095* (2013.01)

(58) Field of Classification Search
CPC .......... C08G 18/0828; C08G 2261/516; C08G 2261/1452; C08G 2261/722; H01B 1/122; H01M 8/1025
See application file for complete search history.

(56) References Cited

U.S. PATENT DOCUMENTS

| | | | |
|---|---|---|---|
| 7,022,810 B1 | 4/2006 | Cornelius | |
| 7,301,002 B1 | 11/2007 | Cornelius et al. | |
| 7,582,683 B2 | 9/2009 | Pivovar et al. | |
| 7,781,625 B2 | 8/2010 | Earle et al. | |
| 7,816,482 B1 | 10/2010 | Hibbs et al. | |
| 7,846,980 B2 | 12/2010 | Pivovar et al. | |
| 7,875,101 B2 | 1/2011 | Staiger et al. | |
| 7,888,397 B1 | 2/2011 | Hibbs et al. | |
| 8,110,636 B1* | 2/2012 | Fujimoto ............... C08F 8/36 525/471 |
| 8,227,147 B2 | 7/2012 | Kim et al. | |
| 8,492,049 B2 | 7/2013 | Kim et al. | |

(Continued)

FOREIGN PATENT DOCUMENTS

EP    1672961 B1    12/2014

OTHER PUBLICATIONS

Akiko O et al., "Electrophilic aromatic aroylation with $CF_3$-bearing arenecarboxylic acid derivatives: Reaction behavior and acidic mediator dependence," *Synth. Commun.* 2007;37:2701-15.

(Continued)

*Primary Examiner* — Shane Fang
(74) *Attorney, Agent, or Firm* — Helen S. Baca

(57) ABSTRACT

The present invention relates to polymers and copolymer including a poly(phenylene) structure, as well as a long tether. In some embodiments, the long tether facilitates a reaction between the poly(phenylene) structure and another subunit of a second polymer. In some embodiments, the tether is flexible.

10 Claims, 27 Drawing Sheets

(56) References Cited

U.S. PATENT DOCUMENTS

| | | |
|---|---|---|
| 8,530,109 B2 | 9/2013 | Kim et al. |
| 8,809,483 B1 | 8/2014 | Hibbs |
| 9,048,480 B2 | 6/2015 | Kim et al. |
| 9,051,431 B2 | 6/2015 | Kim et al. |
| 9,580,541 B1 | 2/2017 | Fujimoto et al. |
| 2006/0269498 A1 | 11/2006 | Malle et al. |
| 2009/0264544 A1 | 10/2009 | Loy |
| 2011/0237789 A1 | 9/2011 | Weber et al. |
| 2012/0225371 A1 | 9/2012 | Kim et al. |
| 2014/0024728 A1 | 1/2014 | Kim et al. |
| 2014/0356760 A1 | 12/2014 | Tanabe et al. |
| 2015/0349269 A1 | 12/2015 | Lee et al. |
| 2017/0190830 A1 | 7/2017 | Fujimoto |
| 2017/0190831 A1 | 7/2017 | Kim et al. |

OTHER PUBLICATIONS

Fujimoto C et al., "Backbone stability of quaternized polyaromatics for alkaline membrane fuel cells," *J. Membrane Sci.* 2012;(423-424):438-49.

Fujimoto C et al., "Vanadium redox flow battery efficiency and durability studies of sulfonated Diels Alder poly(phenylene)s," *Electrochem. Commun.* 2012;20:48-51.

Fujimoto CH et al., "Ionomeric poly(phenylene) prepared by Diels-Alder polymerization: Synthesis and physical properties of a novel polyelectrolyte," *Macromolecules* 2005;38:5010-6.

Hibbs MR et al., "Synthesis and characterization of poly(phenylene)-based anion exchange membranes for alkaline fuel cells," *Macromolecules* 2009;42:8316-21.

Hibbs MR, "Alkaline stability of poly(phenylene)-based anion exchange membranes with various cations," *J. Polym. Sci. B* 2013;51:1736-42.

Hickner MA et al., "Transport in sulfonated poly(phenylene)s: Proton conductivity, permeability, and the state of water," *Polymer* 2006;47:4238-44.

Jakoby K et al., "Palladium-catalyzed phosphonation of polyphenylsulfone," *Macromol. Chem. Phys* 2003;204:61-7.

Kim DS et al., "Resonance stabilized perfluorinated ionomers for alkaline membrane fuel cell," *Macromolecules* 2013;46(19):7826-33.

Kim YS et el., "Importance of polymer backbone stability of anion exchange polymer electrolytes," 227th ECs Meeting held on May 24, 2015-May 28, 2015 in Chicago, IL (MA2015-01), abstract No. 1231 (1 p.).

Lee KS et al., "An operationally flexible fuel cell based on quaternary ammonium-biphosphate ion pairs," *Nature Energy* 2016;2: art. No. 16120 (7 pp.).

Lee KS et al., "Resonance-stabilized guanidinium-tethered poly(phenylene)s," PRiME 2016/230th ECS Meeting held on Oct. 2, 2016-Oct. 7, 2016 in Honolulu, HI (MA2016-02), abstract No. 2572 (1 p.).

Li N et al., "Polymer electrolyte membranes derived from new sulfone monomers with pendent sulfonic acid groups," *Macromolecules* 2010;43:9810-20.

Lim Y et al., "Synthesis and properties of sulfonated poly(phenylene sulfone)s without ether linkage by Diels-Alder reaction for PEMFC application," *Electrochim. Acta* 2014;119:16-23.

Luo K et al., "Investigation of ionic conductivity, uptake and cation diffusion of perfluorsulfonate and sulfonated block copolymer ion exchange membrane in non-aqueous solvents," 231st ECS Meeting held on May 28, 2017-Jun. 1, 2017 in New Orleans, LA (MA2017-01), abstract No. 166 (2 pp.).

Maalouf M et al., "Factors enabling high mobility of protons and water in perfluorosulfonate membranes under low hydration conditions," *Int'l J. Hydrogen Energy* 2014;39:2795-800.

Maurya S et al., "Importance of resonance structure on alkaline stability," 231st ECS Meeting held on May 28, 2017-Jun. 1, 2017 in New Orleans, LA (MA2017-01), abstract No. 1456 (1 p.).

Merle G et al., "Anion exchange membranes for alkaline fuel cells: A review." *J. Membrane Sci.* 2011;377:1-35.

Mohanty AD et al., "Stable elastomeric anion exchange membranes based on quaternary ammonium-tethered polystyrene-b-poly(ethylene-cobutylene)-b-polystyrene triblock copolymers," *Macromolecules* 2015;48:7085-95.

Parcero E et al., "Phosphonated and sulfonated polyphenylsulfone membranes for fuel cell application," *J. Membr. Sci.* 2006;285:206-13.

Poppe D et al., "Carboxylated and sulfonated poly(arylene-co-arylene sulfone)s: thermostable polyelectrolytes for fuel cell applications," *Macromolecules* 2002;35:7936-41.

Sato H et al., "Rhodium (I) complexed with N-heterocyclic carbenes bearing a 2,3,4,5-teraphenylphenyl and its higher dendritic frameworks," *Chem. Commun.* 2007;269-71.

Shifrina ZB et al., "Branched polyphenylenes by repetitive Diels-Alder cycloaddition," *Macromolecules* 2000;33:3525-9.

Skalski TJG et al., "Structurally-defined, sulfo-phenylated, oligophenylenes and polyphenylenes," *J. Am Chem. Soc.* 2015;137(38):12223-6.

Stanis RJ et al., "Evaluation of hydrogen and methanol fuel cell performance of sulfonated Diels Alder poly(phenylene) membranes," *J. Power Sci.* 2010;195:104-10.

Sun C-N et al., "Evaluation of Diels-Alder poly(phenylene) anion exchange membrances in all-vanadium redox flox batteries," *Electrochem. Commun.* 2014;43:63-6.

Tang Z et al., "Block copolymer SDAPP membranes for vanadium redox flow batteries—strategy to address transport and durability," PRiME 2016/230th ECS Meeting held on Oct. 2, 2016-Oct. 7, 2016 in Honolulu, HI (MA2016-02), abstract No. 19 (2 pp.).

\* cited by examiner

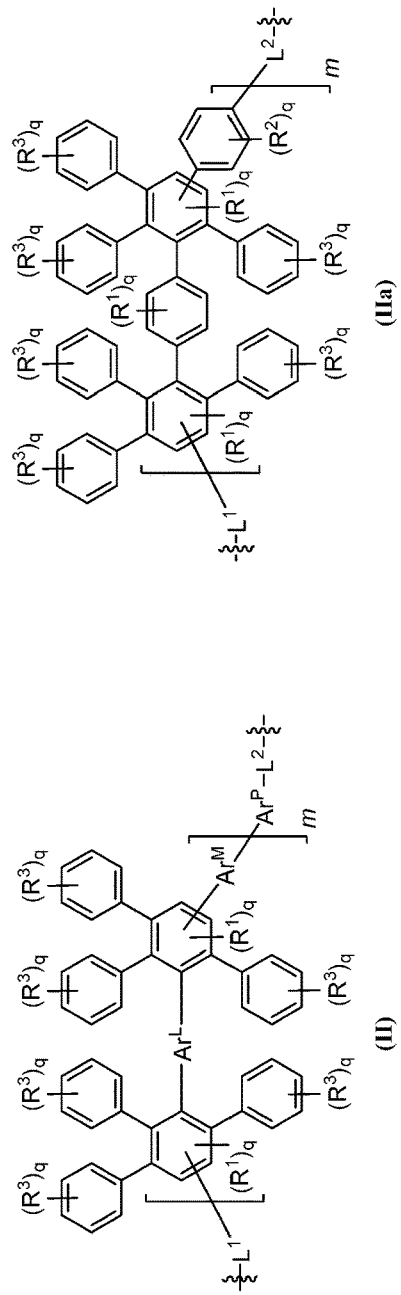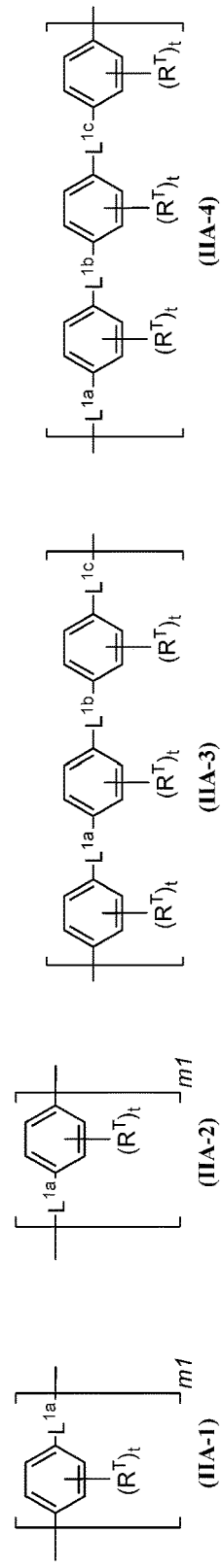
FIG. 4A
FIG. 4B

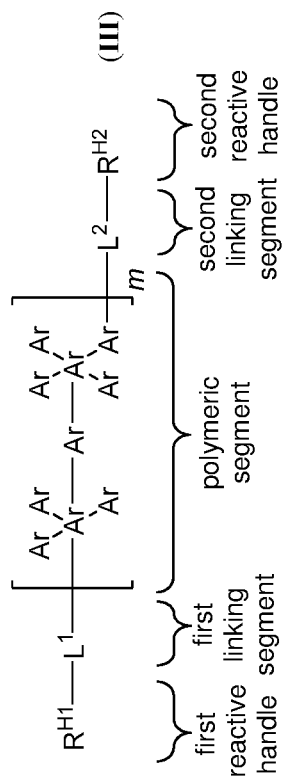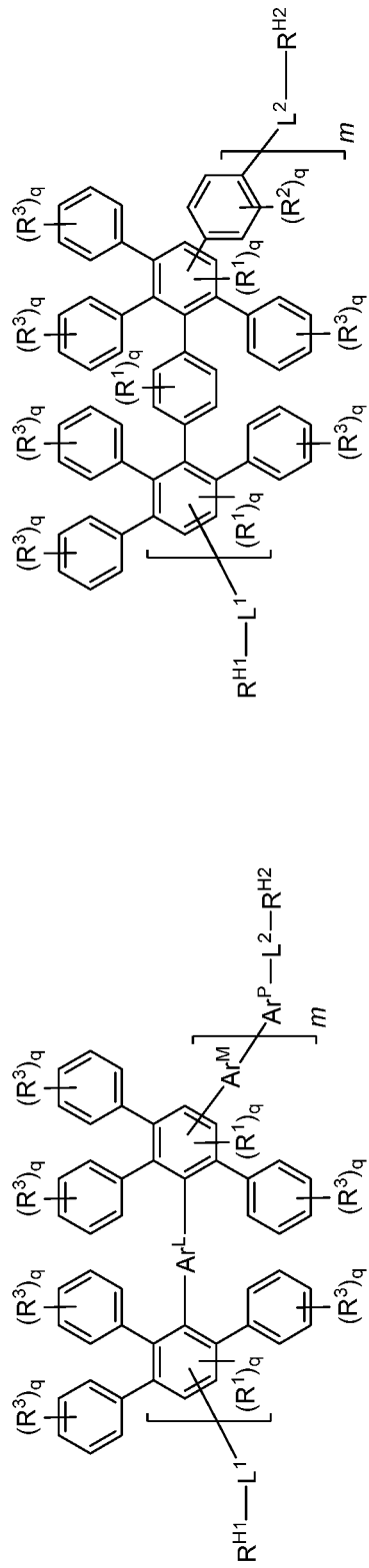
FIG. 5
FIG. 6

(III-1)

(IV)

(IVc)

(IVd)

US 10,479,866 B1

BLOCK COPOLYMERS INCLUDING POLY(PHENYLENE) AND METHODS THEREOF

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to polymers and copolymer including a poly(phenylene) structure, as well as a long tether. In some embodiments, the long tether facilitates a reaction between the poly(phenylene) structure and another subunit of a second polymer. In some embodiments, the tether is flexible. Methods and uses of such polymers are also described herein.

BACKGROUND OF THE INVENTION

Membrane separators are key components in batteries and fuel cells. Such membranes are generally formed from polymers or copolymers. Synthetic methods for producing copolymers can be limited by low reactivity between polymer subunits. Accordingly, further starting materials and methods are needed to provide such copolymers.

SUMMARY OF THE INVENTION

The present invention relates to polymer compounds and compositions having a poly(phenylene) structure with a tether that is useful to promote reactions between polymeric subunits. For instance, the tether can include a linking segment that is sufficiently flexible and long enough to promote polymerization reactions. In some embodiments, the copolymer can include different types of segments (e.g., hydrophilic, hydrophobic, fluorophilic, lipophilic, etc. segments). In particular embodiments, when the polymer includes both hydrophilic and hydrophobic segments (e.g., such as in a copolymer), the ratio of these two segments can be controlled.

Accordingly, in one aspect, the present invention features a composition (e.g., a molecule, a monomer, a polymer, an article, etc.) including the formula (Ia), having the formula (Ia), or including a structure having the formula (Ia):

substituted $C_{1-12}$ haloalkyl, optionally substituted $C_{1-12}$ perfluoroalkyl, optionally substituted $C_{1-12}$ heteroalkyl, $R^S$, $R^P$, $R^C$, or $R^F$, where $R^S$ is an acidic moiety including a sulfonyl group, $R^P$ is an acidic moiety including a phosphoryl group, $R^C$ is an acidic moiety including a carbonyl group, and $R^F$ is an electron-withdrawing moiety; each $L^{1a}$ and $L^{2a}$ is, independently, a covalent bond, carbonyl, oxy, thio, azo, phosphonoyl, phosphoryl, sulfonyl, sulfinyl, sulfonamide, imino, imine, phosphine, nitrilo, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, or optionally substituted $C_{4-18}$ aryleneoxy; each $Ar^L$, $Ar^M$, and ArP includes an optionally substituted arylene or is a covalent bond (e.g., each $Ar^L$, $Ar^M$, and $Ar^P$ is, independently, a bivalent linker including optionally substituted arylene; each q is, independently, an integer of from 1 to 5; each t is, independently, an integer of from 1 to 4; each of m1 and m2 is, independently, an integer of from 1 to 10; and m is an integer of from about 1 to 1000 (e.g., from 1 to 500).

In some embodiments, at least one of $L^{1a}$ and/or $L^{2a}$ is not a covalent bond. In other embodiments, each and every $L^{1a}$ and/or $L^{2a}$ includes carbonyl, oxy, thio, sulfonyl, sulfinyl, sulfonamide, imino, imine, phosphine, nitrilo, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, or optionally substituted $C_{4-18}$ aryleneoxy.

In further embodiments, at least one $R^1$ or $Ar^L$ in formula (Ia) includes $R^S$, $R^P$, $R^C$, or $R^F$. In some instances, q for $R^1$ is 1.

In some embodiments, each and every $R^3$ is, independently, $R^S$, $R^P$, $R^C$, or $R^F$.

In some embodiments, each $R^T$ is, independently, H, halo, optionally substituted $C_{1-12}$ alkyl, optionally substituted $C_{1-12}$ haloalkyl, optionally substituted $C_{1-12}$ perfluoroalkyl, optionally substituted $C_{1-12}$ heteroalkyl, $R^S$, $R^P$, $R^C$, or $R^F$.

In some embodiments, each of m1 and m2 is, independently, an integer of from 2 to 10 (e.g., 2 to 4, 2 to 5, 2 to 6, 2 to 7, 2 to 8, 2 to 9, 3 to 4, 3 to 5, 3 to 6, 3 to 7, 3 to 8, 3 to 9, 3 to 10, 4 to 6, 4 to 7, 4 to 8, 4 to 9, 4 to 10, 5 to 6, 5 to 7, 5 to 8, 5 to 9, 5 to 10, 6 to 7, 6 to 8, 6 to 9, 6 to 10, 7 to 8, 7 to 9, 7 to 10, 8 to 9, 8 to 10, or 9 to 10).

In some embodiments, $Ar^P$ includes a polyphenylene or a plurality of optionally substituted arylene.

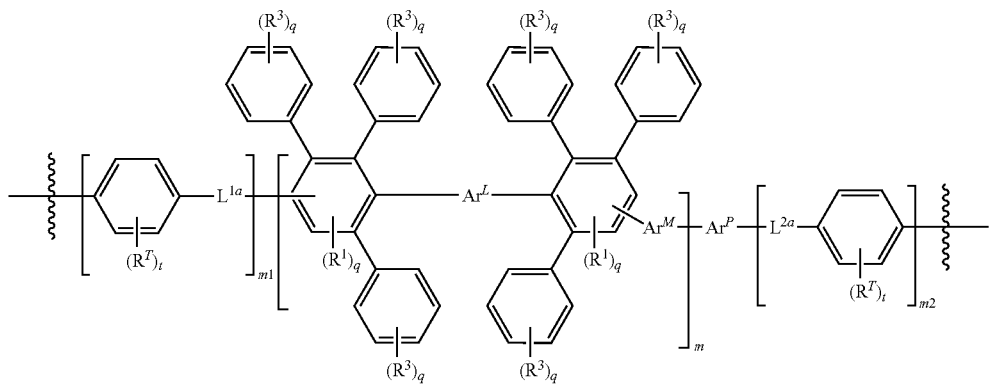

(Ia)

or a salt thereof (e.g., a cationic salt, such as a sodium salt).

In some embodiments, each $R^1$, $R^3$, and $R^T$ is, independently, H, halo, optionally substituted $C_{1-12}$ alkyl, optionally In other embodiments, $R^S$ is $-SO_2-OH$, $-SO_2-R^{S1}$, $-R^{SA}-SO_2-R^{S1}$, $-SO_2-R^{Ar}$, $-R^{SA}-SO_2-R^{Ar}$, $-SO_2NR^{N1}R^{N2}$, $-N(R^{N1})-SO_2-R^{S3}$, $-SO_2-NR^{N1}-$ $R^{S2}$, or —$SO_2$—$NR^{N1}$—$SO_2$—$R^{S3}$ (e.g., where each of $R^{S1}$, $R^{S2}$, $R^{S3}$, $R^{Ar}$, $R^{SA}$, $R^{N1}$, and $R^{N2}$ is any described herein).

In some embodiments, $R^P$ is —P(O)(OH)$_2$, —O—PO(OH)$_2$, —P(O)HR$^{P1}$, —P(O)<R$^{P1}$R$^{P2}$, —P(O)<R$^{Ar}$R$^{P2}$, —P(O)<R$^{Ar}$R$^{Ar}$, —R$^{P4}$—P(O)<R$^{P1}$R$^{P2}$, —R$^{P4}$—P(O)<R$^{Ar}$R$^{P2}$, —R$^{P4}$—P(O)<R$^{Ar}$R$^{Ar}$, —O—P(O)<R$^{P1}$R$^{P2}$, —O—P(O)<R$^{Ar}$R$^{P2}$, or —O—P(O)<R$^{Ar}$R$^{Ar}$ (e.g., where each of $R^{P1}$, $R^{P2}$, $R^{Ar}$, and $R^{P4}$ is any described herein, and where each $R^{Ar}$ can be the same or different).

In some embodiments, $R^C$ is —CO$_2$H, —C(O)—R$^{Cl}$, or —R$^{CA}$—C(O)—R$^{Cl}$ (e.g., where each of $R^{Cl}$ and $R^{CA}$ is any described herein). In some embodiments, $R^F$ is optionally substituted $C_{7-11}$ aryloyl, optionally substituted $C_{6-18}$ aryl, carboxyaldehyde, optionally substituted $C_{2-7}$ alkanoyl, optionally substituted $C_{1-12}$ alkyl, optionally substituted $C_{1-12}$ haloalkyl, optionally substituted $C_{2-7}$ alkoxycarbonyl, nitro, cyano, sulfo, carboxyl, and quaternary ammonium (e.g., any described herein). In other embodiments, $R^F$ includes or is substituted by perfluoroalkyl (e.g., $C_{1-12}$ perfluoroalkyl).

In some embodiments, the composition includes a structure having any one of formulas (Ib) to (Id), or a salt thereof. In other embodiments, the composition includes a structure having any one of formulas (Ie) to (Ih) and (I-1) to (I-6), or a salt thereof.

In a second aspect, the present invention features a composition (e.g., a molecule, a monomer, a polymer, an article, etc.) including the formula (II), having the formula (II), or including a structure having the formula (II):

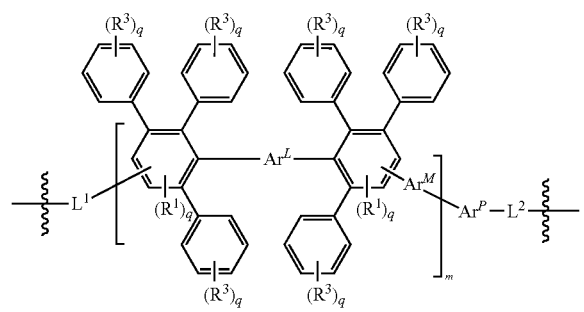

(II)

(e.g., or formula (IIa)) or a salt thereof. In some embodiments, each of $R^1$, $R^3$, $Ar^L$, $Ar^M$, $Ar^P$, q, and m is, independently, any described herein.

In some embodiments, each of $L^1$ and $L^2$ is, independently, any linking segment described herein (e.g., any herein for $L^{1a}$, $L^{2a}$, or any one of formulas (IIA-1) to (IIA-4) or (IIB-1) to (IIB-8), or a salt thereof).

In some embodiments, the composition includes the formula (IIIa) or a structure including formula (IIIa):

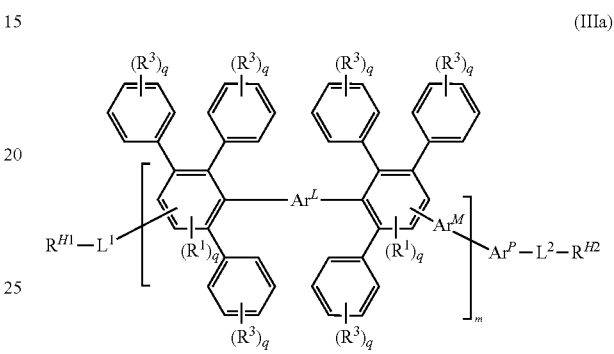

(IIIa)

or a salt thereof. In some embodiments, each of $R^1$, $R^3$, $Ar^L$, $Ar^M$, $Ar^P$, $L^1$, $L^2$, q, and m is, independently, any described herein. In other embodiments, each of $R^{H1}$ and $R^{H2}$ is, independently, a reactive end group (e.g., an anion, an optionally substituted alkoxy, a hydroxyl, or an optionally substituted amino).

In some embodiments, the composition includes a structure having any one of formulas (IIIb) to (IIIj), (III-1), or (III-2), or a salt thereof.

In a third aspect, the present invention features a composition (e.g., a molecule, a monomer, a polymer, an article, etc.) including the formula (IVa), having the formula (IVa), or including a structure having the formula (IVa):

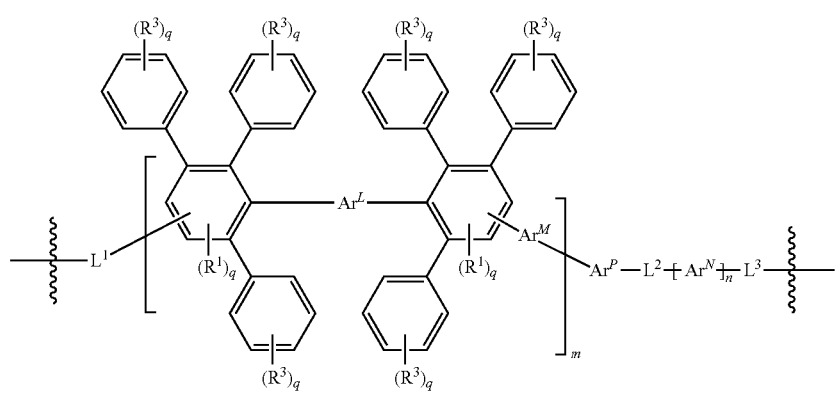

(IVa)

or a salt thereof. In some embodiments, each of $R^1$, $R^3$, $Ar^L$, $Ar^M$, $Ar^P$, $Ar^N$, $L^1$, $L^2$, $L^3$, q, m, and n is, independently, any described herein. In some embodiments, each of $Ar^L$, $Ar^M$, $Ar^P$, and $Ar^N$ includes an optionally substituted arylene.

In some embodiments, the composition includes a structure having any one of formulas (IVb) to (IVf), (IV-1) to (IV-7), or a salt thereof. In some embodiments, $R^n$ is H, halo, optionally substituted $C_{1-12}$ alkyl, optionally substituted $C_{1-12}$ alkoxy, $R^S$, $R^P$, $R^C$, or $R^F$. In other embodiments, each n1 is, independently, an integer of from 1 to 4; and each $L^{N1}$, $L^{N2}$, and $L^{N3}$ is, independently, a covalent bond, carbonyl, oxy, thio, azo, phosphonoyl, phosphoryl, sulfonyl, sulfinyl, sulfonamide, imino, imine, phosphine, nitrilo, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, or optionally substituted $C_{4-18}$ aryleneoxy.

In any embodiment herein, each $R^1$ is, independently, H, $R^S$, $R^P$, $R^C$, or $R^F$.

In any embodiment herein, each $R^2$ is, independently, H, $R^S$, $R^P$, $R^C$, $R^F$, halo, optionally substituted $C_{1-12}$ alkyl, optionally substituted $C_{1-12}$ haloalkyl, optionally substituted $C_{1-12}$ perfluoroalkyl, or a label (e.g., any described herein).

In any embodiment herein, $Ar^P$ includes a poly(phenylene), an arylene subunit subunit (e.g., including an optionally substituted phenylene, optionally substituted naphthylene, and/or optionally substituted phenanthrylene), a sulfone subunit, an arylene sulfone subunit, an ether sulfone subunit, an arylene ether subunit, a perfluoroalkyl subunit, or a perfluoroalkoxy subunit.

In any embodiment herein, $Ar^N$ includes a poly(phenylene), an arylene subunit (e.g., including an optionally substituted phenylene, optionally substituted naphthylene, and/or optionally substituted phenanthrylene), a sulfone subunit, an arylene sulfone subunit, an ether sulfone subunit, an arylene ether subunit, a perfluoroalkyl subunit, or a perfluoroalkoxy subunit.

In any embodiment herein, each of $Ar^L$, $Ar^M$, $Ar^P$, and $Ar^N$ is, independently, optionally substituted phenylene, optionally substituted naphthylene, optionally substituted phenanthrylene, a sulfone subunit, an arylene sulfone subunit, an ether sulfone subunit, an arylene ether subunit, a perfluoroalkyl subunit, a perfluoroalkoxy subunit, or any described herein (e.g., any aryl group described herein). In further embodiments, the optional substitution is $R^S$, $R^P$, $R^C$, $R^F$, or a label (e.g., fluorine or another NMR detectable label).

In any embodiment herein, any linking segment herein (e.g., each $L^{1a}$, $L^{1b}$, $L^{1c}$, $L^{2a}$, $L^{2b}$, $L^{2c}$, $L^1$, $L^2$, and $L^3$) is, independently, a covalent bond, carbonyl, oxy, thio, azo, phosphonoyl, phosphoryl, sulfonyl, sulfinyl, sulfonamide, imino, imine, phosphine, nitrilo, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, or optionally substituted $C_{4-18}$ aryleneoxy.

In any embodiment, any linking segment herein (e.g., each $L^{1a}$, $L^{1b}$, $L^{1c}$, $L^{2a}$, $L^{2b}$, $L^{2c}$, $L^1$, $L^2$, and $L^3$) is, independently, any one of formulas (IIA-1), (IIA-2), (IIA-3), or (IIA-4), or a salt thereof. In some embodiments, each $R^T$ is, independently, H, halo, optionally substituted $C_{1-12}$ alkyl, optionally substituted $C_{1-12}$ haloalkyl, optionally substituted $C_{1-12}$ perfluoroalkyl, optionally substituted $C_{1-12}$ heteroalkyl, $R^S$, $R^P$, $R^C$, or $R^F$. In other embodiments, each t is, independently, an integer of from 1 to 4. In yet other embodiments, each $L^{1a}$, $L^{1b}$, $L^{1c}$, $L^{2a}$, $L^{2b}$, and $L^{2c}$ is, independently, a covalent bond, carbonyl, oxy, thio, azo, phosphonoyl, phosphoryl, sulfonyl, sulfinyl, sulfonamide, imino, imine, phosphine, nitrilo, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, or optionally substituted $C_{4-18}$ aryleneoxy. In some embodiments, each m1 is, independently, an integer of from 1 to 10; $Ar^P$ includes an optionally substituted arylene; and/or at least one of $L^{1a}$ a and/or $L^{2a}$ is not a covalent bond.

In any embodiment, any linking segment herein (e.g., each $L^{1a}$, $L^{1b}$, $L^{1c}$, $L^{2a}$, $L^{2b}$, $L^{2c}$, $L^1$, $L^2$, and $L^3$) is, independently, any one of formulas (IIB-1), (IIB-2), (IIB-3), (IIB-4), (IIB-5), (IIB-6), (IIB-7), or (IIB-8), or a salt thereof. In some embodiments, each $R^T$ is, independently, H, halo, optionally substituted $C_{1-12}$ alkyl, optionally substituted $C_{1-12}$ haloalkyl, optionally substituted $C_{1-12}$ perfluoroalkyl, optionally substituted $C_{1-12}$ heteroalkyl, $R^S$, $R^P$, $R^C$, or $R^F$. In other embodiments, each t is, independently, an integer of from 1 to 4. In yet other embodiments, each $L^{1a}$, $L^{1b}$, $L^{1c}$, $L^{2a}$, $L^{2b}$, and $L^{2c}$ is, independently, a covalent bond, carbonyl, oxy, thio, azo, phosphonoyl, phosphoryl, sulfonyl, sulfinyl, sulfonamide, imino, imine, phosphine, nitrilo, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, or optionally substituted $C_{4-18}$ aryleneoxy or a salt thereof. In some embodiments, each m2 is, independently, an integer of from 1 to 10; $Ar^P$ includes an optionally substituted arylene; and/or at least one of $L^{1a}$ and/or $L^{2a}$ is not a covalent bond.

In any embodiment herein, m is less than n.

In any embodiment herein, each of $R^{H1}$ or $R^{H2}$ is a reactive handle. In some embodiments, each of $R^{H1}$ or $R^{H2}$ is, independently, H, optionally substituted alkyl (e.g., $C_{1-12}$ alkyl), optionally substituted haloalkyl (e.g., $C_{1-12}$ haloalkyl), optionally substituted perfluoroalkyl (e.g., $C_{1-12}$ perfluoroalkyl), optionally substituted heteroalkyl (e.g., $C_{1-12}$ heteroalkyl), halo, optionally substituted aryl (e.g., $C_{4-18}$ aryl), optionally substituted alkaryl (e.g., $C_{1-12}$ alk-$C_{4-18}$ aryl or $C_{1-6}$ alk-$C_{4-18}$ aryl), optionally substituted arylalkoxy (e.g., $C_{4-18}$ aryl-$C_{1-12}$ alkoxy or $C_{4-18}$ aryl-$C_{1-6}$ alkoxy), optionally substituted aryloxy (e.g., $C_{4-18}$ aryloxy), optionally substituted aryloxycarbonyl (e.g., $C_{5-19}$ aryloxycarbonyl), optionally substituted aryloyl (e.g., $C_{7-11}$ aryloyl or $C_{5-19}$ aryloyl), optionally substituted arylcarbonylalkyl (e.g., $C_{4-18}$ arylcarbonyl-$C_{1-12}$ alkyl or $C_{4-18}$ arylcarbonyl-$C_{1-6}$ alkyl), optionally substituted arylsulfonyl (e.g., $C_{4-18}$ arylsulfoyl), or optionally substituted arylsulfonylalkyl (e.g., $C_{4-18}$ arylsulfonyl-$C_{1-12}$ alkyl or $C_{4-18}$ arylsulfonyl-$C_{1-6}$ alkyl). In other embodiments, each of $R^{H1}$ or $R^{H2}$ is —$L^H$—$Ar^H$ or —$L^H$—$Ak^H$ (e.g., $Ar^H$ is an optionally substituted aryl (e.g., substituted with one or more substituents selected from the group of halo, cyano, optionally substituted haloalkyl, optionally substituted perfluoroalkyl, optionally substituted nitroalkyl, and optionally substituted alkyl); $Ak^H$ is an optionally substituted alkyl or optionally substituted heteroalkyl (e.g., substituted with one or more substituents selected from the group of halo, cyano, optionally substituted haloalkyl, optionally substituted perfluoroalkyl, optionally substituted nitroalkyl, and optionally substituted alkyl); and $L^H$ is a linker, such as any described herein for $L^1$).

In any embodiment herein, the composition (e.g., any described herein) is present in a polymeric membrane.

In any embodiment herein, the composition (e.g., any described herein) is present in a copolymer.

Definitions

As used herein, the term "about" means +/−10% of any recited value. As used herein, this term modifies any recited value, range of values, or endpoints of one or more ranges.

The term "acyl," or "alkanoyl," as used interchangeably herein, represent an alkyl group, as defined herein, or hydrogen attached to the parent molecular group through a carbonyl group, as defined herein. This group is exemplified by formyl, acetyl, propionyl, butanoyl, and the like. The alkanoyl group can be substituted or unsubstituted. For example, the alkanoyl group can be substituted with one or more substitution groups, as described herein for alkyl. In some embodiments, the unsubstituted acyl group is a $C_{2-7}$ acyl or alkanoyl group.

By "alkaryl" is meant an aryl group, as defined herein, attached to the parent molecular group through an alkylene group, as defined herein. Similarly, by the term "alkheteroaryl" is meant a heteroaryl group, as defined herein, attached to the parent molecular group through an alkylene group. Other groups preceded by the prefix "alk-" are defined in the same manner. The alkaryl group can be substituted or unsubstituted. For example, the alkaryl group can be substituted with one or more substitution groups, as described herein for alkyl and/or aryl. Exemplary unsubstituted alkaryl groups are of from 7 to 16 carbons ($C_{7-16}$ alkaryl), as well as those having an alkylene group with 1 to 6 carbons and an aryl group with 4 to 18 carbons (i.e., $C_{1-6}$ alk-$C_{4-18}$ aryl).

By "alkcycloalkyl" is meant a cycloalkyl group, as defined herein, attached to the parent molecular group through an alkylene group, as defined herein. The alkcycloalkyl group can be substituted or unsubstituted. For example, the alkcycloalkyl group can be substituted with one or more substitution groups, as described herein for alkyl.

By "alkenyl" is meant an optionally substituted $C_{2-24}$ alkyl group having one or more double bonds. The alkenyl group can be cyclic (e.g., $C_{3-24}$ cycloalkenyl) or acyclic. The alkenyl group can also be substituted or unsubstituted. For example, the alkenyl group can be substituted with one or more substitution groups, as described herein for alkyl.

By "alkheterocyclyl" represents a heterocyclyl group, as defined herein, attached to the parent molecular group through an alkylene group, as defined herein. Exemplary unsubstituted alkheterocyclyl groups are of from 2 to 14 carbons.

By "alkoxy" is meant —OR, where R is an optionally substituted alkyl group, as described herein. Exemplary alkoxy groups include methoxy, ethoxy, butoxy, trihaloalkoxy, such as trifluoromethoxy, etc. The alkoxy group can be substituted or unsubstituted. For example, the alkoxy group can be substituted with one or more substitution groups, as described herein for alkyl. Exemplary unsubstituted alkoxy groups include $C_{1-3}$, $C_{1-6}$, $C_{1-12}$, $C_{1-16}$, $C_{1-18}$, $C_{1-20}$, or $C_{1-24}$ alkoxy groups.

By "alkoxyalkyl" is meant an alkyl group, as defined herein, which is substituted with an alkoxy group, as defined herein. Exemplary unsubstituted alkoxyalkyl groups include between 2 to 12 carbons ($C_{2-12}$ alkoxyalkyl), as well as those having an alkyl group with 1 to 6 carbons and an alkoxy group with 1 to 6 carbons (i.e., $C_{1-6}$ alkoxy-$C_{1-6}$ alkyl).

By "alkoxycarbonyl" is meant an alkoxy group, as defined herein, that is attached to the parent molecular group through a carbonyl group. In some embodiments, an unsubstituted alkoxycarbonyl group is a $C_{2-7}$ alkoxycarbonyl group.

By "alkyl" and the prefix "alk" is meant a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic (e.g., $C_{3-24}$ cycloalkyl) or acyclic. The alkyl group can be branched or unbranched. The alkyl group can also be substituted or unsubstituted. For example, the alkyl group can be substituted with one, two, three or, in the case of alkyl groups of two carbons or more, four substituents independently selected from the group consisting of: (1) $C_{1-6}$ alkoxy; (2) $C_{1-6}$ alkylsulfinyl; (3) $C_{1-6}$ alkylsulfonyl; (4) amino; (5) aryl; (6) arylalkoxy; (7) aryloyl; (8) azido; (9) cyano;

(10) carboxyaldehyde; (11) $C_{3-8}$ cycloalkyl; (12) halo; (13) heterocyclyl; (14) heterocyclyloxy; (15) heterocyclyloyl; (16) hydroxyl; (17) N-protected amino; (18) nitro; (19) oxo; (20) $C_{3-8}$ spirocyclyl; (21) $C_{1-6}$ thioalkoxy; (22) thiol; (23) —$CO_2R^A$, where $R^A$ is selected from the group consisting of (a) hydrogen, (b) $C_{1-6}$ alkyl, (c) $C_{4-18}$ aryl, and (d) $C_{1-6}$ alk-$C_{4-18}$ aryl; (24) —$C(O)NR^BR^C$, where each of $R^B$ and $R^C$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; (25) —$SO_2R^D$, where $R^D$ is selected from the group consisting of (a) $C_{1-6}$ alkyl, (b) $C_{4-18}$ aryl, and (c) $C_{1-6}$ alk-$C_{4-18}$ aryl; (26) —$SO_2NR^ER^F$, where each of $R^E$ and $R^F$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; and (27) —$NR^GR^H$, where each of $R^G$ and $R^H$ is, independently, selected from the group consisting of (a) hydrogen, (b) an N-protecting group, (c) $C_{1-6}$ alkyl, (d) $C_{2-6}$ alkenyl, (e) $C_{2-6}$ alkynyl, (f) $C_{4-18}$ aryl, (g) $C_{1-6}$ alk-$C_{4-18}$ aryl, (h) $C_{3-8}$ cycloalkyl, and (i) $C_{1-6}$ alk-$C_{3-8}$ cycloalkyl, wherein in one embodiment no two groups are bound to the nitrogen atom through a carbonyl group or a sulfonyl group. The alkyl group can be a primary, secondary, or tertiary alkyl group substituted with one or more substituents (e.g., one or more halo or alkoxy). In some embodiments, the unsubstituted alkyl group is a $C_{1-3}$, $C_{1-6}$, $C_{1-12}$, $C_{1-16}$, $C_{1-18}$, $C_{1-20}$, or $C_{1-24}$ alkyl group.

By "alkylene" is meant a bivalent form of an alkyl group, as described herein. Exemplary alkylene groups include methylene, ethylene, propylene, butylene, etc. In some embodiments, the alkylene group is a $C_{1-3}$, $C_{1-6}$, $C_{1-12}$, $C_{1-16}$, $C_{1-18}$, $C_{1-20}$, $C_{1-24}$, $C_{2-3}$, $C_{2-6}$, $C_{2-12}$, $C_{2-16}$, $C_{2-18}$, $C_{2-20}$, or $C_{2-24}$ alkylene group. The alkylene group can be branched or unbranched. The alkylene group can also be substituted or unsubstituted. For example, the alkylene group can be substituted with one or more substitution groups, as described herein for alkyl.

By "alkyleneoxy" is meant an alkylene group, as defined herein, attached to the parent molecular group through an oxygen atom.

By "alkylsulfate" is meant an alkyl group, as defined herein, attached to the parent molecular group through an —O-($SO_2$)— group. An exemplary alkylsulfate group is —O—$SO_2$—Ak, where each Ak is, independently, optionally substituted alkyl.

By "alkylsulfinyl" is meant an alkyl group, as defined herein, attached to the parent molecular group through an —S(O)— group. In some embodiments, the unsubstituted alkylsulfinyl group is a $C_{1-6}$ or $C_{1-12}$ alkylsulfinyl group.

By "alkylsulfinylalkyl" is meant an alkyl group, as defined herein, substituted by an alkylsulfinyl group. In some embodiments, the unsubstituted alkylsulfinylalkyl group is a $C_{2-12}$ or $C_{2-24}$ alkylsulfinylalkyl group (e.g., $C_{1-6}$ alkylsulfinyl-$C_{1-6}$ alkyl or $C_{1-12}$ alkylsulfinyl-$C_{1-12}$ alkyl).

By "alkylsulfonyl" is meant an alkyl group, as defined herein, attached to the parent molecular group through an —$SO_2$— group. In some embodiments, the unsubstituted alkylsulfonyl group is a $C_{1-6}$ or $C_{1-12}$ alkylsulfonyl group. In other embodiments, the alkylsulfonyl group is —$SO_2$—$R^{S1}$, where $R^{S1}$ is an optionally substituted $C_{1-12}$ alkyl (e.g., as described herein, including optionally substituted $C_{1-12}$ haloalkyl or perfluoroalkyl).

By "alkylsulfonylalkyl" is meant an alkyl group, as defined herein, substituted by an alkylsulfonyl group. In some embodiments, the unsubstituted alkylsulfonylalkyl group is a $C_{2-12}$ or $C_{2-24}$ alkylsulfonylalkyl group (e.g., $C_{1-6}$ alkylsulfonyl-$C_{1-6}$ alkyl or $C_{1-12}$ alkylsulfonyl-$C_{1-12}$ alkyl).

By "alkylsulfonylamide" is meant an amino group, as defined herein, substituted by an alkylsulfonyl group. In some embodiments, the unsubstituted alkylsulfonylamide group is —$NR^{N1}R^{N2}$, in which each of $R^{N1}$ and $R^{N2}$ is, independently, H, $C_{1-12}$ alkyl, or $C_{1-24}$ alkylsulfonyl group (e.g., $C_{1-6}$ alkylsulfonyl or $C_{1-12}$ alkylsulfonyl), where at least one of $R^{N1}$ and $R^{N2}$ includes a sulfonyl group. An exemplary alkylsulfonylamide group is —N—$(SO_2$—Ak$)_2$ or —N(Ak)($SO_2$—Ak), where each Ak is, independently, optionally substituted alkyl.

By "alkynyl" is meant an optionally substituted $C_{2-24}$ alkyl group having one or more triple bonds. The alkynyl group can be cyclic or acyclic and is exemplified by ethynyl, 1-propynyl, and the like. The alkynyl group can also be substituted or unsubstituted. For example, the alkynyl group can be substituted with one or more substitution groups, as described herein for alkyl.

By "amidino" is meant —$C(NR^{N3})NR^{N1}R^{N2}$, where each of $R^{N1}$, $R^{N2}$, and $R^{N3}$ is, independently, H or optionally substituted alkyl, or $R^{N1}$ and $R^{N2}$, taken together with the nitrogen atom to which each are attached, form a heterocyclyl group, as defined herein.

By "amido" is meant —$C(O)NR^{N1}R^{N2}$, where each of $R^{N1}$ and $R^{N2}$ is, independently, H or optionally substituted alkyl, or $R^{N1}$ and $R^{N2}$, taken together with the nitrogen atom to which each are attached, form a heterocyclyl group, as defined herein.

By "amino" is meant —$NR^{N1}R^{N2}$, where each of $R^{N1}$ and $R^{N2}$ is, independently, H or optionally substituted alkyl, or $R^{N1}$ and $R^{N2}$, taken together with the nitrogen atom to which each are attached, form a heterocyclyl group, as defined herein.

By "aminoalkyl" is meant an alkyl group, as defined herein, substituted by an amino group, as defined herein.

By "aryl" is meant a group that contains any carbon-based aromatic group including, but not limited to, benzyl, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one, two, three, four, or five substituents independently selected from the group consisting of: (1) $C_{1-6}$ alkanoyl; (2) $C_{1-6}$ alkyl; (3) $C_{1-6}$ alkoxy; (4) $C_{1-6}$ alkoxy-$C_{1-6}$ alkyl; (5) $C_{1-6}$ alkylsulfinyl; (6) $C_{1-6}$ alkylsulfinyl-$C_{1-6}$ alkyl; (7) $C_{1-6}$ alkylsulfonyl; (8) $C_{1-6}$ alkylsulfonyl-$C_{1-6}$ alkyl; (9) aryl; (10) amino; (11) $C_{1-6}$ aminoalkyl; (12) heteroaryl; (13) $C_{1-6}$ alk-$C_{4-18}$ aryl; (14) aryloyl; (15) azido; (16) cyano; (17) $C_{1-6}$ azidoalkyl; (18) carboxyaldehyde; (19) carboxyaldehyde-$C_{1-6}$ alkyl; (20) $C_{3-8}$ cycloalkyl; (21) $C_{1-6}$ alk-$C_{3-8}$ cycloalkyl; (22) halo; (23) $C_{1-6}$ haloalkyl; (24) heterocyclyl; (25) heterocyclyloxy; (26) heterocyclyloyl; (27) hydroxyl; (28) $C_{1-6}$ hydroxyalkyl; (29) nitro; (30) $C_{1-6}$ nitroalkyl; (31) N-protected amino; (32) N-protected amino-$C_{1-6}$ alkyl; (33) oxo; (34) $C_{1-6}$ thioalkoxy; (35) thio-$C_{1-6}$ alkoxy-$C_{1-6}$ alkyl; (36) —$(CH_2)_rCO_2R^A$, where r is an integer of from zero to four, and $R^A$ is selected from the group consisting of (a) hydrogen, (b) $C_{1-6}$ alkyl, (c) $C_{4-18}$ aryl, and (d) $C_{1-6}$ alk-$C_{4-18}$ aryl; (37) —$(CH_2)_rCONR^BR^C$, where r is an integer of from zero to four and where each $R^B$ and $R^c$ is independently selected from the group consisting of (a) hydrogen, (b) $C_{1-6}$ alkyl, (c) $C_{4-18}$ aryl, and (d) $C_{1-6}$ alk-$C_{4-18}$ aryl; (38) —$(CH_2)_rSO_2R^D$, where r is an integer of from zero to four and where $R^D$ is selected from the group consisting of (a) $C_{1-6}$ alkyl, (b) $C_{4-18}$ aryl, and (c) $C_{1-6}$ alk-$C_{4-18}$ aryl; (39) —$(CH_2)_rSO_2NR^ER^F$, where r is an integer of from zero to four and where each of $R^E$ and $R^F$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; (40) —$(CH_2)_rNR^GR^H$, where r is an integer of from zero to four and where each of $R^G$ and $R^H$ is, independently, selected from the group consisting of (a) hydrogen, (b) an N-protecting group, (c) $C_{1-6}$ alkyl, (d) $C_{2-6}$ alkenyl, (e) $C_{2-6}$ alkynyl, (f) $C_{4-18}$ aryl, (g) $C_{1-6}$ alk-$C_{4-18}$ aryl, (h) $C_{3-8}$ cycloalkyl, and (i) $C_{1-6}$ alk-$C_{3-8}$ cycloalkyl, wherein in one embodiment no two groups are bound to the nitrogen atom through a carbonyl group or a sulfonyl group; (41) thiol; (42) perfluoroalkyl; (43) perfluoroalkoxy; (44) aryloxy; (45) cycloalkoxy; (46) cycloalkylalkoxy; and (47) arylalkoxy. In particular embodiments, an unsubstituted aryl group is a $C_{4-18}$, $C_{4-14}$, $C_{4-12}$, $C_{4-10}$, $C_{6-18}$, $C_{6-14}$, $C_{6-12}$, or $C_{6-10}$ aryl group.

By "arylene" is meant a bivalent form of an aryl group, as described herein. Exemplary arylene groups include phenylene, naphthylene, biphenylene, triphenylene, diphenyl ether, acenaphthenylene, anthrylene, or phenanthrylene. In some embodiments, the arylene group is a $C_{4-18}$, $C_{4-14}$, $C_{4-12}$, $C_{4-10}$, $C_{6-18}$, $C_{6-14}$, $C_{6-12}$, or $C_{6-10}$ arylene group. The arylene group can be branched or unbranched. The arylene group can also be substituted or unsubstituted. For example, the arylene group can be substituted with one or more substitution groups, as described herein for aryl.

By "aryleneoxy" is meant an arylene group, as defined herein, attached to the parent molecular group through an oxygen atom.

By "arylalkoxy" is meant an alkaryl group, as defined herein, attached to the parent molecular group through an oxygen atom.

By "aryloxy" is meant —OR, where R is an optionally substituted aryl group, as described herein. In some embodiments, an unsubstituted aryloxy group is a $C_{4-18}$ or $C_{6-18}$ aryloxy group.

By "aryloxycarbonyl" is meant an aryloxy group, as defined herein, that is attached to the parent molecular group through a carbonyl group. In some embodiments, an unsubstituted aryloxycarbonyl group is a $C_{5-19}$ aryloxycarbonyl group.

By "aryloyl" is meant an aryl group that is attached to the parent molecular group through a carbonyl group. In some embodiments, an unsubstituted aryloyl group is a $C_{7-11}$ aryloyl group.

By "arylsulfonyl" is meant an aryl group, as defined herein, attached to the parent molecular group through an —$SO_2$— group.

By "arylsulfonylalkyl" is meant an alkyl group, as defined herein, substituted by an arylsulfonyl group. In some embodiments, the unsubstituted arylsulfonylalkyl group is a $C_{4-18}$ arylsulfonyl-$C_{1-6}$ alkyl group.

By "azido" is meant an —N3 group.

By "azo" is meant an —N=N— group.

By "azidoalkyl" is meant an azido group attached to the parent molecular group through an alkyl group, as defined herein.

By "carbonyl" is meant a —C(O)— group, which can also be represented as >C=O.

By "carboxyaldehyde" is meant a —C(O)H group.

By "carboxyaldehydealkyl" is meant a carboxyaldehyde group, as defined herein, attached to the parent molecular group through an alkylene group, as defined herein.

By "carboxyl" is meant a —CO$_2$H group.

By "cyano" is meant a —CN group.

By "cycloalkyl" is meant a monovalent saturated or unsaturated non-aromatic cyclic hydrocarbon group of from three to eight carbons, unless otherwise specified, and is exemplified by cyclopropyl, cyclobutyl, cyclopentyl, cyclohexyl, cycloheptyl, bicyclo[2.2.1.]heptyl and the like. The cycloalkyl group can also be substituted or unsubstituted. For example, the cycloalkyl group can be substituted with one or more groups including those described herein for alkyl.

By "cycloalkoxy" is meant a cycloalkyl group, as defined herein, attached to the parent molecular group through an oxygen atom.

By "dithiocarboxyamino" is meant —NR$^{N1}$C(S)SR$^{S1}$, where each of R$^{N1}$ and R$^{S1}$ is, independently, H or optionally substituted alkyl, or R$^{N1}$ and R$^{S1}$, taken together with the nitrogen atom to which each are attached, form a heterocyclyl group, as defined herein.

By "halo" is meant F, Cl, Br, or I.

By "haloalkyl" is meant an alkyl group, as defined herein, substituted with one or more halo.

By "heteroalkyl" is meant an alkyl group, as defined herein, containing one, two, three, or four non-carbon heteroatoms (e.g., independently selected from the group consisting of nitrogen, oxygen, phosphorous, sulfur, or halo).

By "heteroalkylene" is meant a divalent form of an alkylene group, as defined herein, containing one, two, three, or four non-carbon heteroatoms (e.g., independently selected from the group consisting of nitrogen, oxygen, phosphorous, sulfur, or halo).

By "heteroalkyleneoxy" is meant a heteroalkylene group, as defined herein, attached to the parent molecular group through an oxygen atom.

By "heteroaryl" is meant a subset of heterocyclyl groups, as defined herein, which are aromatic, i.e., they contain 4n+2 pi electrons within the mono- or multicyclic ring system.

By "heterocyclyl" is meant a 5-, 6- or 7-membered ring, unless otherwise specified, containing one, two, three, or four non-carbon heteroatoms (e.g., independently selected from the group consisting of nitrogen, oxygen, phosphorous, sulfur, or halo). The 5-membered ring has zero to two double bonds and the 6- and 7-membered rings have zero to three double bonds. The term "heterocyclyl" also includes bicyclic, tricyclic and tetracyclic groups in which any of the above heterocyclic rings is fused to one, two, or three rings independently selected from the group consisting of an aryl ring, a cyclohexane ring, a cyclohexene ring, a cyclopentane ring, a cyclopentene ring, and another monocyclic heterocyclic ring, such as indolyl, quinolyl, isoquinolyl, tetrahydroquinolyl, benzofuryl, benzothienyl and the like. Heterocyclics include thiiranyl, thietanyl, tetrahydrothienyl, thianyl, thiepanyl, aziridinyl, azetidinyl, pyrrolidinyl, piperidinyl, azepanyl, pyrrolyl, pyrrolinyl, pyrazolyl, pyrazolinyl, pyrazolidinyl, imidazolyl, imidazolinyl, imidazolidinyl, pyridyl, pyridazinyl, oxazolyl, oxazolidinyl, isoxazolyl, isoxazolidiniyl, morpholinyl, thiomorpholinyl, thiazolyl, thiazolidinyl, isothiazolyl, isothiazolidinyl, indolyl, quinolinyl, isoquinolinyl, benzimidazolyl, benzothiazolyl, benzoxazolyl, furyl, thienyl, thiazolidinyl, isothiazolyl, isoindazoyl, triazolyl, tetrazolyl, oxadiazolyl, uricyl, thiadiazolyl, pyrimidyl, tetrahydrofuranyl, dihydrofuranyl, tetrahydrothienyl, dihydrothienyl, dihydroindolyl, tetrahydroquinolyl, tetrahydroisoquinolyl, pyranyl, dihydropyranyl, dithiazolyl, benzofuranyl, benzothienyl, and the like.

By "heterocyclyloxy" is meant a heterocyclyl group, as defined herein, attached to the parent molecular group through an oxygen atom.

By "heterocyclyloyl" is meant a heterocyclyl group, as defined herein, attached to the parent molecular group through a carbonyl group.

By "hydroxyl" is meant —OH.

By "hydroxyalkyl" is meant an alkyl group, as defined herein, substituted by one to three hydroxyl groups, with the proviso that no more than one hydroxyl group may be attached to a single carbon atom of the alkyl group and is exemplified by hydroxymethyl, dihydroxypropyl, and the like.

By "imino" is meant —NH—.

By "nitrilo" is meant —N<. Exemplary nitrilo groups include —NR$^{L3}$—, where R$^{L3}$ is H, optionally substituted alkyl, optionally substituted haloalkyl, optionally substituted alkoxy, optionally substituted alkaryl, optionally substituted aryl, or halo.

By "nitro" is meant an —NO$_2$ group.

By "nitroalkyl" is meant an alkyl group, as defined herein, substituted by one to three nitro groups.

By "oxo" is meant an =O group.

By "oxy" is meant —O—.

By "perfluoroalkyl" is meant an alkyl group, as defined herein, having each hydrogen atom substituted with a fluorine atom. Exemplary perfluoroalkyl groups include trifluoromethyl, pentafluoroethyl, etc.

By "perfluoroalkylene" is meant an alkylene group, as defined herein, having each hydrogen atom substituted with a fluorine atom. Exemplary perfluoroalkylene groups include difluoromethylene, tetrafluoroethylene, etc.

By "perfluoroalkyleneoxy" is meant a perfluoroalkylene group, as defined herein, having an oxy group attached to either end of the perfluoroalkylene group. Exemplary perfluoroalkylene groups include, e.g., —OC$_f$F$_{2f}$— or —C$_f$F$_{2f}$O—, where f is an integer from about 1to 5, and 2f is an integer that is 2 times f (e.g., difluoromethyleneoxy, tetrafluoroethyleneoxy, etc.).

By "perfluoroalkoxy" is meant an alkoxy group, as defined herein, having each hydrogen atom substituted with a fluorine atom.

By "phosphono" is meant a —P(O)(OH)$_2$ group.

By "phosphonoyl" is meant a —P(O)H— group.

By "phosphoric ester" is meant a —O—PO(OH)$_2$ group.

By "phosphoryl" is meant a —P(O)<group.

By "protecting group" is meant any group intended to protect a reactive group against undesirable synthetic reactions. Commonly used protecting groups are disclosed in "Greene's Protective Groups in Organic Synthesis," John Wiley & Sons, New York, 2007 (4th ed., eds. P.G.M. Wuts and T.W. Greene), which is incorporated herein by reference. O-protecting groups include an optionally substituted alkyl group (e.g., forming an ether with reactive group O), such as methyl, methoxymethyl, methylthiomethyl, benzoyloxymethyl, t-butoxymethyl, etc.; an optionally substituted alkanoyl group (e.g., forming an ester with the reactive group O), such as formyl, acetyl, chloroacetyl, fluoroacetyl (e.g., perfluoroacetyl), methoxyacetyl, pivaloyl, t-butylacetyl, phenoxyacetyl, etc.; an optionally substituted aryloyl group (e.g., forming an ester with the reactive group O), such as —C(O)—Ar, including benzoyl; an optionally substituted alkylsulfonyl group (e.g., forming an alkylsulfonate with reactive group O), such as —SO$_2$—R$^{S1}$, where R$^{S1}$ is optionally substituted C$_{1-12}$ alkyl, such as mesyl or benzylsulfonyl; an optionally substituted arylsulfonyl group (e.g., forming an arylsulfonate with reactive group O), such as —SO$_2$—R$^{S4}$, where R$^{S4}$ is optionally substituted C$_{4-18}$ aryl, such as tosyl or phenylsulfonyl; an optionally substituted alkoxycarbonyl or aryloxycarbonyl group (e.g., forming a carbonate with reactive group O), such as —C(O)—OR$^{T1}$, where R$^{T1}$ is optionally substituted C$_{1-12}$ alkyl or optionally substituted C$_{4-18}$ aryl, such as methoxycarbonyl, methoxymethylcarbonyl, t-butyloxycarbonyl (Boc), or benzyloxycarbonyl (Cbz); or an optionally substituted silyl group (e.g., forming a silyl ether with reactive group O), such as —Si-(R$^{T2}$)$_3$, where each R$^{T2}$ is, independently, optionally substituted C$_{1-12}$ alkyl or optionally substituted C$_{4-18}$ aryl, such as trimethylsilyl, t-butyldimethylsilyl, or t-butyldiphenylsilyl. N-protecting groups include, e.g., formyl, acetyl, benzoyl, pivaloyl, t-butylacetyl, alanyl, phenylsulfonyl, benzyl, Boc, and Cbz. Such protecting groups can employ any useful agent to cleave the protecting group, thereby restoring the reactivity of the unprotected reactive group.

By "salt" is meant an ionic form of a compound or structure (e.g., any formulas, compounds, or compositions described herein), which includes a cation or anion compound to form an electrically neutral compound or structure. Salts are well known in the art. For example, non-toxic salts are described in Berge SM et al., "Pharmaceutical salts," *J. Pharm. Sci.* 1977 Jan;66(1):1-19; and in "Handbook of Pharmaceutical Salts: Properties, Selection, and Use," Wiley-VCH, Apr. 2011 (2nd rev. ed., eds. P.H. Stahl and C.G. Wermuth. The salts can be prepared in situ during the final isolation and purification of the compounds of the invention or separately by reacting the free base group with a suitable organic acid (thereby producing an anionic salt) or by reacting the acid group with a suitable metal or organic salt (thereby producing a cationic salt). Representative anionic salts include acetate, adipate, alginate, ascorbate, aspartate, benzenesulfonate, benzoate, bicarbonate, bisulfate, bitartrate, borate, bromide, butyrate, camphorate, camphorsulfonate, chloride, citrate, cyclopentanepropionate, digluconate, dihydrochloride, diphosphate, dodecylsulfate, edetate, ethanesulfonate, fumarate, glucoheptonate, glucomate, glutamate, glycerophosphate, hemisulfate, heptonate, hexanoate, hydrobromide, hydrochloride, hydroiodide, hydroxyethanesulfonate, hydroxynaphthoate, iodide, lactate, lactobionate, laurate, lauryl sulfate, malate, maleate, malonate, mandelate, mesylate, methanesulfonate, methylbromide, methylnitrate, methylsulfate, mucate, 2-naphthalenesulfonate, nicotinate, nitrate, oleate, oxalate, palmitate, pamoate, pectinate, persulfate, 3-phenylpropionate, phosphate, picrate, pivalate, polygalacturonate, propionate, salicylate, stearate, subacetate, succinate, sulfate, tannate, tartrate, theophyllinate, thiocyanate, triethiodide, toluenesulfonate, undecanoate, valerate salts, and the like. Representative cationic salts include metal salts, such as alkali or alkaline earth salts, e.g., barium, calcium (e.g., calcium edetate), lithium, magnesium, potassium, sodium, and the like; other metal salts, such as aluminum, bismuth, iron, and zinc; as well as nontoxic ammonium, quaternary ammonium, and amine cations, including, but not limited to ammonium, tetramethylammonium, tetraethylammonium, methylamine, dimethylamine, trimethylamine, triethylamine, ethylamine, pyridinium, and the like. Other cationic salts include organic salts, such as chloroprocaine, choline, dibenzylethylenediamine, diethanolamine, ethylenediamine, methylglucamine, and procaine.

By "spirocyclyl" is meant an alkylene diradical, both ends of which are bonded to the same carbon atom of the parent group to form a spirocyclyl group and also a heteroalkylene diradical, both ends of which are bonded to the same atom.

By "sulfinyl" is meant an —S(O)— group.

By "sulfo" is meant an —S(O)$_2$OH group.

By "sulfonamide is meant an —S(O)$_2$—NR$^{L3}$— or an —NR$^{L3}$—S(O)$_2$— group, in which R$^{L3}$ is any useful moiety. Exemplary R$^{L3}$ groups include H, optionally substituted alkyl, optionally substituted haloalkyl, optionally substituted alkoxy, optionally substituted alkaryl, optionally substituted aryl, or halo.

By "sulfone" is meant R'—S(O)$_2$—R", where R' and R" is an organic moiety. Exemplary groups for R' and R" include, independently, optionally substituted alkyl, alkenyl, alkynyl, alkaryl, alkheterocyclyl, alkcycloalkyl, alkanoyl, alkoxy, alkoxyalkyl, alkoxycarbonyl, alkylsulfinyl, alkylsulfonyl, alkylsulfinylalkyl, alkylsulfonylalkyl, aminoalkyl, aryl, arylalkoxy, aryloxy, aryloxycarbonyl, aryloyl, aryl sulfonyl, arylsulfonylalkyl, azidoalkyl, carboxyaldehyde, carboxyaldehydealkyl, carboxyl, cyano, cycloalkyl, cycloalkoxy, haloalkyl, heteroaryl, heterocyclyl, heterocyclyloxy, heterocyclyloyl, hydroxyalkyl, nitroalkyl, perfluoroalkyl, perfluoroalkoxy, spirocyclyl, thioalkaryl, thioalkheterocyclyl, or thioalkoxy, as defined herein. The sulfone can be unsubstituted or substituted. For example, the sulfone can be substituted with one or more substitution groups, as described herein for alkyl and/or aryl.

By "sulfonyl" is meant an —S(O)$_2$— group.

By "thioalkaryl" is meant a thioalkoxy group, as defined herein, substituted with an aryl group, as defined herein.

By "thioalkheterocyclyl" is meant a thioalkoxy group, as defined herein, substituted with a heterocyclyl group, as defined herein.

By "thioalkoxy" is meant an alkyl group, as defined herein, attached to the parent molecular group through a sulfur atom. Exemplary unsubstituted thioalkoxy groups include C$_{1-6}$ thioalkoxy.

By "thioamido" is meant —C(S)NR$^{N1}$R$^{N2}$, where each of R$^{N1}$ and R$^{N2}$ is, independently, H or optionally substituted alkyl, or R$^{N1}$ and R$^{N2}$, taken together with the nitrogen atom to which each are attached, form a heterocyclyl group, as defined herein.

By "thio" is meant an —S— group

By "thiol" is meant an —SH group.

By "attaching," "attachment," or related word forms is meant any covalent or non-covalent bonding interaction between two components. Non-covalent bonding interactions include, without limitation, hydrogen bonding, ionic interactions, halogen bonding, electrostatic interactions, π bond interactions, hydrophobic interactions, inclusion complexes, clathration, van der Waals interactions, and combinations thereof.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

BRIEF DESCRIPTION OF THE DRAWINGS

FIG. 4A-4C shows (A) non-limiting polymer structures (II) and (IIa) having a first linking segment $L^1$ and a second linking segment $L^2$; (B) non-limiting linking segments (IIA-1) to (IIA-4) including $R^T$-substituted arylene groups and linkers $L^{1a}$, $L^{1b}$, $L^{1c}$; and (C) non-limiting linking segments (IIB-1) to (IIB-8) including the $Ar^P$ subunit, $R^T$-substituted arylene groups and linkers $L^{2a}$, $L^{2b}$, $L^{2c}$.

FIG. 5 shows an exemplary schematic of a polymer structure as in formula (III) including a first reactive handle $R^{H1}$, a first linking segment $L^1$, a polymeric segment (e.g., including a plurality of arylene (Ar) groups), a second linking segment $L^2$, and a second reactive handle $R^{H2}$.

FIG. 6 shows non-limiting polymer structures (IIIa) and (IIIb) having reactive handles.

DETAILED DESCRIPTION OF THE INVENTION

The present invention relates to polymer structures having a long tether (e.g., an extended linking segment). In particular embodiments, these long tethers allow for a reaction between a first polymeric segment at reduced reaction temperatures, thereby reducing the potential for forming a solid. Structures for such polymers, as well as methods for making and using such polymers are described herein.

Polymer, including copolymers

The present invention encompasses polymers, including copolymers. Exemplary polymer include any described herein, such as non-limiting generic structure provided in formulas (I), (IA), (Ia), (Ib), (Ic), (Id), (Ie), (If), (Ig), (Ih), (II), (IIa), (III), (IIIa), (IIIb), (IIIc), (IIId), (IIIe), (IIIf), (IIIg), (IIIh), (IIIi), (IIIj), (IV), (IVa), (IVb), (IVc), (IVd), (IVe), and (IVf), as well as particular structures (I-1), (I-2), (I-3), (I-4), (I-5), (I-6), (III-1), (III-2), (IV-1), (IV-2), (IV-3), (IV-4), (IV-5), (IV-6), and (IV-7), including salts thereof. Any of the polymers can include a linking segment provided in formulas (IIA-1), (IIA-2), (IIA-3), (IIA-4), (IIB-1), (IIB-2), (IIB-3), (IIB-4), (IIB-5), (IIB-6), (IIB-7), and (IIB-8), including salts thereof.

Of these, formulas (IV), (IVa), (IVb), (IVc), (IVd), (IVe), and (IVf) are considered to be copolymers. In particular embodiments, the copolymer of the invention includes at least one hydrophilic segment, at least one hydrophobic segment, and at least one linking segment connecting at least one hydrophilic segment with at least one hydrophobic segment.

Figure 1:
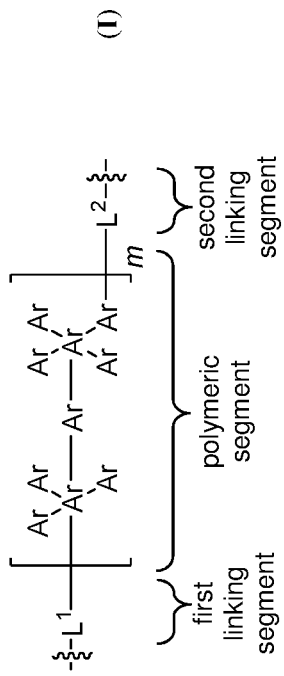
FIG. 1 shows an exemplary schematic of a polymer structure as in formula (I) including a first linking segment $L^1$, a polymeric segment (e.g., including a plurality of arylene (Ar) groups), and a second linking segment $L^2$.

In one embodiment, a polymer includes the structure of formula (I), including salts thereof. As can be seen in FIG. 1, formula (I) is a generic structure encompassing other structures (e.g., formula (Ia)).

Furthermore, formula (Ia) includes a polymeric segment disposed between two linking segments. The polymeric segment can include any useful backbone structure. For instance, in formula (Ia), the backbone includes three groups, i.e., two $R^1$-substituted aryl groups and a bridging group $Ar^L$. The polymer can include any useful type of backbone substituents (e.g., backbone substituents $R^1$), as well as any useful number of such substituents on each group (e.g., q substituents, where q can be 1, 2, 3, 4, or 5). For any structure described herein, each $R^1$ is, independently, an acidic moiety (e.g., $R^S$, $R^P$, $R^C$, or any described herein), an electron-withdrawing moiety (e.g., $R^F$ or any described herein), or an inert substituent (e.g., H, halo, optionally substituted alkyl, optionally substituted alkoxy, etc.). In some embodiments, each and every $R^1$ is, independently, $R^S$, $R^P$, $R^C$, or $R^F$.

Each linking segment can include a linker (e.g., $L^{1a}$ or $L^{2a}$) and an optionally substituted arylene (e.g., $R^T$-substituted arylene). Each linking segment can include any number of linkers and arylene groups (e.g., any m1 or m2 number of linkers and arylene groups, in which m1 and m2 is, independently, an integer of from 1 to 10). Each $R^T$ can be any useful substituent, such as any described herein.

Figure 2A:
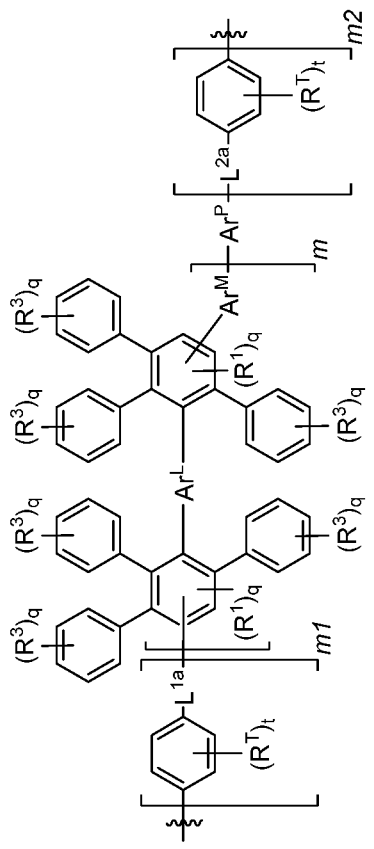
FIG. 2A-2G shows exemplary schematics of (A) a polymer structure having an $Ar^P$ group, as in formula (Ia); (B) a polymer structure with a poly(phenylene) subunit, as in formula (Ib); (C) polymer structures with a covalent bond disposed between the polymeric segment and the linking segments, as in formula (Ic) or (Id); (D) a polymer structure having three arylene groups in the linking segment, as in formula (Ie); (E) another polymer structure having three arylene groups in the linking segment, as in formula (If); (F) yet another polymer structure having three arylene groups in the linking segment, as in formula (Ig); and (G) another polymer structure having three arylene groups in the linking segment, as in formula (Ih).
Figure 2B:
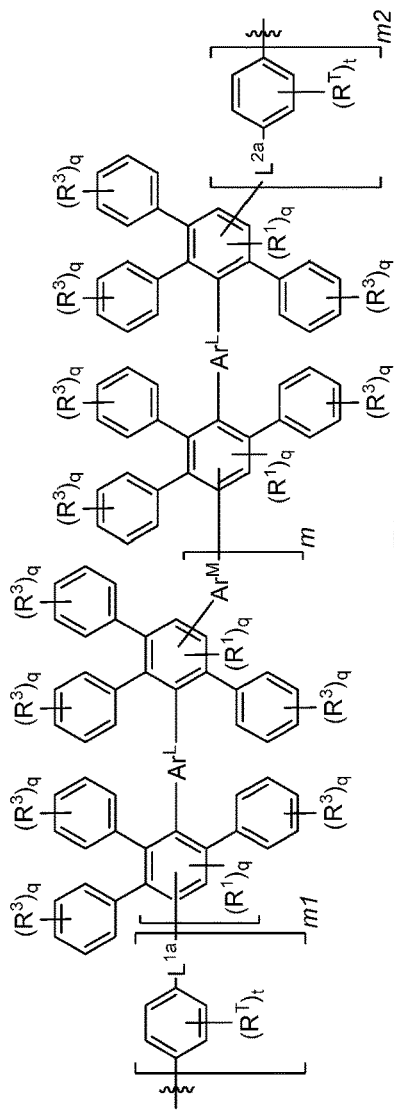
Figure 2C:
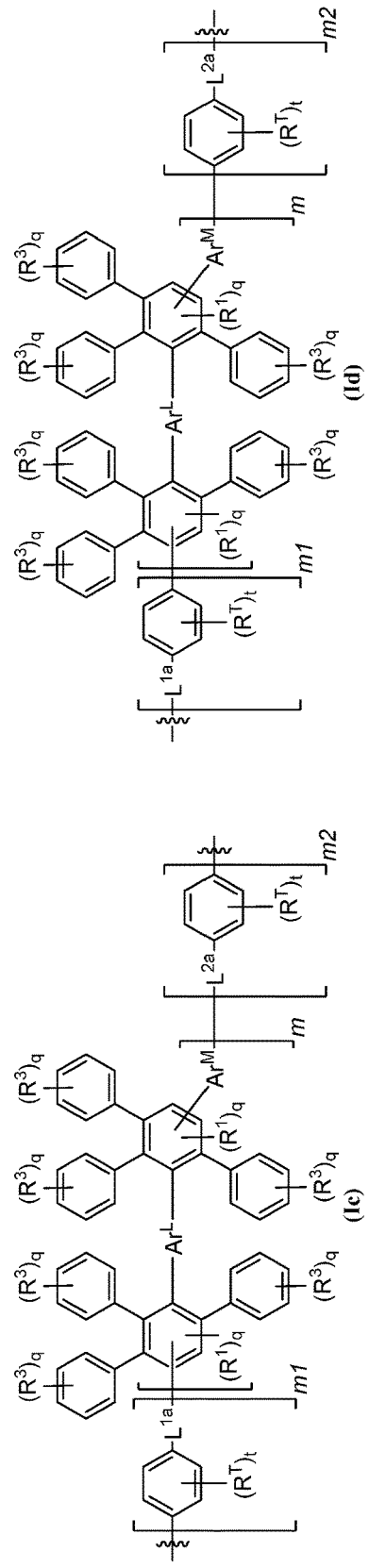
Figure 2D:
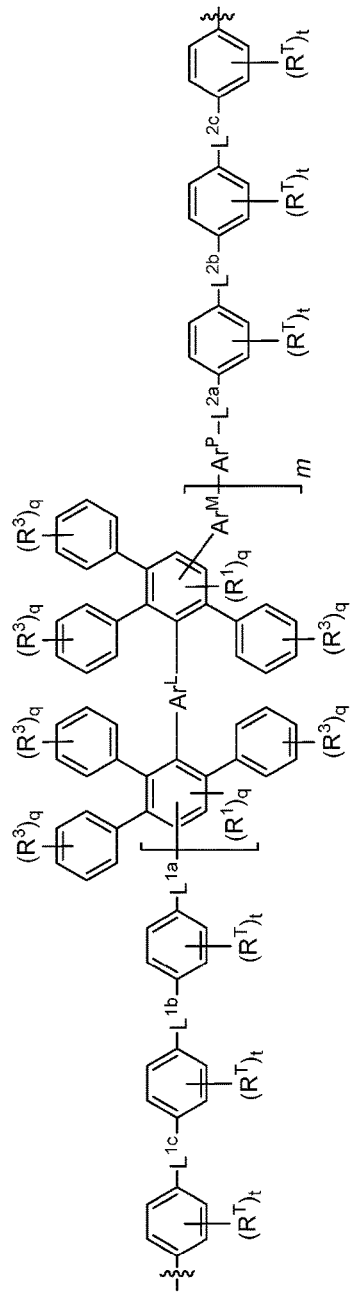
Figure 2E:
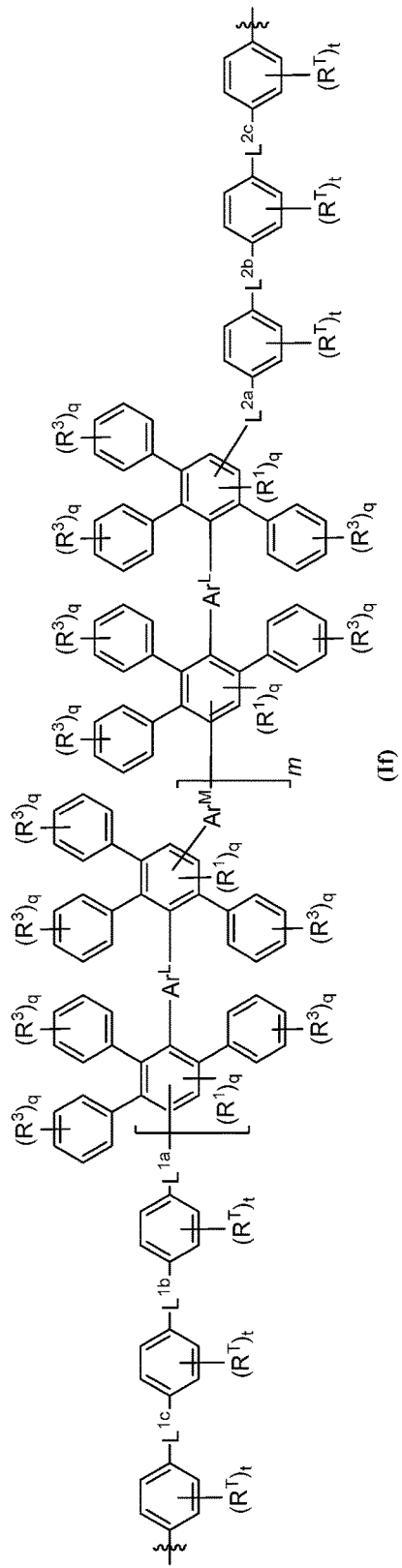
Figure 2F:
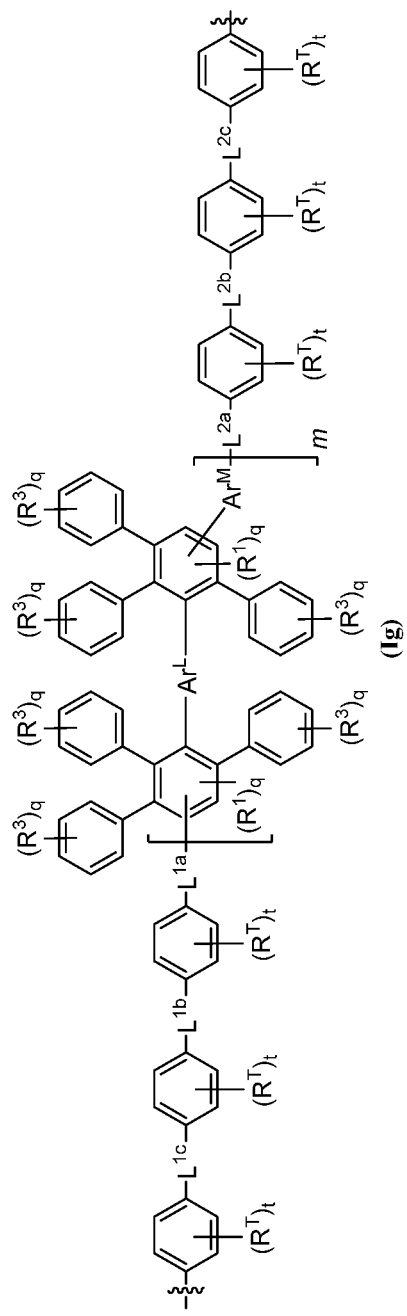
Figure 2G:
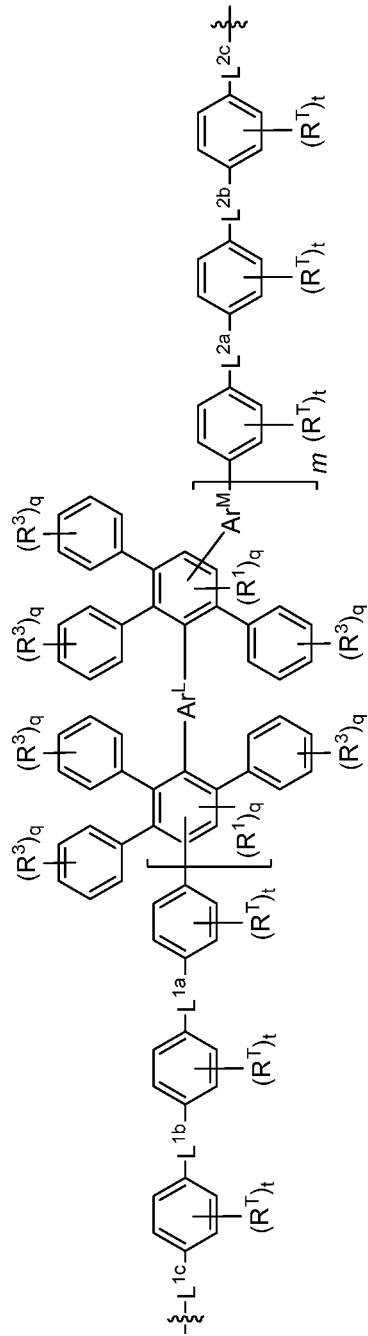
Figure 3A:
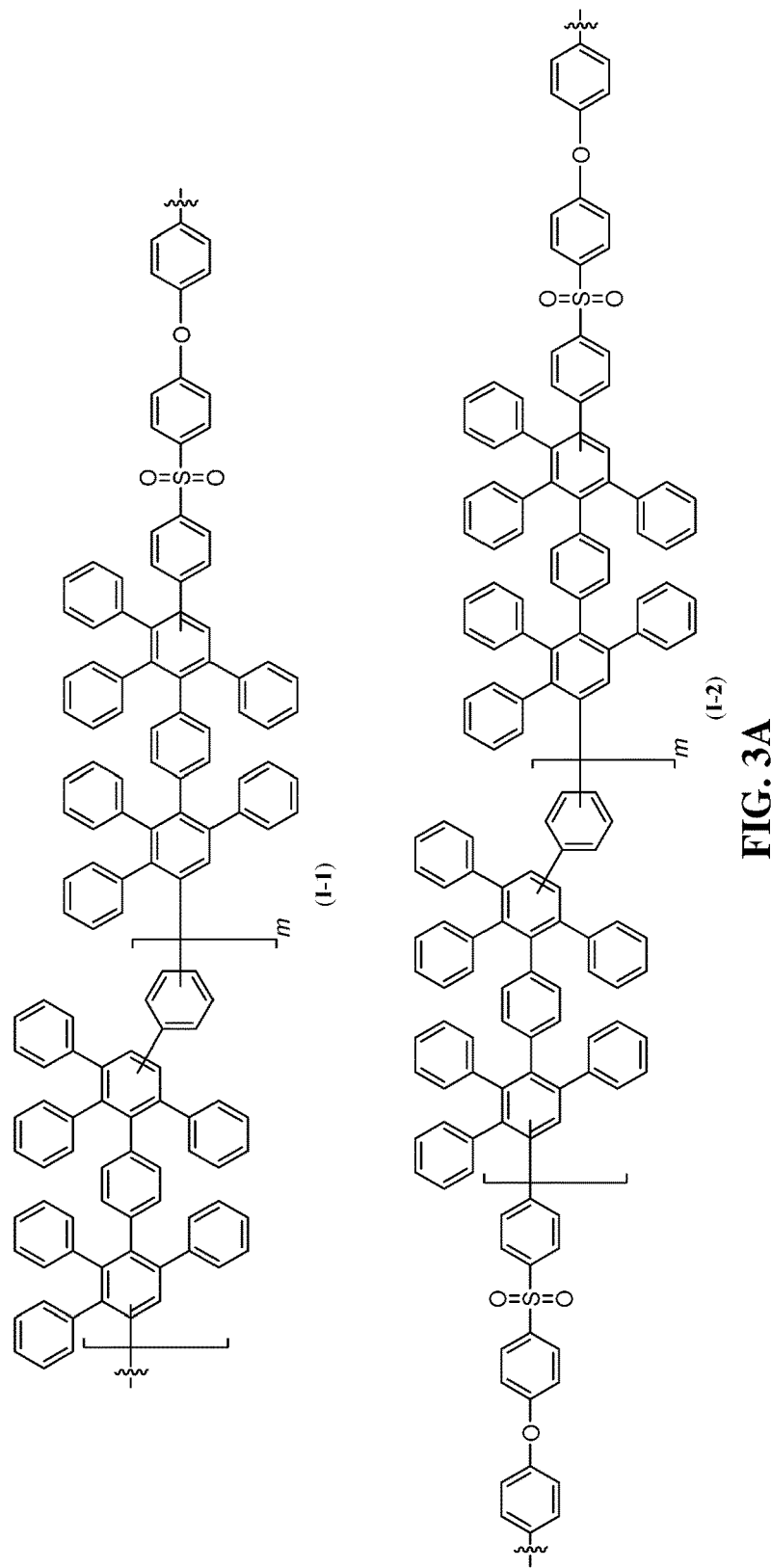
FIG. 3A-3C shows (A) non-limiting exemplary structures (I-1) and (I-2) having a poly(phenylene) subunit; (B) non-limiting exemplary structures (I-3) and (I-4) having a sulfone linker and an oxy linker within the linking segment; and (C) non-limiting exemplary structures (I-5) and (I-6) having sulfonyl-based acidic moieties.
Figure 3B:
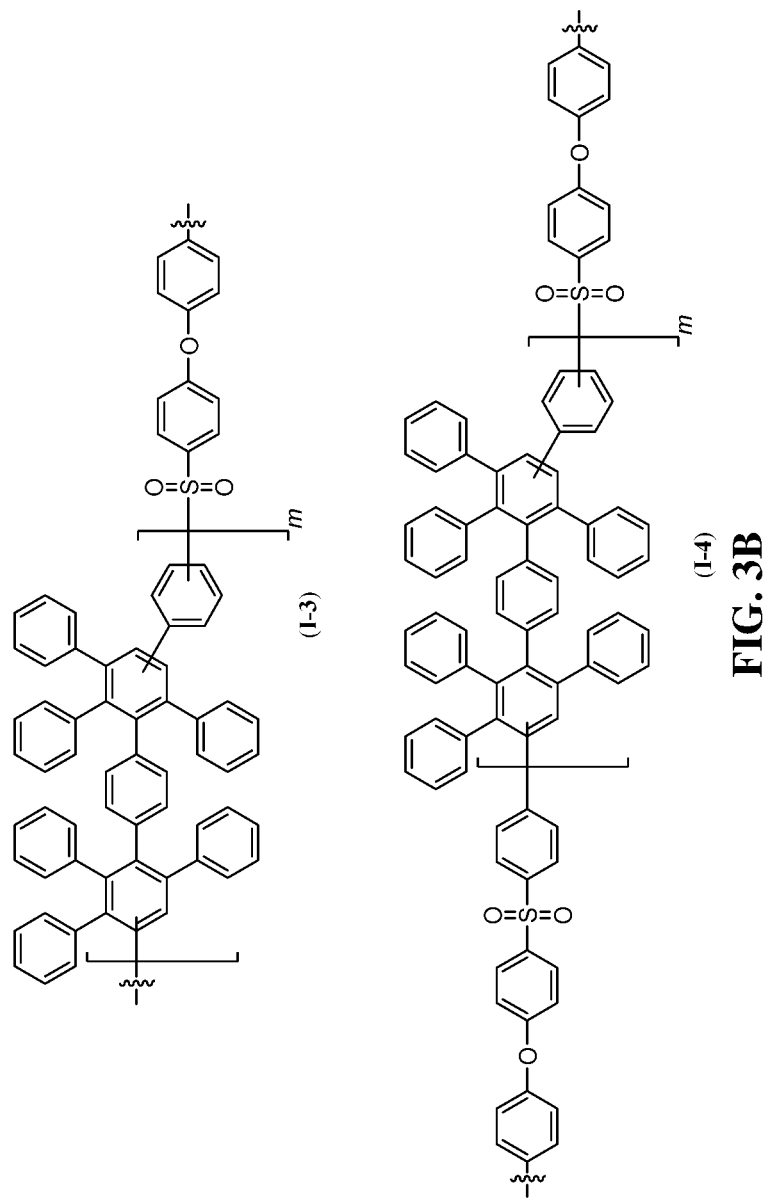
Figure 3C:
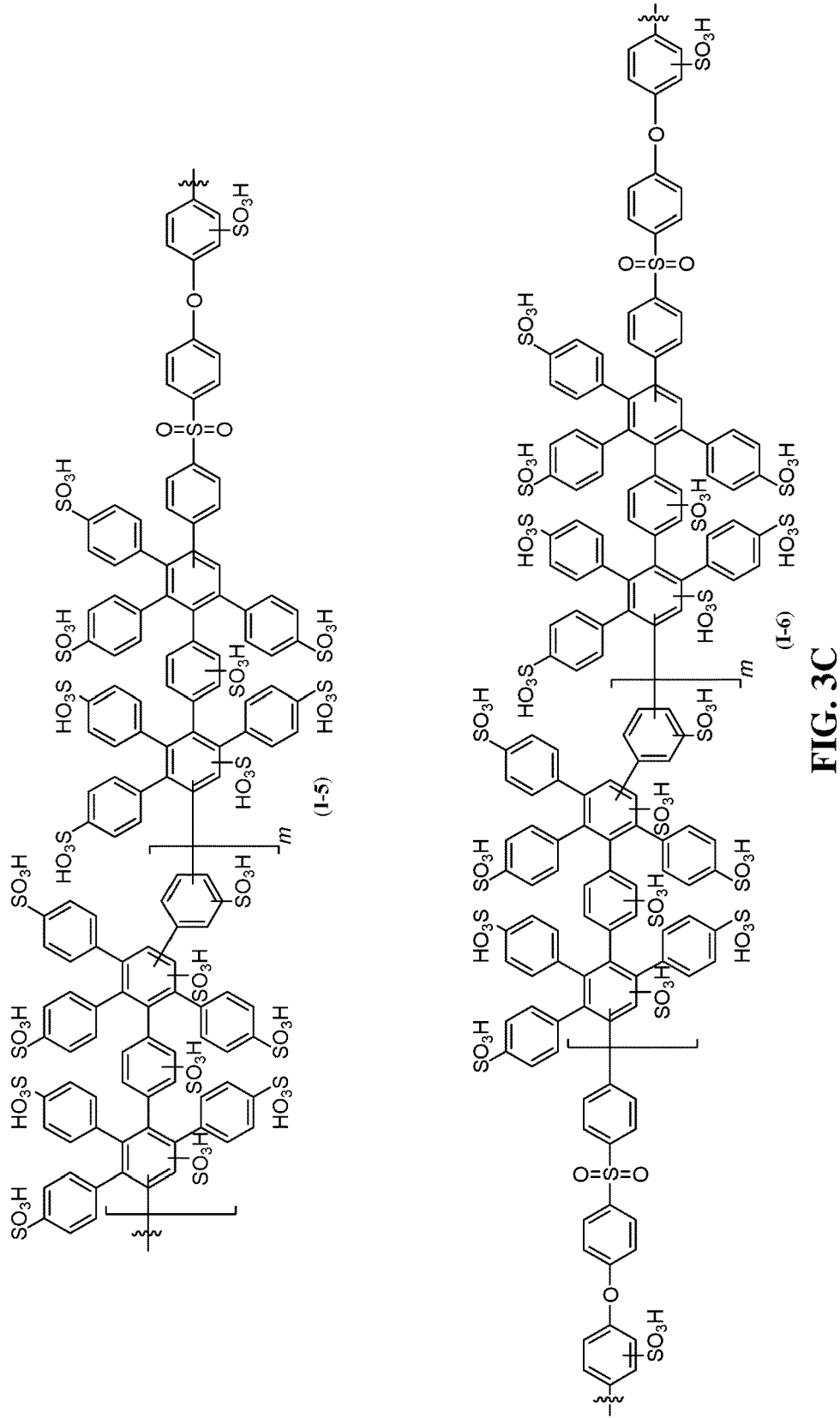
Figure 4C:
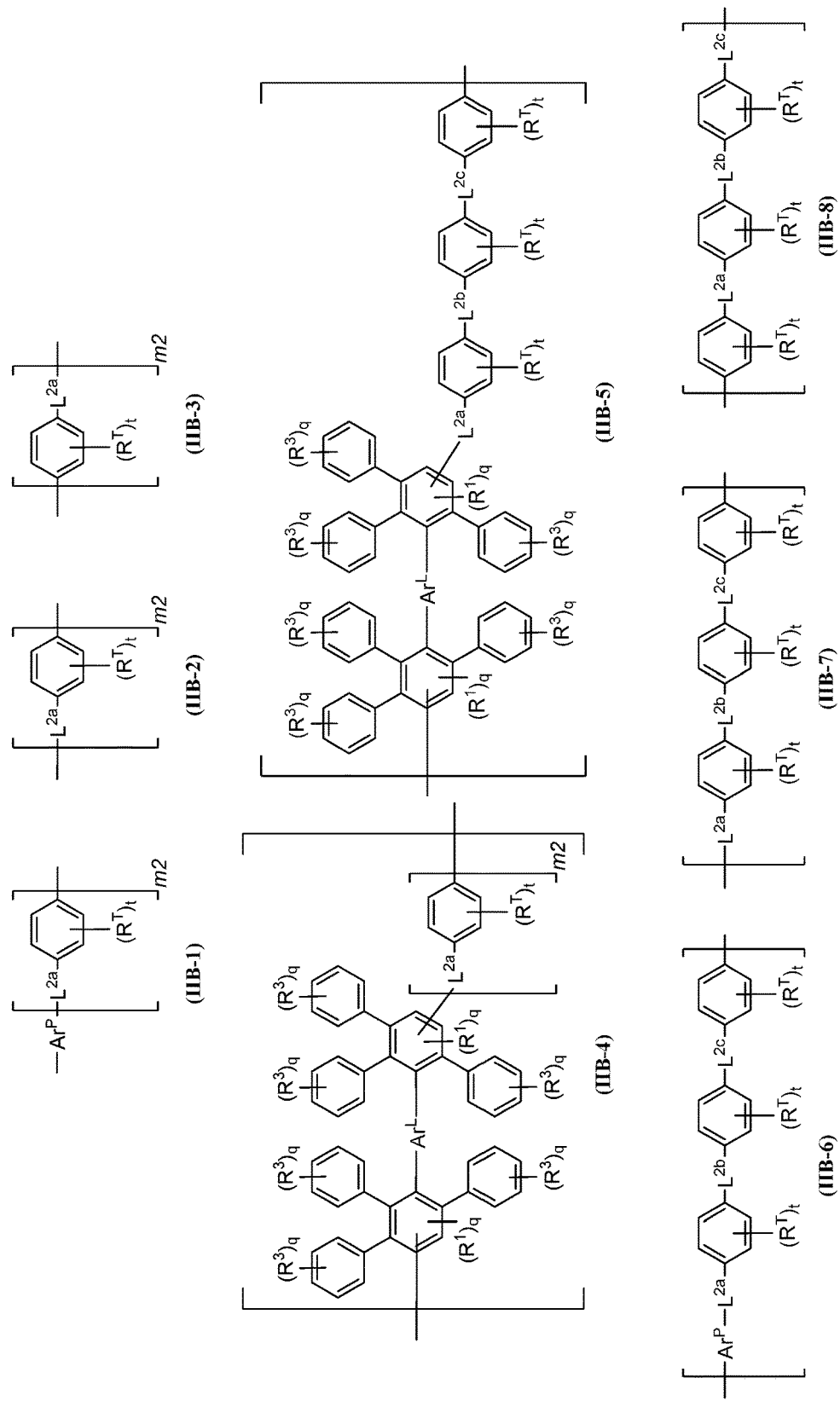
Figure 7A:
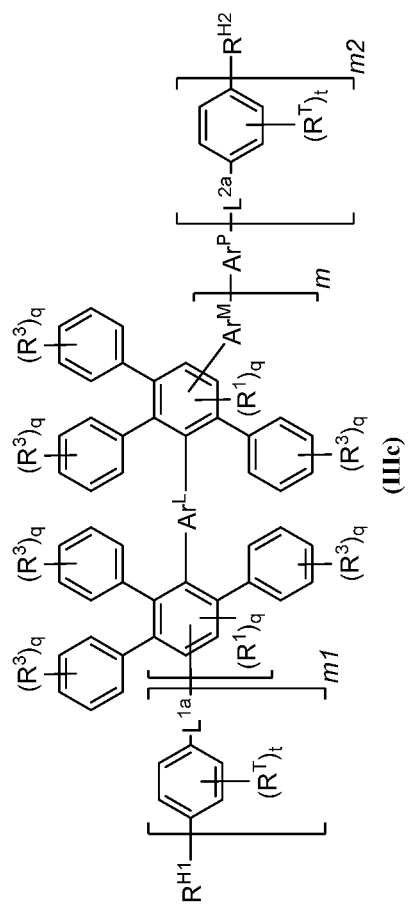
FIG. 7A-7I shows exemplary schematics of (A) a polymer structure having an $Ar^P$ group and reactive handles $R^{H1}$, $R^{H2}$, as in formula (IIIc); (B) a polymer structure with a poly(phenylene) subunit and reactive handles $R^{H1}$, $R^{H2}$, as in formula (IIId); (C) a polymer structure with a covalent bond disposed between the polymeric segment and the linking segments, as in formula (IIIe); (D) a polymer structure with a covalent bond disposed between the polymeric segment and the linking segments, as in formula (IIIf); (E) a polymer structure having three arylene groups in the linking segment, as in formula (IIIg); (F) another polymer structure having three arylene groups in the linking segment, as in formula (IIIh); (G) yet another polymer structure having three arylene groups in the linking segment, as in formula (IIIi); (H) another polymer structure having three arylene groups in the linking segment, as in formula (IIIj); and (I) non-limiting exemplary structure (III-1) having a poly(phenylene) subunit and a reactive handle including a hydroxyl group.
Figure 7B:
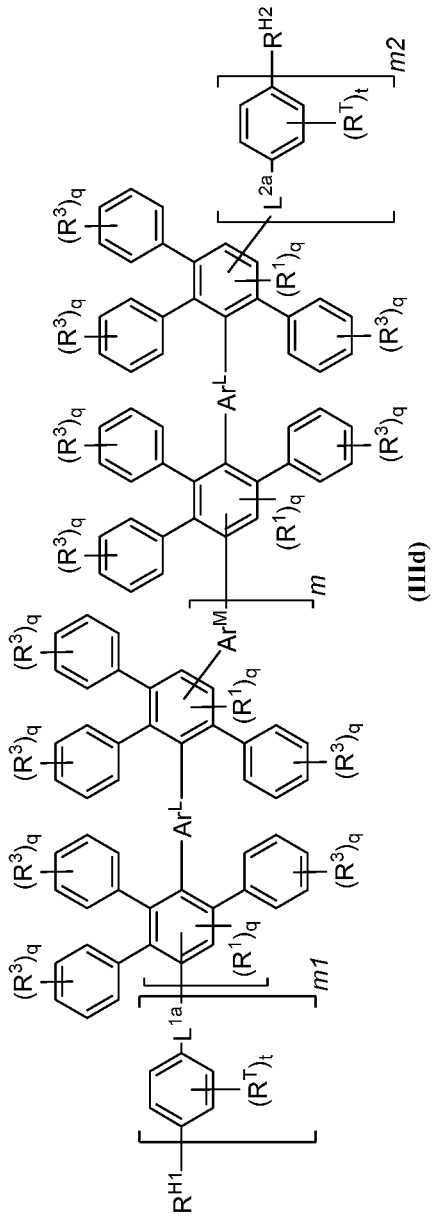
Figure 7C:
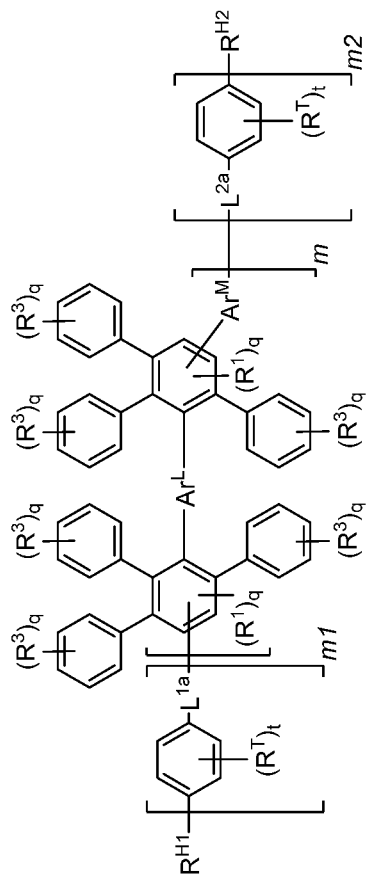
Figure 7D:
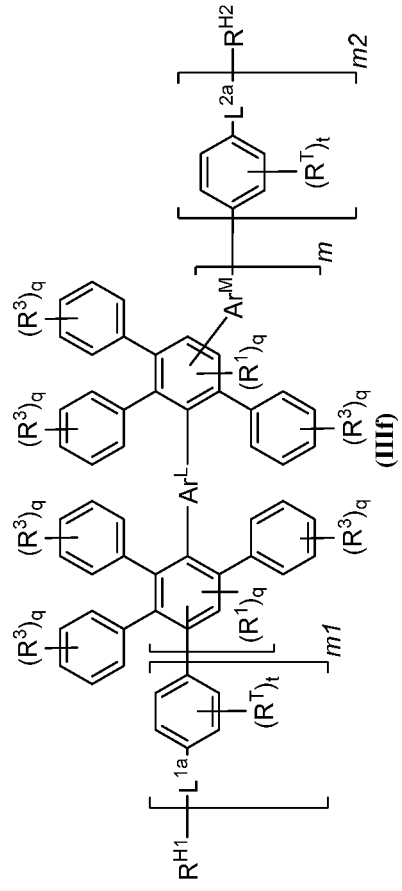
Figure 7E:
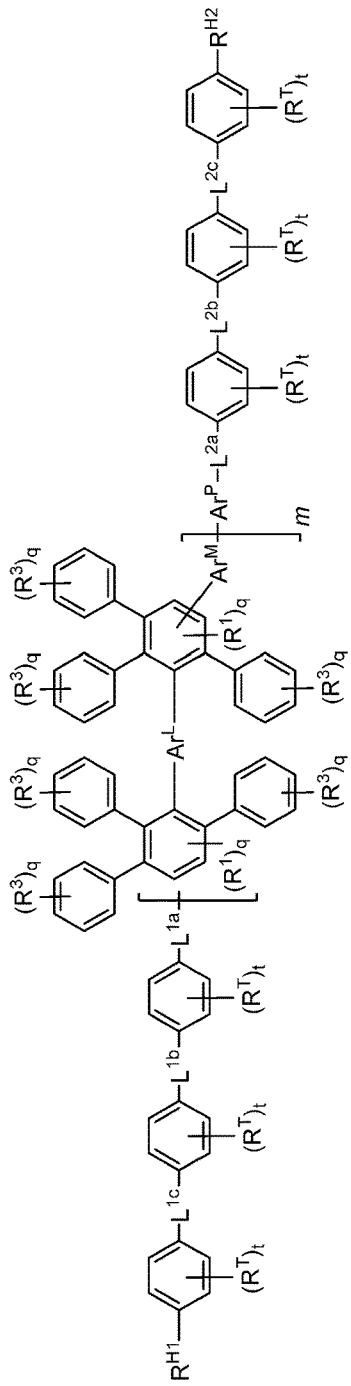
Figure 7F:
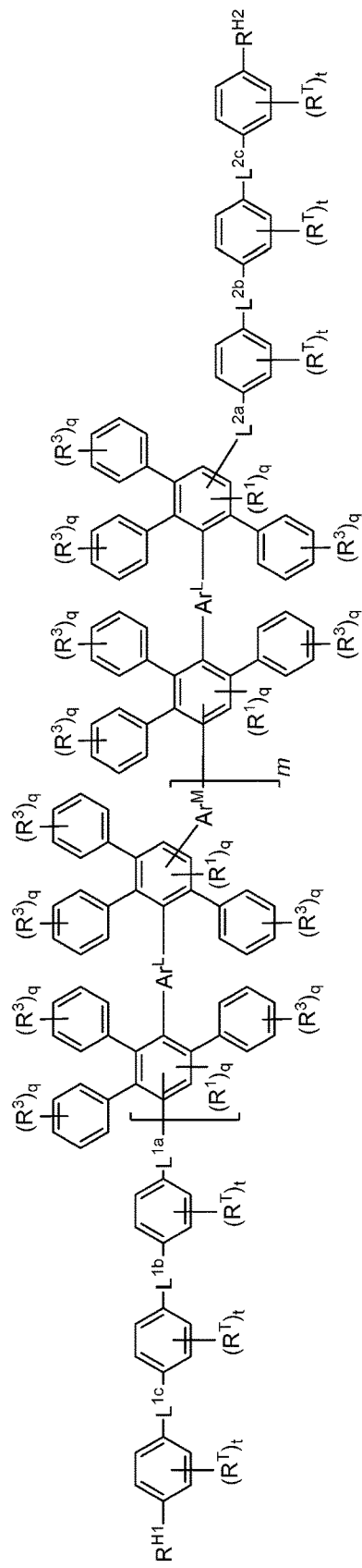
Figure 7G:
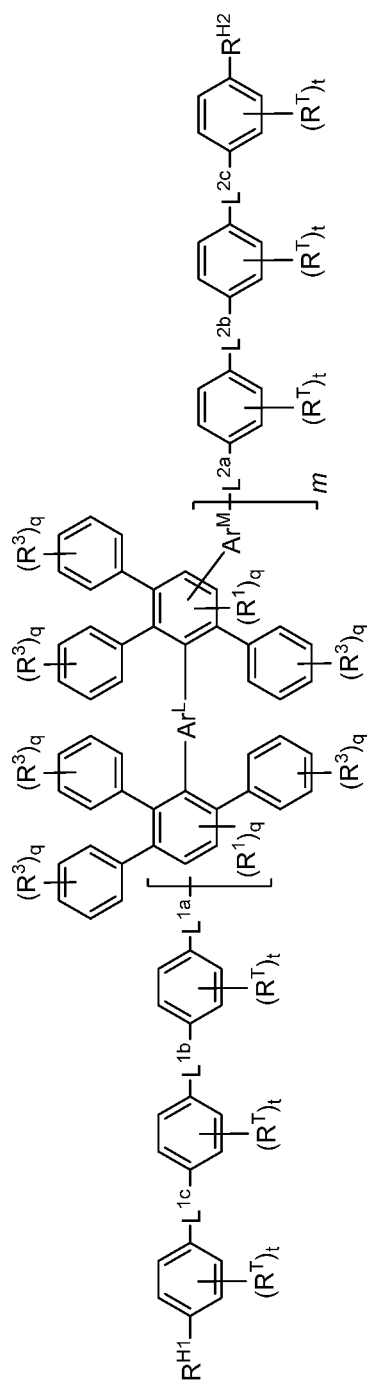
Figure 7H:
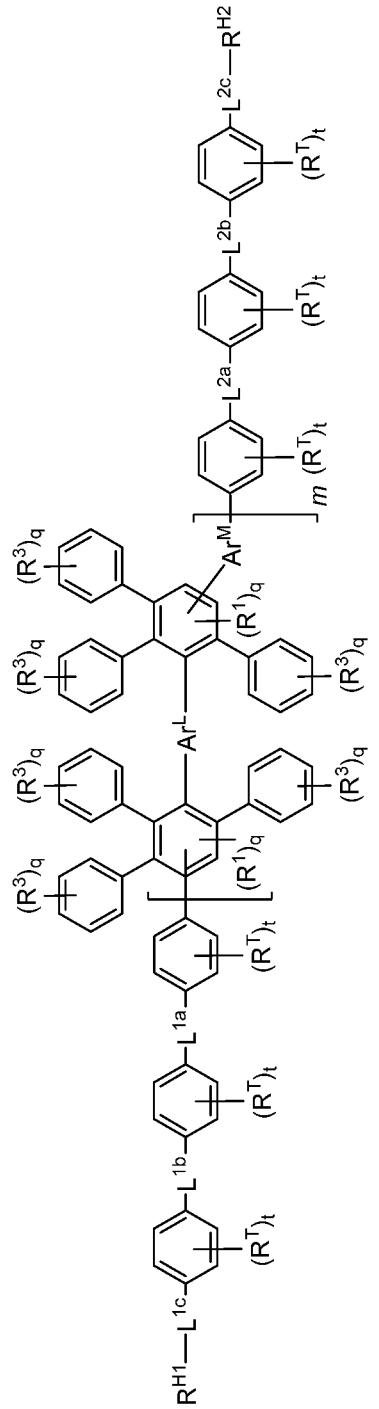
Figure 7I:
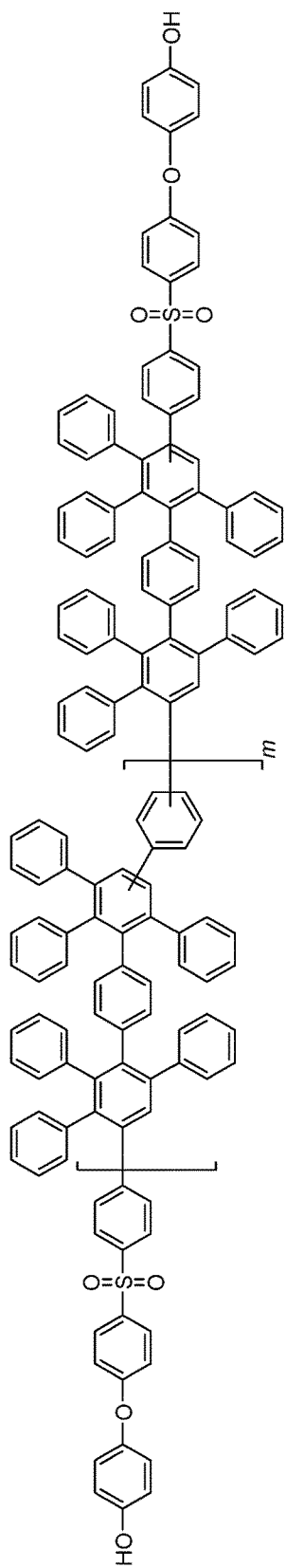

The linking segment can have any useful number of arylene groups. As seen in FIG. 2C, the linking segment can have any useful arrangement of linkers $L^{1a}$, $L^{2b}$ and $R^T$-substituted arylene groups. In other embodiments, the linking segment can include three arylene groups, as in formulas (Ie) to (Ih) in FIG. 2D-2G. Additional linking segments are provided in formulas (IIA-1) to (IIA-4) and (IIB-1) to (IIB-8) in FIG. 4A-4C. In particular embodiments, each linker in the linking segment is not a covalent bond (e.g., each linking segment is, independently, carbonyl, oxy, thio, azo, phosphonoyl, phosphoryl, sulfonyl, sulfinyl, sulfonamide, imino, imine, phosphine, nitrilo, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, or optionally substituted $C_{4-18}$ aryleneoxy).

Subunit $Ar^P$ can be disposed between a polymeric segment and a linking segment. In particular embodiments, $Ar^P$ can include one or more optionally substituted arylene groups. Alternatively, $Ar^P$ is a covalent bond. In one non-limiting instance, $Ar^P$ includes a poly(phenylene) segment. In another instance, $Ar^P$ includes a structure having formula (IB):

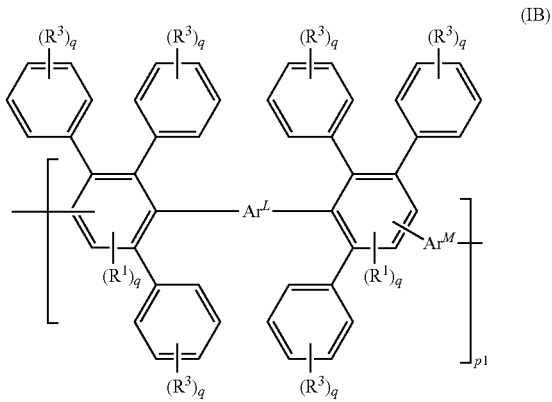

or a salt thereof In some embodiments, p1 is an integer of from about 1 to 10. In other embodiments, each of $R^1$, $R^3$, $Ar^L$, $Ar^M$, and q is, independently, any described herein. In yet other embodiments, $Ar^L$ includes a $R^1$-substituted 1,4-phenylene, and $Ar^M$ includes an $R^2$-substituted 1,4-phenylene. In other embodiments, the subunit can include an optionally substituted poly(phenylene) group, as in formula (Ib) in FIG. 2B.

Within the polymeric segment, each of bridging group $Ar^L$ and connecting group $Ar^M$ can be any useful bivalent linker. In particular embodiments, each of $Ar^L$ and $Ar^M$ is, independently, includes an optionally substituted arylene group. In some embodiments, each of $Ar^L$ and $Ar^M$ is, independently, an optionally substituted arylene group. In other embodiments, each of $Ar^L$ and $Ar^M$ is, independently, substituted with 1, 2, 3, or 4 $R^S$ substituent(s), $R^P$ substituent(s), $R^C$ substituent(s), $R^F$ substituent(s), or label(s). Exemplary labels include a detectable label, such as an NMR label (e.g., fluorine, such as $^{19}F$; nitrogen, e.g., $^{15}N$; or oxygen, e.g., $^{17}O$), a spin label, an isotopic label, a mass label, a fluorescent label, a dye, etc. Examples of $Ar^L$ and $Ar^M$ linkers include 1,4-benzenediyl (or 1,4-phenylene), 2,7-phenanthrylene (or 2,7-phenanthrenediyl), 1,5-naphthylene (or 1,5-napthalenediyl), etc. For example, the polymer can include a structure of formula (IIa) having $Ar^L$ as a $R^1$-substituted 1,4-phenylene and $Ar^M$ as an $R^2$-substituted 1,4-phenylene.

The polymeric segment can also include any useful type of pendent substituents (e.g., pendent substituents $R^3$), as well as any useful number of such substituents on each aryl group (e.g., q substituents, where q can be 1, 2, 3, 4, or 5). For any structure described herein, each $R^3$ is, independently, an acidic moiety (e.g., $R^S$, $R^P$, $R^C$, or any described herein), an electron-withdrawing moiety (e.g., $R^F$ or any described herein), or an inert substituent (e.g., H, halo, optionally substituted alkyl, optionally substituted alkoxy, etc.). In some embodiments, each and every $R^3$ is, independently, $R^S$, $R^P$, $R^C$, or $R^F$. In some embodiments, fully substituted pendent groups (e.g., $R^3$ is not H) can provide polymers with enhanced proton conduction and durability characteristics.

A polymer can include any useful number of structures of formula (Ia). In some embodiments, the polymer includes m structures, where m is an integer of from about 1 to 1000 (e.g., from 1 to 500).

Figure 8:
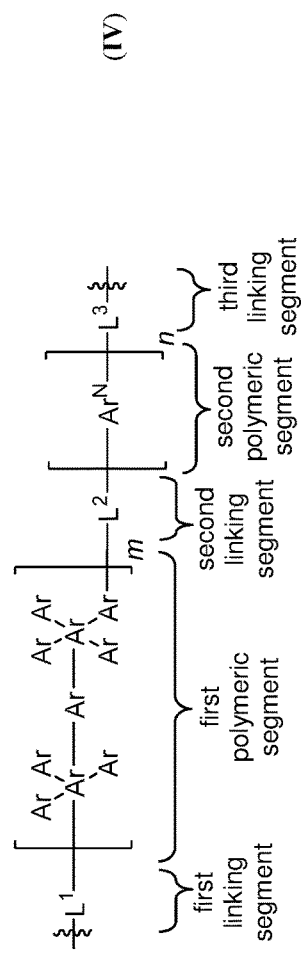
FIG. 8 shows an exemplary schematic of a copolymer structure as in formula (IV) including a first linking segment $L^1$, a first polymeric segment (e.g., including a plurality of arylene (Ar) groups), a second linking segment $L^2$, a second polymeric segment (e.g., including an $Ar^V$ segment, such as a hydrophobic segment), and a third linking segment $L^3$.

The present invention also includes copolymers. In one embodiment, the copolymer includes the structure of formula (IV), including salts thereof. As can be seen in FIG. 8, formula (IV) is a generic structure encompassing other structures (e.g., formula (IVa)). Similar to formula (Ia) described above, the copolymer structure of formula (IVa) includes $R^1$-substituted aryl groups, bridging group $Ar^L$, connecting group $Ar^M$, pendent substituents $R^3$, and m units. Thus, the description for these substituents provided for formula (Ia) applies equally to formula (IVa). In some embodiments, each of $Ar^L$ and $Ar^N$ is, independently, an optionally substituted phenylene. In other embodiments, each of $Ar^L$ and $Ar^N$ is, independently, an optionally substituted 1,4-phenylene.

Formula (IVa) includes various groups present in formula (Ia) or (II), including a first linking segment $L^1$, a second linking segment $L^2$, a first polymeric segment, and a subunit $Ar^P$. Formula (IVa) can include additional groups, such as a third linking segment $L^3$ and a second polymeric segment $Ar^N$ of n units. The linking segment $L^3$ can be any useful linkage to form a covalent bond between the two segments (e.g., any linking segment described herein). Exemplary linking segments $L^3$ include a covalent bond, an optionally substituted alkylene, an optionally substituted heteroalkylene, an optionally substituted alkyleneoxy, an optionally substituted heteroalkyleneoxy, an optionally substituted arylene, an optionally substituted aryleneoxy, an $Ar^N$ unit, or a structure of formula (Ia) or (II), or a portion thereof (e.g., the polymeric segment of formula (Ia) or (II)).

The copolymer can have any useful polymeric segment $Ar^N$. In some embodiments, $Ar^N$ includes a structure of formula (Ia) or a portion of the structure of formula (Ia), such as a polymeric segment of formula (Ia) (e.g., where each $R^3$ is H, optionally substituted alkyl, $R^S$, $R^P$, $R^C$, or $R^F$; or where the number of $R^S$ substituents in $Ar^N$ is less than the number of $R^S$ and/or $R^P$ substituents in the hydrophilic segment); a sulfone subunit (e.g., a subunit including an —$SO_2$— group); an arylene sulfone subunit (e.g.,—$(Ar)_a$—$SO_2$—$(Ar)_b$—, where Ar is an optionally substituted arylene group, as defined herein, and each a and b is an integer of about 0 to 10 and at least one of a or b is 1 or more); an ether sulfone subunit (e.g., —$(X^1)_a$—$SO_2$—$(X^2)_b$—O— or —$X^1$—O—$X^2$—$SO_2$—, where each $X^1$ and $X^2$ is, independently, any useful group, such as optionally substituted arylene or optionally substituted alkylene, and each a and b is an integer of about 0 to 10 and at least one of a or b is 1 or more); an arylene ether subunit (e.g., —$(Ar)_a$—O—$(Ar)_b$—, where Ar is an optionally substituted arylene group, as defined herein, and each a and b is an integer of about 0 to 10 and at least one of a or b is 1 or more); an arylene ketone subunit (e.g., —$(Ar)_a$—C(O)—$(Ar)_b$—, where Ar is an optionally substituted arylene group, as defined herein, and each a and b is an integer of about 0 to 10 and at least one of a or b is 1 or more); a perfluoroalkyl subunit (e.g., —$(CF_2)_{f1}$—, where f1 is an integer of 1 to about 16); or a perfluoroalkoxy subunit (e.g., —$O(CF_2)_{f1}$—, —$(CF_2)_{f1}O$—, —$O(CF_2)_{f1}CF(CF_2)_{f2}$—, or >$CFO(CF_2)_{f1}CF(CF_2)_{f2}$—, where each f1 and f2 is, independently, an integer of 1 to about 16).

Figure 9A:
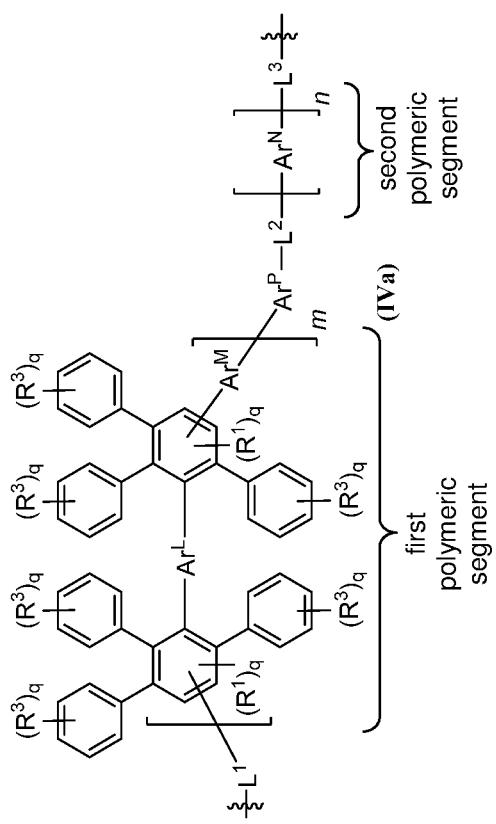
FIG. 9A-9H shows exemplary schematics of (A) a copolymer structure having a first polymeric segment including a plurality of arylene groups and a second polymeric segment $Ar^V$, as in formula (IVa); (B) a copolymer structure with a first polymeric segment and a second polymeric segments that both include a poly(phenylene) subunit, as in formula (IVb); (C) another copolymer structure with a first polymeric segment and a second polymeric segments that both include a poly(phenylene) subunit, as in formula (IVc); (D) a copolymer structure with a first polymeric segment that includes a poly(phenylene) subunit and a second polymeric segment that includes a plurality of arylene groups, as in formula (IVd); (E) another copolymer structure with a first polymeric segment that includes a poly(phenylene) subunit and a second polymeric segment that includes a plurality of arylene groups, as in formula (IVe); (F) yet another copolymer structure with a first polymeric segment that includes a poly(phenylene) subunit and a second polymeric segment that includes a plurality of arylene groups, as in formula (IVf); (G) non-limiting exemplary structures (IV-1) and (IV-2) having a poly(phenylene) segment and a poly(sulfone) segment; and (H) non-limiting exemplary structures (IV-3), (IV-4), and (IV-5) having a poly(phenylene) segment, a poly(phenylene) subunit, and a poly (sulfone) segment.
Figure 9B:
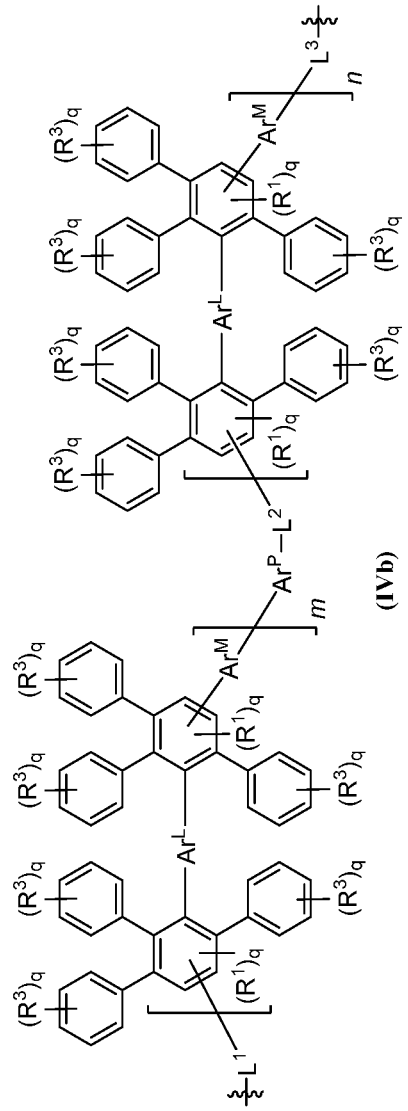
Figure 9C:
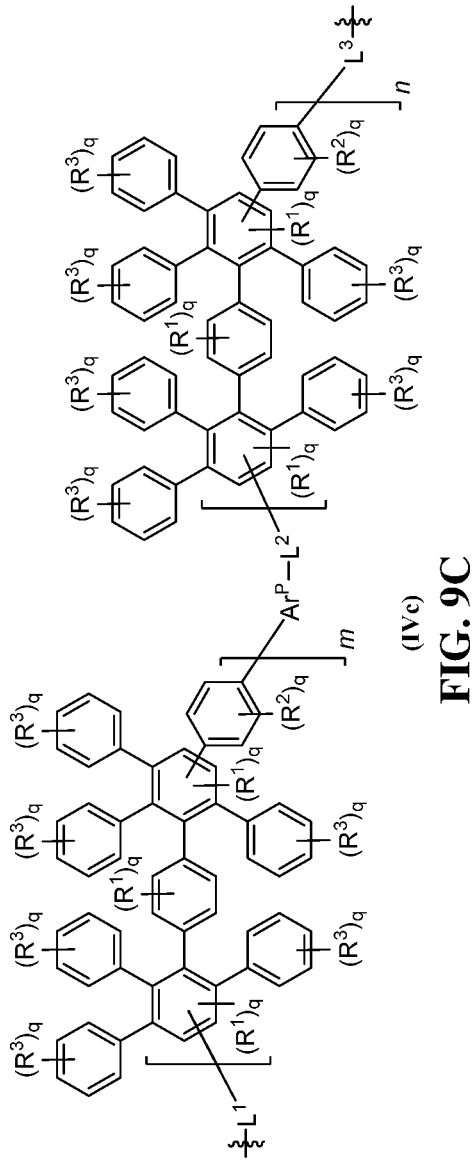
Figure 9D:
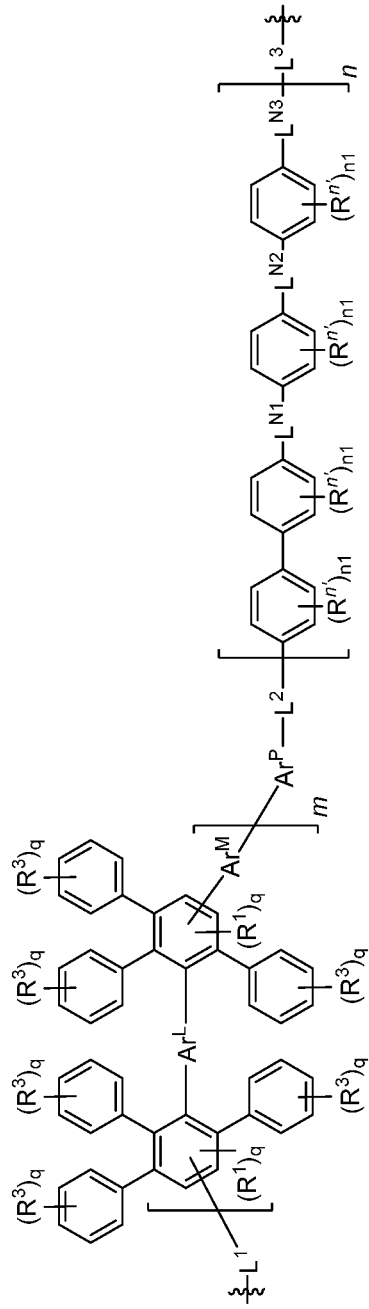
Figure 9E:
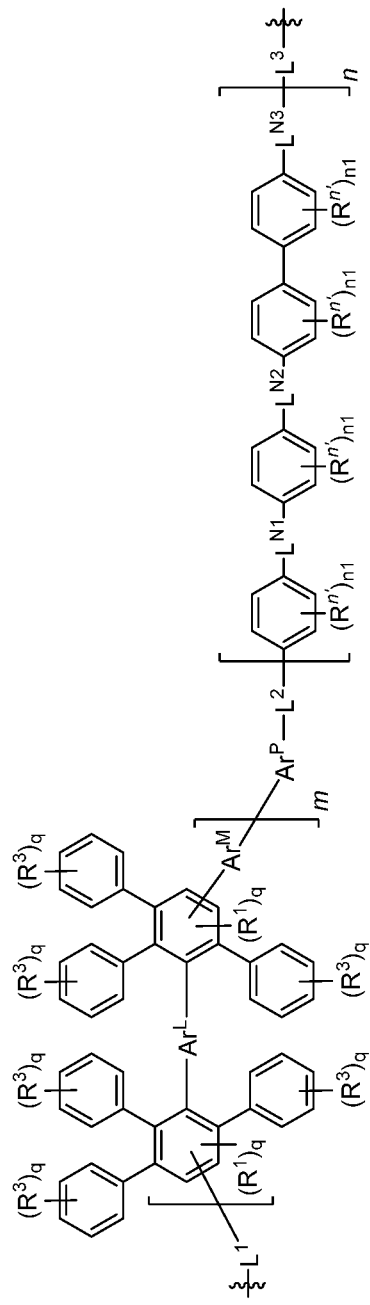
Figure 9F:
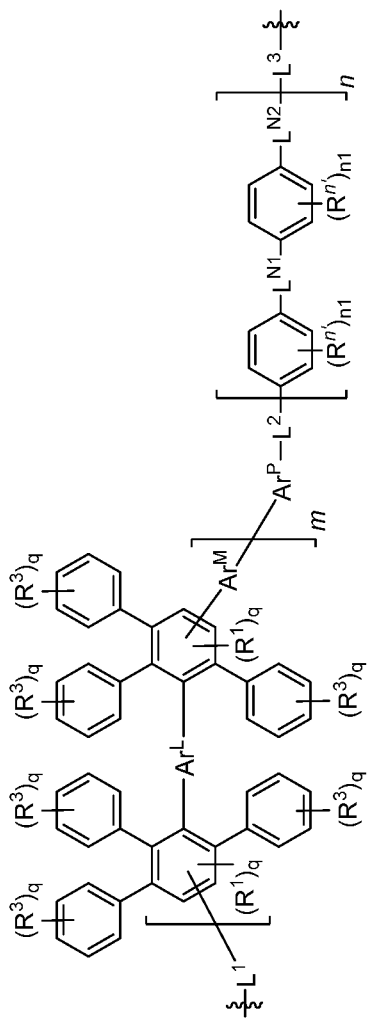
Figure 9G:
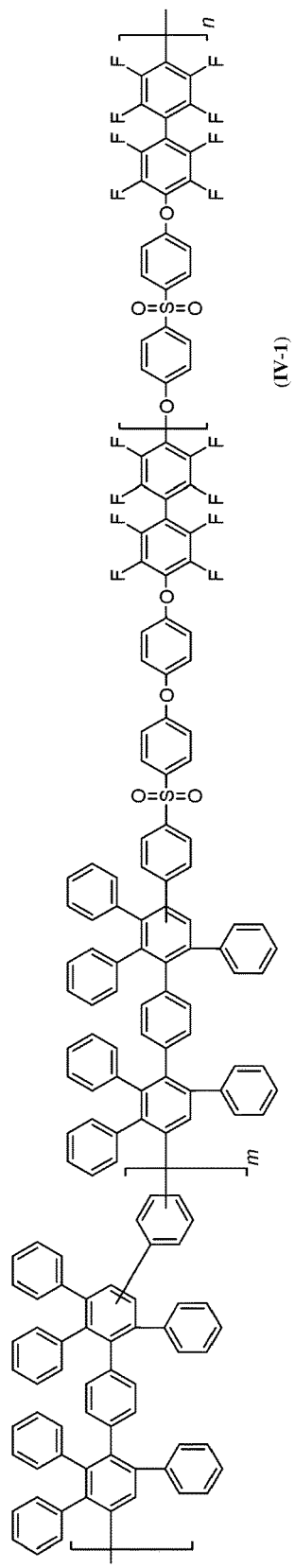
Figure 9G:
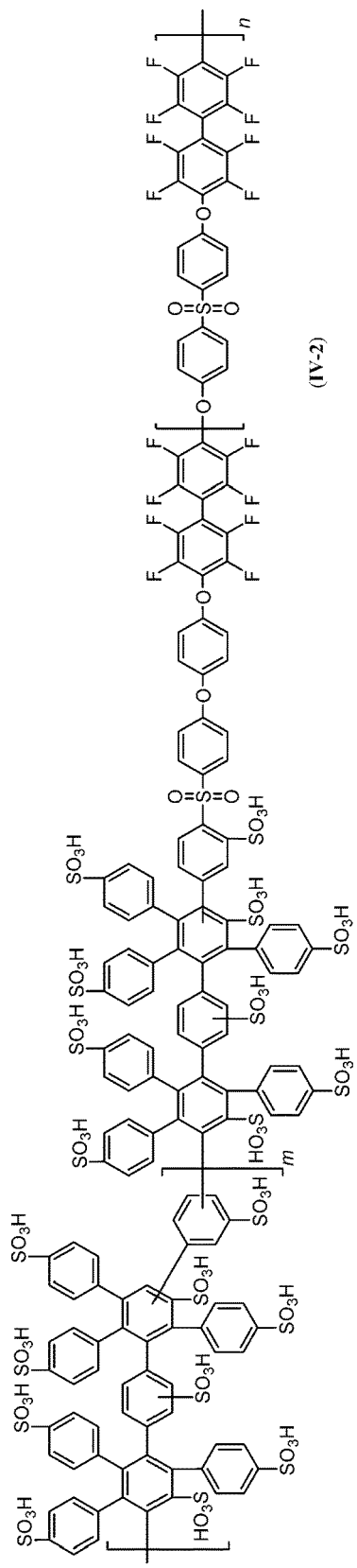
Figure 9H:
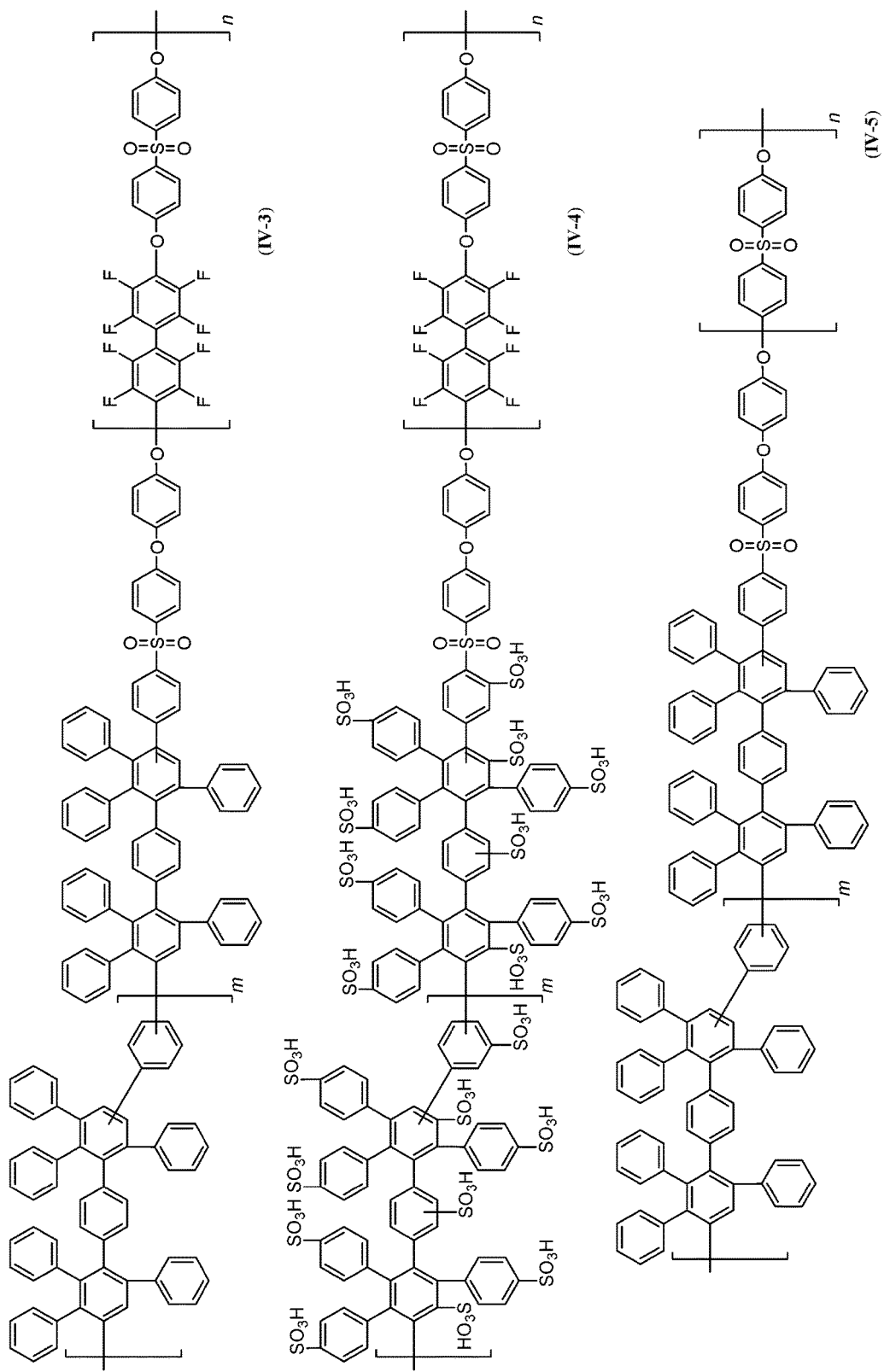

The copolymer can have any useful combination of first and second polymeric segments. The first polymeric segment can include a poly(phenylene) group (e.g., optionally substituted with one or more $R^S$, $R^P$, and/or $R^C$). The second polymeric segment can include a poly(phenylene) group (e.g., optionally substituted with one or more $R^F$) (e.g., as in formula (IVb) in FIG. 9B or in formula (IVc) in FIG. 9C). Alternatively, the second polymeric segment can include a poly(aryl) group (e.g., $R^n$-substituted arylene groups) having linkers $L^{N1}$, $L^{N2}$, or $L^{N3}$ (e.g., as in formula (IVd) to (IVf) in FIG. 9D-9F). In some embodiments, $R^n$ is H, halo, $C_{1-12}$ alkyl, or $R^F$.

In some embodiments, formula (IVa) includes a first polymeric segment that is hydrophilic and a second polymeric segment $Ar^N$ that is a hydrophobic segment. In other embodiments, the hydrophilic segment includes the two $R^1$-substituted aryl groups and a bridging group $Ar^L$. Thus, in some embodiments, at least one substituent in this hydrophilic segment (e.g., substituents $R^1$, $R^2$, or $R^3$) is a hydrophilic moiety (e.g., an acidic moiety, such as any $R^S$, $R^P$, and/or $R^C$ described herein or any moiety including a sulfonyl group or a phosphoryl group).

A copolymer can include any useful number or ratio of hydrophilic and hydrophobic segments. In some embodiments, formula (IVa) includes m number of hydrophilic segments and n number of hydrophobic segments, where each of m and n is, independently, an integer of from about 1 to 500. In other embodiments, the m (the number of hydrophilic segments) is minimized in order to minimize swelling of the copolymer. For example, in some instances, m<n. In other instance, n is at least about 5 times greater than m (e.g., n is about 10 times greater than m, or n is about 20 times greater than m). In yet other instances, m is of from about 1 to 100, and n is of from about 5 to 500 (e.g., m is of from about 1 to 50, and n is of from about 5 to 500; m is of from about 1 to 50, and n is of from about 10 to 100; m is of from about 1 to 10, and n is of from about 5 to 500; m is of from about 1 to 20, and n is of from about 20 to 400; and m is of from about 1 to 10, and n is of from about 100 to 200).

For any polymer herein, including any copolymer herein, each and every $R^1$ can be independently, $R^S$, $R^P$, $R^C$, and/or $R^F$. For instance, in some embodiments, each aryl group in the polymer or a segment thereof is substituted with an $R^S$, an $R^P$, and/or an $R^C$ substitution, where each substitution may be the same or different. In some embodiments, each aryl group in the first polymeric segment is substituted with an $R^S$ (e.g., an acidic moiety including a sulfonyl group). In other embodiments, the hydrophilic segment of the copolymer is composed of a structure in which each aryl group is substituted with an $R^S$, an $R^P$, and/or an $R^C$ substitution, where each substitution may be the same or different.

As can be seen, the copolymers include a linking segment $L^2$. The linking segment can be any useful linkage (e.g., any herein), including those composed of structures, or a portion of such structures, in the hydrophilic segment and/or the hydrophobic segment. In other embodiments, the linking segment $L^2$ is composed of three substructures: (i) a substituted polyphenylene structure of the hydrophilic segment; (ii) a reactive group, which includes an optionally substituted arylene ketone (i.e., -Ph—C(O)—Ph, in which Ph is an optionally substituted phenylene group) and (ii) an arylene sulfone structure of the hydrophobic segment.

In particular embodiments, the copolymer is composed of a hydrophilic segment (e.g., including one or more $R^S$ substitutions, where each $R^S$ can be the same or different) and a hydrophobic segment (e.g., including one or more $R^F$ substitutions, where each $R^F$ can be the same or different).

In some embodiments, the copolymer includes a hydrophilic first polymeric segment having acidic moieties (e.g., $R^S$, $R^P$, and/or $R^C$, as well as combinations thereof) on only the pendent aryl groups. Exemplary hydrophilic segments include those having $R^S$-substituted pendent aryl groups, $R^P$-substituted pendent aryl groups, and $R^1$-substituted backbone aryl groups.

Both acidic substitutions (e.g., $R^S$, $R^P$, and/or $R^C$, as well as combinations thereof) and $R^F$ substitutions can be present on the same polymer or on the same segment of the polymer. In particular, the use of acidic moieties and electron-withdrawing moieties could provide orthogonal chemistries to control and optimize performance (e.g., by employing acidic moieties to control ion conduction) and durability (e.g., by employing electron-withdrawing moieties to reduce oxidation). In some embodiments, each pendent aryl group is substituted with an $R^F$, an $R^S$, an $R^P$, and/or an $R^C$. Optionally, one or more backbone aryl groups can be further substituted with an $R^F$, an $R^S$, an $R^P$, and/or an $R^C$.

Polymer reagents

The present invention also includes reagents having any useful polymer segment (e.g., hydrophilic segment or hydrophobic segment) described herein. For instance, the reagent can include a polymer segment disposed between two reactive end groups, where each end group can be the same or different. Exemplary polymer reagents including those having a structure provided in formulas (III), (IIIa), (IIIb), (IIIc), (IIId), (IIIe), (IIIf), (IIIg), (IIIh), (IIIi), and (IIIj). In addition, the polymer segment can include a second polymeric segment (e.g., $Ar^N$), such as any described herein.

Optionally, a linking segment $L^2$ can be present between the polymer segment and a reactive end group. The linking segment $L^2$ can be composed of any useful linkage, such as any described herein (e.g., those described for linking segment $L^1$).

The reactive end group can be any useful group configured to react with a second reactive end group. In this way, ordered copolymer block structures can be synthesized by selectively placing reactive end groups on the ends of blocks or segments to form polymer reagents, and then reacting that polymer reagents to place the segments in an end-to-end fashion in the copolymer. A skilled artisan would understand how to place reactive end groups in a polymer reagent in order to form a copolymer with the desired configuration or order.

The reactive end group is usually placed on the ends of a first polymer reagent, as well as on the ends of the second polymer reagent. Then, a first reactive end group on the first polymer reagent reacts with the second reactive end group on the second polymer reagent. The first and second reactive end groups can be chosen from a pair of co-reactive groups. For example, such pairs of co-reactive groups include (i) a nucleophile for use with (ii) an electrophile; (i) an optionally substituted aryl group (e.g., having a —C(O)$R^I$ group, where $R^I$ is an aryl group having one or more halo) for use with (ii) an optionally substituted aryl group (e.g., having a —OR$^{Pr}$ group, where R$^{Pr}$ r is H or an O-protecting group that can be deprotected prior to conducting a reaction); (i) an optionally substituted aryl group (e.g., having a —C(O)$R^I$ group, where $R^I$ is an aryl group having one or more halo) for use with (ii) an optionally substituted alkoxy group (e.g., such as —OR$^{Pr}$, where R$^{Pr}$ is H or an O-protecting group that can be deprotected prior to conducting a reaction); (i) an optionally substituted aryl group for use with (ii) an optionally substituted alkoxy group (e.g., such as —OR$^{Pr}$, where R$^{Pr}$ is H or an O-protecting group that can be deprotected prior to conducting a reaction); (i) an optionally substituted alkynyl group for use with (ii) an optionally substituted azido group, which can participate in a Huisgen 1,3-dipolar cycloaddition reaction; as well as (i) an optionally substituted diene having a 4π electron system for use with (ii) an optionally substituted dienophile or an optionally substituted heterodienophile having a 2π electron system, which can participate in a Diels-Alder reaction. For the co-reactive groups above, reagent (i) reacts with reagent (ii) in each pair.

Exemplary polymer reagents are provided as structures (IIIa) and (IIIb) in FIG. 6. As can be seen, polymer reagent (IIIa) and (IIIb) includes a two reactive end groups $R^{H1}$ and $R^{H2}$ with a polymeric segment (in brackets) placed between the reactive end groups. For this exemplary reagent, the subunit Ar$^P$ and linking segments $L^1$ and $L^2$ are located between the polymer segmentic and one of the reactive end groups. For reagent (IIIa), the polymeric segment is similar to that of formula (Ia), but any formula or structure herein can be employed for this polymer segment.

Any useful linking segments can be employed. As seen in FIG. 7A-7H, any useful combination and configuration of linkers (e.g., $L^{1a}$, $L^{1b}$, $L^{1c}$, $L^{2a}$, $L^{2b}$, and $L^{2c}$) and $R^T$-substituted arylene groups.

Functional moieties

The present invention includes the use of functional moieties, such as acidic moieties and electron-withdrawing moieties. Exemplary acidic moieties (e.g., $R^S$) include any group having one or more sulfonyl groups, such as sulfo (e.g., —SO$_2$—OH), alkylsulfonyl (e.g., —SO$_2$—$R^{S1}$, where $R^{S1}$ is optionally substituted C$_{1-12}$ alkyl), alkylsulfonylalkyl (e.g., —R$^{SA}$—SO$_2$—$R^{S1}$, where each of $R^{SA}$ is optionally substituted C$_{1-12}$ alkylene or optionally substituted heteroalkylene and $R^{S1}$ is optionally substituted C$_{1-12}$ alkyl), arylsulfonyl (e.g., —SO$_2$—$R^{Ar}$, where $R^{Ar}$ r is optionally substituted C$_{4-18}$ aryl), arylsulfonylalkyl (e.g., —R$^{SA}$—SO$_2$—$R^{Ar}$, where $R^{SA}$ is independently, optionally substituted C$_{1-12}$ alkyl or alkylene and $R^{Ar}$ is optionally substituted C$_{4-18}$ aryl), sulfonamoyl (e.g., —SO$_2$NR$^{N1}$R$^{N2}$), sulfoamino (e.g., —N(R$^{N1}$)—SO$_2$—R$^{S3}$), aminosulfonyl (e.g., —SO$_2$—NR$^{N1}$—R$^{S2}$), or sulfonyl imide (e.g., —SO$_2$—NR$^{N1}$—SO$_2$—R$^{S3}$), where each of R$^{N1}$ and R$^{N2}$ is, independently, H, optionally substituted C$_{1-12}$ alkyl (e.g., haloalkyl, such as perfluoroalkyl), optionally substituted C$_{4-18}$ aryl, or optionally substituted C$_{1-12}$ alk-C$_{4-18}$ aryl; R$^{S2}$ is H, optionally substituted C$_{1-12}$ alkyl (e.g., haloalkyl, such as perfluoroalkyl), hydroxyl, optionally substituted C$_{1-12}$ alkylsulfonyl, optionally substituted C$_{4-18}$ aryl, or optionally substituted C$_{1-12}$ alk-C$_{4-18}$ aryl; and R$^{S3}$ is H, hydroxyl, optionally substituted C$_{1-12}$ alkyl (e.g., haloalkyl, such as perfluoroalkyl), optionally substituted C$_{4-18}$ aryl, or optionally substituted C$_{1-12}$ alk-C$_{4-18}$ aryl.

In any of these moieties, each R$^{S1}$ and R$^{S3}$ is, independently, optionally substituted C$_{1-12}$ alkyl (e.g., haloalkyl, such as C$_{1-12}$ perfluoroalkyl), optionally substituted C$_{1-12}$ alkoxy, optionally substituted C$_{4-18}$ aryl, optionally substituted C$_{1-12}$ alk-C$_{4-18}$ aryl optionally substituted C$_{4-18}$ aryloxy, hydroxyl, or H; each R$^{S2}$ is independently, optionally substituted C$_{1-12}$ alkyl (e.g., haloalkyl, such as perfluoroalkyl), optionally substituted C$_{1-12}$ alkylsulfonyl, optionally substituted C$_{1-12}$ alkoxy, optionally substituted C$_{4-18}$ aryl, optionally substituted C$_{1-12}$ alk-C$_{4-18}$ aryl optionally substituted C$_{4-18}$ aryloxy, hydroxyl, or H; each R$^{Ar}$ is, independently, optionally substituted C$_{4-18}$ aryl, optionally substituted C$_{1-12}$ alk-C$_{4-18}$ aryl, or optionally substituted C$_{4-18}$ aryloxy; each of R$^{SA}$ is, independently, oxy, optionally substituted C$_{1-12}$ alkylene, or optionally substituted heteroalkylene; and each of R$^{N1}$ and R$^{N2}$ is, independently, H, optionally substituted C$_{1-12}$ alkyl (e.g., haloalkyl, such as perfluoroalkyl), optionally substituted C$_{4-18}$ aryl, or optionally substituted C$_{1-12}$ alk-C$_{4-18}$ aryl.

Other exemplary acidic moieties (e.g., R$^P$) include any group having one or more phosphoryl groups, such as phosphono (e.g., —P(O)(OH)$_2$), phosphoric ester (e.g., —O—PO(OH)$_2$ or —O—P(O)<R$^{P1}$R$^{P2}$ or —O—P(O)<R$^{Ar}$R$^{P2}$ or —O—P(O)<R$^{Ar}$R$^{Ar}$, where each R$^{Ar}$ is the same or different), alkylphosphoryl (e.g., —P(O)<R$^{P1}$R$^{P2}$, where R$^{P1}$ is optionally substituted C$_{1-12}$ alkyl or optionally substituted C$_{1-12}$ alkoxy; and R$^{P2}$ is optionally substituted C$_{1-12}$ alkyl, optionally substituted C$_{1-12}$ alkoxy, optionally substituted C$_{4-18}$ aryl, optionally substituted C$_{1-12}$ alk-C$_{4-18}$ aryl, optionally substituted C$_{4-18}$ aryloxy, hydroxyl, or H), substituted phosphonoyl (e.g., —P(O)HR$^{P1}$, where R$^{P1}$ is optionally substituted C$_{1-12}$ alkyl, optionally substituted C$_{1-12}$ alkoxy, optionally substituted C$_{4-18}$ aryl, optionally substituted C$_{1-12}$ alk-C$_{4-18}$ aryl, optionally substituted C$_{4-18}$ aryloxy, hydroxyl, or H), alkylphosphorylalkyl (e.g., —R$^{PA}$—P(O)<R$^{P1}$R$^{P2}$, where R$^{PA}$ is optionally substituted C$_{1-12}$ alkylene or optionally substituted heteroalkylene; and each of R$^{P1}$ and R$^{P2}$ is, independently, optionally substituted C$_{1-12}$ alkyl, optionally substituted C$_{1-12}$ alkoxy, optionally substituted C$_{4-18}$ aryl, optionally substituted C$_{1-12}$ alk-C$_{4-18}$ aryl, optionally substituted C$_{4-18}$ aryloxy, hydroxyl, or H), arylphosphoryl (e.g., —P(O)<R$^{Ar}$R$^{P2}$ or —P(O)<R$^{Ar}$R$^{Ar}$, where each R$^{Ar}$ is, independently, optionally substituted C$_{4-18}$ aryl, optionally substituted C$_{1-12}$ alk-C$_{4-18}$ aryl, or optionally substituted C$_{4-18}$ aryloxy; and R$^{P2}$ is optionally substituted C$_{1-12}$ alkyl, optionally substituted C$_{1-12}$ alkoxy, optionally substituted C$_{4-18}$ aryl, optionally substituted C$_{1-12}$ alk-C$_{4-18}$ aryl, optionally substituted C$_{4-18}$ aryloxy, hydroxyl, or H), or arylphosphorylalkyl (e.g., —R$^{PA}$—P(O)<R$^{Ar}$R$^{P2}$ or —R$^{PA}$—P(O)<R$^{Ar}$R$^{Ar}$, where R$^{PA}$ is, independently, optionally substituted C$_{1-12}$ alkylene or optionally substituted heteroalkylene; each R$^{Ar}$ is, independently, optionally substituted C$_{4-18}$ aryl, optionally substituted C$_{1-12}$ alk-$C_{4-18}$ aryl, or optionally substituted $C_{4-18}$ aryloxy; and $R^{P2}$ is optionally substituted $C_{1-12}$ alkyl, optionally substituted $C_{1-12}$ alkoxy, optionally substituted $C_{4-18}$ aryl, optionally substituted $C_{1-12}$ alk-$C_{4-18}$ aryl, optionally substituted $C_{4-18}$ aryloxy, hydroxyl, or H), where each of these groups can be optionally substituted (e.g., with one or more substituents described for alkyl, as defined herein).

In any of these moieties, each of $R^{P1}$ and $R^{P2}$ is, independently, optionally substituted $C_{1-12}$ alkyl (e.g., haloalkyl, such as $C_{1-12}$ perfluoroalkyl), optionally substituted $C_{1-12}$ alkoxy, optionally substituted $C_{4-18}$ aryl, optionally substituted $C_{1-12}$ alk-$C_{4-18}$ aryl, optionally substituted $C_{4-18}$ aryloxy, hydroxyl, or H; each of $R^{Ar}r$ is, independently, optionally substituted $C_{4-18}$ aryl, optionally substituted $C_{1-12}$ alk-$C_{4-18}$ aryl, or optionally substituted $C_{4-18}$ aryloxy; and each $R^{PA}$ is, independently, oxy, optionally substituted $C_{1-12}$ alkylene, or optionally substituted heteroalkylene. Yet other exemplary acidic moieties (e.g., $R^C$) include any group having a carbonyl group, such as carboxyl (e.g., —$CO_2H$), —C(O)—$R^{C1}$, or —$R^{CA}$—C(O)—$R^{C1}$ (e.g., where each $R^{C1}$ is, independently, optionally substituted $C_{1-12}$ alkyl (e.g., haloalkyl, such as $C_{1-12}$ perfluoroalkyl), optionally substituted $C_{1-12}$ alkoxy, optionally substituted $C_{4-18}$ aryl, optionally substituted $C_{1-12}$ alk-$C_{4-18}$ aryl, optionally substituted $C_{4-18}$ aryloxy, hydroxyl, or H; and each $R^{CA}$ is, independently, oxy, optionally substituted $C_{1-12}$ alkylene, or optionally substituted heteroalkylene).

Exemplary electron-withdrawing moieties (e.g., $R^F$) include optionally substituted $C_{7-11}$ aryloyl, optionally substituted $C_{6-18}$ aryl, carboxyaldehyde, optionally substituted $C_{2-7}$ alkanoyl, optionally substituted $C_{1-12}$ alkyl, optionally substituted $C_{1-12}$ haloalkyl, optionally substituted $C_{2-7}$ alkoxycarbonyl, nitro, cyano, sulfo, carboxyl, and quaternary ammonium (e.g., —$N^+R^{N1}R^{N2}R^{N3}$, where each of $R^N$, $R^{N2}$, and $R^{N3}$ is, independently, optionally substituted alkyl, optionally substituted alkaryl, or optionally substituted aryl, or two of $R^{N1}$, $R^{N2}$, and $R^{N3}$, taken together with the nitrogen atom to which each are attached, form a heterocyclyl group, as defined herein). In another embodiment, $R^F$ includes or is substituted by a $C_{1-12}$ perfluoroalkyl group. In yet another embodiment, $R^F$ is a $C_{1-12}$ perfluoroalkyl group.

The acidic moieties and electron-withdrawing moieties can be substituted or unsubstituted. For example, these groups can be substituted with one or more substitution groups, as described herein for alkyl and/or aryl.

Aryl groups

The aryl groups herein can have any useful configuration, structure, and substitutions. Exemplary aryl groups (e.g., including arylene groups, such as for $Ar^L$, $Ar^M$, $Ar^P$, and $Ar^N$) include the following groups, which may be optionally substituted:

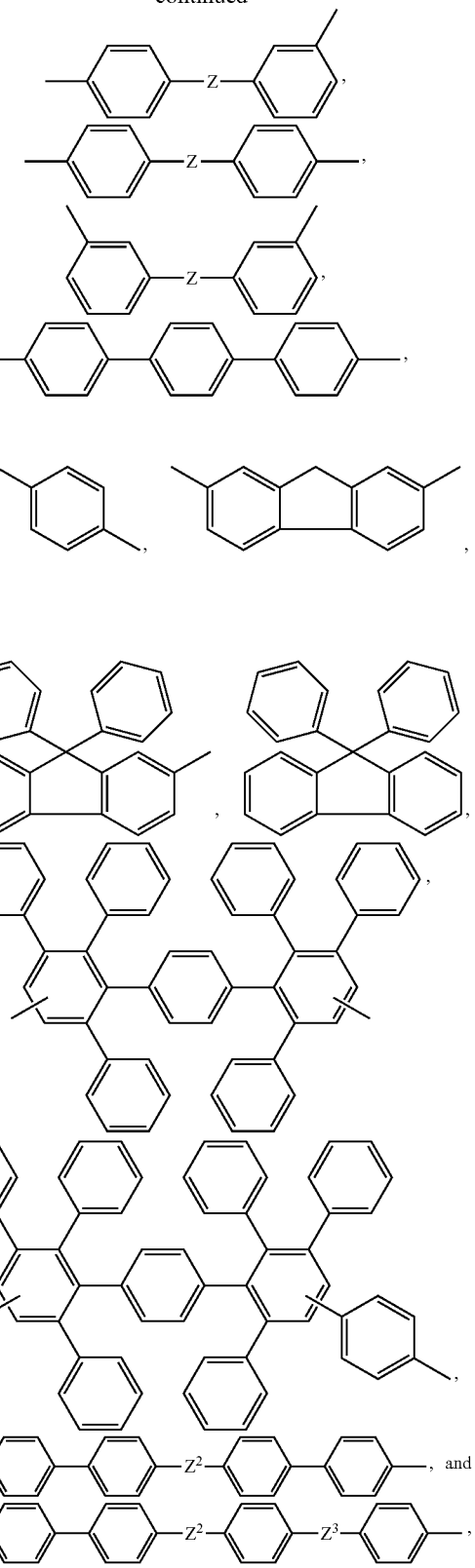

where each of Z, $Z^1$, $Z^2$, and $Z^3$ is, independently, —O—, —S—, —$SO_2$—, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, —$CF_2$—, —$CH_2$—, —$OCF_2$—, perfluoroalkylene, perfluoroalkyleneoxy, —$Si(R^i)_2$—, —$P(O)(R^i)$—, —$PR^i$—, —$C(O)$—, —$C(CF_3)_2$—, —$C(CH_3)_2$—, or —$CCF_3Ph$—, and where $R^i$ is H, optionally substituted alkyl, or optionally substituted aryl (e.g., methyl, ethyl, isopropyl, t-butyl, or phenyl).

Polymer salts

The present invention includes a salt of any polymer described herein, e.g., a salt of any one of formulas (I), (IA), (Ia), (Ib), (Ic), (Id), (Ie), (If), (Ig), (Ih), (II), (IIa), (III), (IIIa), (IIIb), (IIIc), (IIId), (IIIe), (IIIg), (IIIh), (IIIi), (IIIj), (IV), (IVa), (IVb), (IVc), (IVd), (IVe), and (IVf), as well as particular structures (I-1), (I-2), (I-3), (I-4), (I-5), (I-6), (III-1), (III-2), (IV-1), (IV-2), (IV-3), (IV-4), (IV-5), (IV-6), and (IV-7). In particular embodiments, the salt is a sodium salt. In other embodiments, the salt is a hydroxide salt.

Methods of making polymer structures

The polymers of the invention can be synthesized using any useful scheme. Polymers having poly(phenylene) structures can be formed by performing a Diels-Alder reaction to form the pendent and backbone aryl groups, and then performing one or more substitution reactions to introduce $R^3$ and/or $R^1$ to the parent structure.

Additional functional groups can be instilled in any useful manner. For instance, when $R^1$ or $R^3$ is —$SO_2$—$NR^{N1}$-$R^{S2}$, multiple steps may be required to first install the —$SO_2$— functional group on the parent molecule. Then, this functional group may be activated (e.g., by forming a sulfonyl halide, such as sulfonyl chloride) and reacted with an amine (e.g., $NHR^{N1}$—$R^{S2}$).

In another instance, an additional step may be required to install the —$R^{S2}$ functional group. For example, when $R^1$ or $R^3$ includes two sulfonyl groups, such as in —$SO_2$—$NR^{N1}$—$SO_2$—$R^{S2}$, then then sulfonyl groups can be attached sequentially. In one example, the method includes installing the first —$SO_2$— functional group on the parent molecule and then reacted with a primary amine, such as $NH_2R^{N1}$, thereby providing a parent molecule having a —$S)_2$—$NHR^{N1}$ sulfonamide group. This sulfonamide can then be reacted with an activated sulfonyl agent, e.g., a Cl—$SO_2$—$R^{S2}$ agent, where $R^{S2}$ is an optionally substituted $C_{1-12}$ alkyl, thereby providing an $R^S$ moiety of —$SO_2$—$NR^{N1}$—$SO_2$—$R^{S2}$ on the polymer.

In yet another instance, when $R^1$ or $R^3$ is —$R^{P4}$—$P(O)$<$R^{P1}R^{P2}$, multiple steps may be required to first install the $R^{P4}$ alkylene or heteroalkylene on the parent molecule, and then to later install the —$P(O)$<$R^{P1}R^{P2}$ group on the alkylene or heteroalkylene molecule. Furthermore, if $R^{P1}$ or $R^{P2}$ is an alkoxy or aryloxy group, then additional step may be required to modify a hydroxyl group attached to the phosphorous atom with an alkoxy or aryloxy group. A skilled artisan would understand that additional modifications or step can be employed to arrive at the desired structure.

Exemplary $R^1$—X and $R^3$—X reagents include $HSO_3Cl$, $H_2SO_4$, $PCl_3$, $POCl_3$, $H_3PO_4$, $SO_3$, fuming sulfuric acid, thionyl chloride, trimethylsilyl chlorosulfonate, dialkyl phosphites (e.g., diethyl phosphate with an optional catalyst, such as a Pd(0) catalyst), phosphines (e.g., tertiary phosphines), phosphoric acids (e.g., hypophosphorous acids, phosphonic acids, phosphinic acids, etc.), aryl halide (e.g., RX, where R is an optionally substituted aryl group, as defined herein, and X is halo), aryl halide (e.g., RX, where R is an optionally substituted aryloyl group, as defined herein, and X is halo, such as trifluorobenzoyl chloride), protein kinase (e.g., to install a phosphoryl group), phosphonoxyphenols, as well as mixtures thereof.

Any reactions herein can be conducted with any useful reagent, solvent, or conditions. Exemplary reagents include 1,4-bis-(2,4,5-triphenylcyclopentadienone)benzene and a diethynylbenzene reagent. Exemplary solvents useful for Diels-Alder and substitution reactions include an ether (e.g., diphenyl ether), methylene chloride, dichloroethane, etc. Salts of any polymers can be obtained by reacting any product with a suitable acid or base to obtain the desired acid or base addition salt. Furthermore, additional reaction steps can be conducted to further purify, test, or use any polymer herein.

Additional details on synthesis are described in Fujimoto CH et al., "Ionomeric poly(phenylene) prepared by Diels-Alder polymerization: Synthesis and physical properties of a novel polyelectrolyte," *Macromolecules* 2005;38:5010-6, Lim Y et al., "Synthesis and properties of sulfonated poly (phenylene sulfone)s without ether linkage by Diels-Alder reaction for PEMFC application," *Electrochim. Acta* 2014; 119:16-23, Hibbs MR et al., "Synthesis and characterization of poly(phenylene)-based anion exchange membranes for alkaline fuel cells," *Macromolecules* 2009;42:8316-21, Jakoby K et al., "Palladium-catalyzed phosphonation of polyphenylsulfone," *Macromol. Chem. Phys.* 2003;204:61-7, Parcero E et al., "Phosphonated and sulfonated polyphenylsulfone membranes for fuel cell application," *J. Membr. Sci.* 2006;285:206-13, Poppe D et al., "Carboxylated and sulfonated poly(arylene-co-arylene sulfone)s: thermostable polyelectrolytes for fuel cell applications," *Macromolecules* 2002;35:7936-41, and Akiko O et al., "Electrophilic aromatic aroylation with $CF_3$-bearing arenecarboxylic acid derivatives: Reaction behavior and acidic mediator dependence," *Synth. Commun.* 2007;37:2701-15, as well as U.S. Pat. Nos. 8,110,636 and 7,301,002, each of which is incorporated herein by reference in its entirety.

Uses

The polymers of the invention can be used in a variety of electrochemical applications. For instance, any polymer herein can be prepared as a membrane (e.g., by casting), and the membrane (e.g., a proton exchange membrane) can be incorporated into any device. Exemplary devices include fuel cells (e.g., automotive fuel cells, hydrogen fuel cells, or direct methanol fuel cells), flow batteries (e.g., redox flow batteries, such as vanadium redox flow batteries), electrolyzers, electrochemical hydrogen production devices, etc. The membranes can be used for any use, such as a proton exchange membrane, an ion exchange resin, a polymer separator, etc. In addition, the membranes can be in any useful form, such as a hydrogel. Membranes formed from the polymers herein can, in some instances, display enhanced properties, such as enhanced ion exchange capacity, decreased water uptake, and/or enhanced durability (e.g., as determined by stress-strain measurements). Methods of forming and testing membranes are described in Fujimoto CH et al., *Macromolecules* 2005;38:5010-6, Lim Y et al., *Electrochim. Acta* 2014;119:16-23, Sun C-N et al., "Evaluation of Diels-Alder poly(phenylene) anion exchange membranes in all-vanadium redox flow batteries," *Electrochem. Commun.* 2014;43:63-6, Merle G et al., "Anion exchange membranes for alkaline fuel cells: A review," *J. Membrane Sci.* 2011;377:1-35, Stanis RJ et al., "Evaluation of hydrogen and methanol fuel cell performance of sulfonated Diels Alder poly(phenylene) membranes," *J. Power Sci.* 2010; 195:104-10, and Fujimoto C et al., "Vanadium redox flow battery efficiency and durability studies of sulfonated Diels Alder poly(phenylene)s," *Electrochem. Commun.* 2012;20:

48-51, as well as U.S. Pat. Nos. 8,809,483, 8,110,636, and 7,888,397, each of which is incorporated herein by reference in its entirety.

EXAMPLE

Example 1: Block copolymer electrolyte membranes

Figure 10:
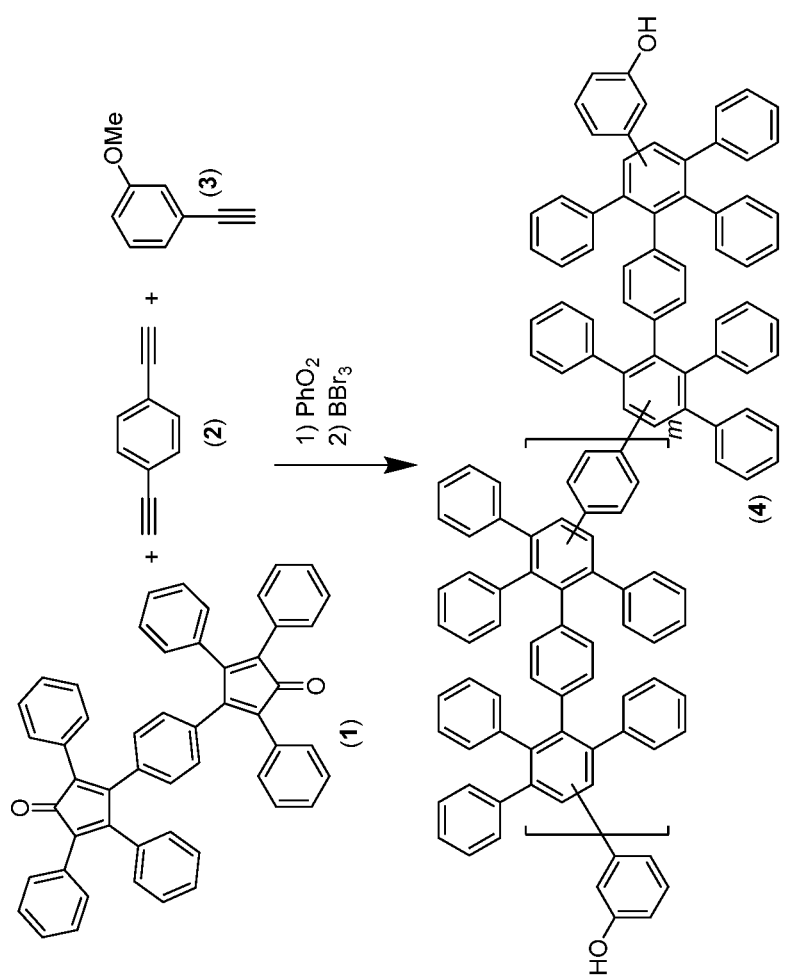
FIG. 10 shows an exemplary reaction for forming a non-limiting poly(phenylene) compound (4).

Described herein are design strategies to provide high performance, low cost, and durable membranes based on poly(phenylene) polymeric segments. An exemplary poly (phenylene) segment is provided in FIG. 10, in which the tetracyclone monomer (1) and di(ethynyl) benzene monomer (2) are added at a specific mole ratio. This mole ratio, in turn, determines the repeat unit length (m), and the 4-ethynyl anisole (3) is added as the end cap. The methoxy group is then removed via BBr3, to generate the active phenol polymer segment (4).

Figure 11:
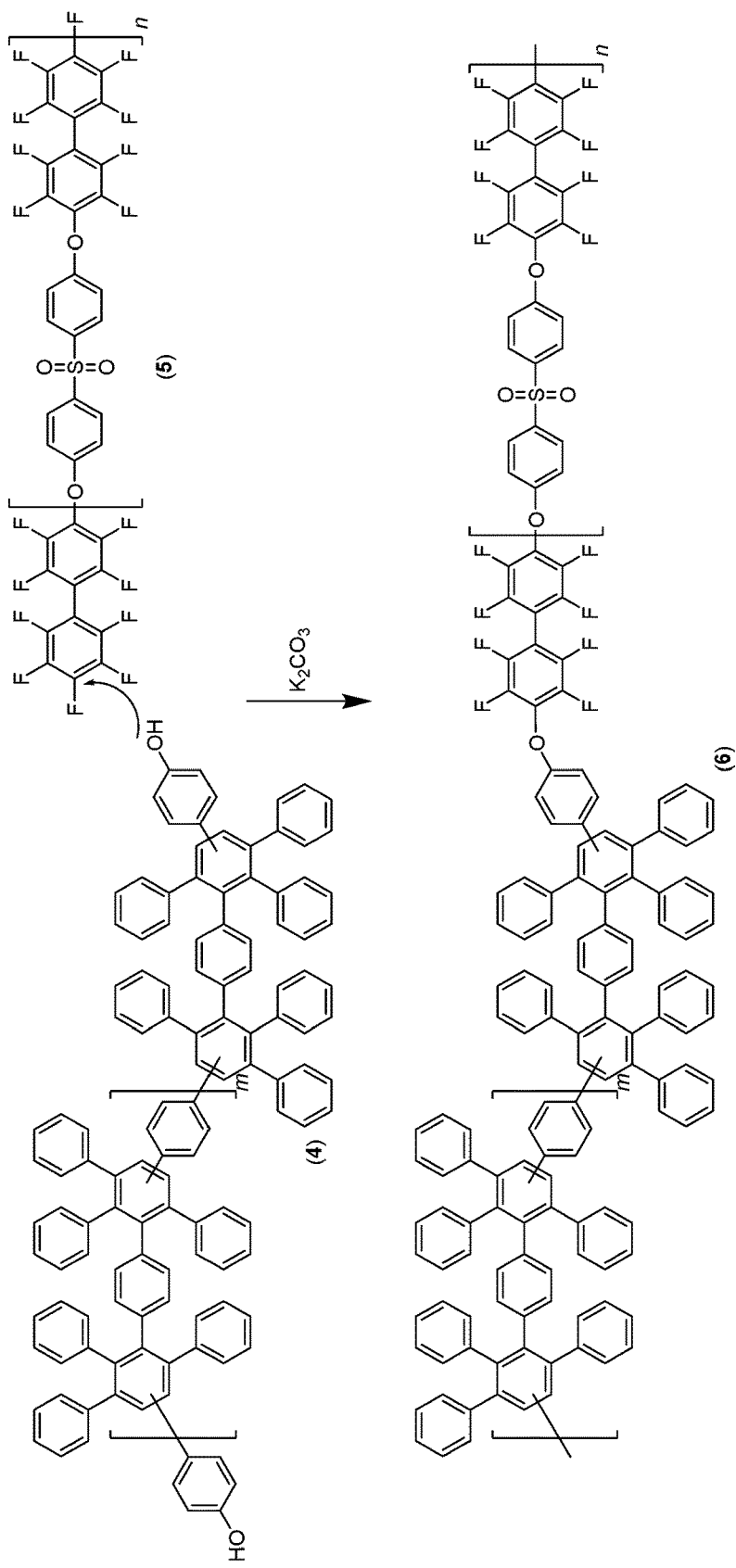
FIG. 11 shows an exemplary reaction for forming a non-limiting copolymer (6).

Activate polymer segments can then be reacted with a further polymeric subunit, thereby providing a copolymer. FIG. 11 shows an exemplary hydroxyl end-capped Diels Alder poly(phenylene) oligomer (4) that is then reacted with the para fluorine group of an end-capped decafluorobiphenyl poly(sulfone) oligomer (5). In this manner, the copolymer (6) includes a poly(phenylene) segment and a poly(sulfone) segment.

Coupling of the two polymeric segments can be sensitive to reaction temperature and to the rate of temperature increase. In one instance, the coupling reaction in FIG. 11 could result in an unprocessable solid if the reaction was heated too quickly to 65° C. Without wishing to be limited by mechanism, the hydroxyl end-capped poly(phenylene) oligomer (4) is sterically hindered (due to the nearby pendent phenyl groups), and use of high temperatures (e.g., at or above 65° C.) are required to promote polymerization but can result in undesired gelation. In part, at this elevated reaction temperature, activated para fluorine groups in decafluorobiphenyl oligomer facilitate copolymerization between the poly(phenylene) segment and the poly(sulfone) segment, but ortho fluorine groups in the decafluorobiphenyl oligomer can also undergo substitution reactions that can lead to cross-linked gels.

Figure 12A:
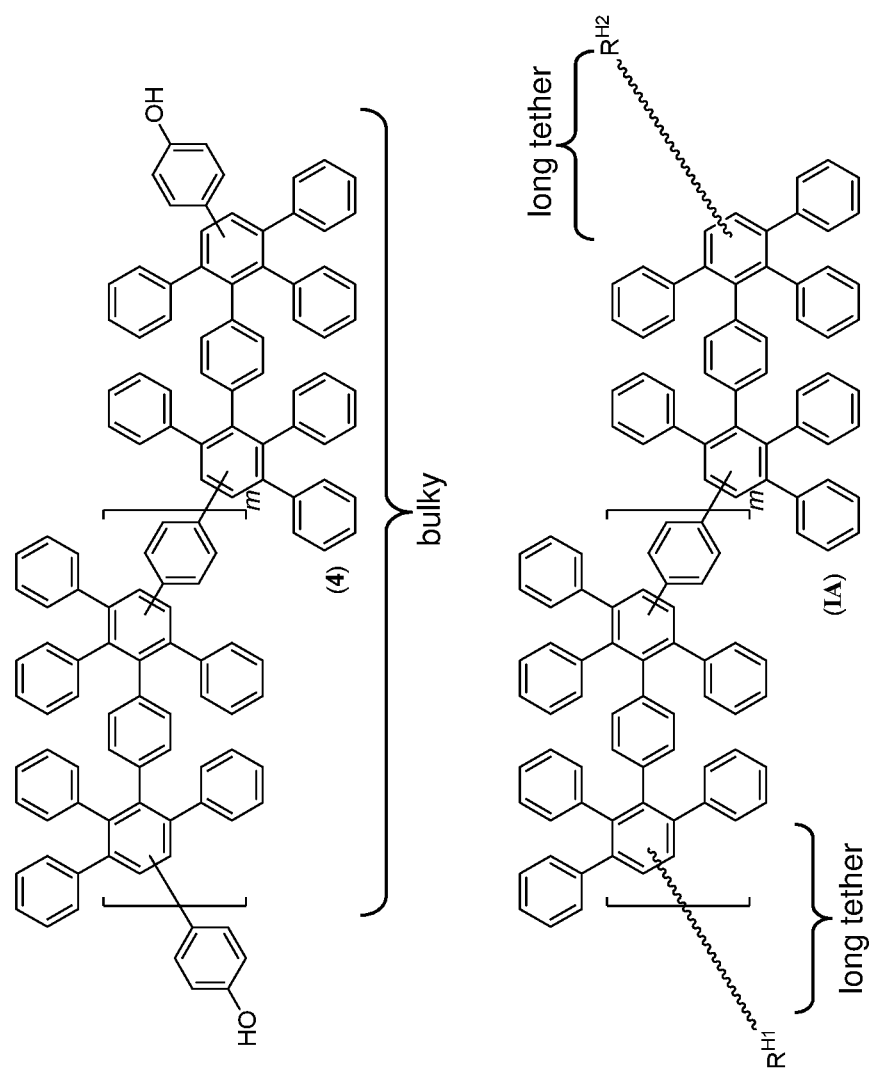
FIG. 12A-12B shows (A) an exemplary schematic for a compound including a long tether (IA) and (B) a non-limiting exemplary structure (III-1).
Figure 12B:
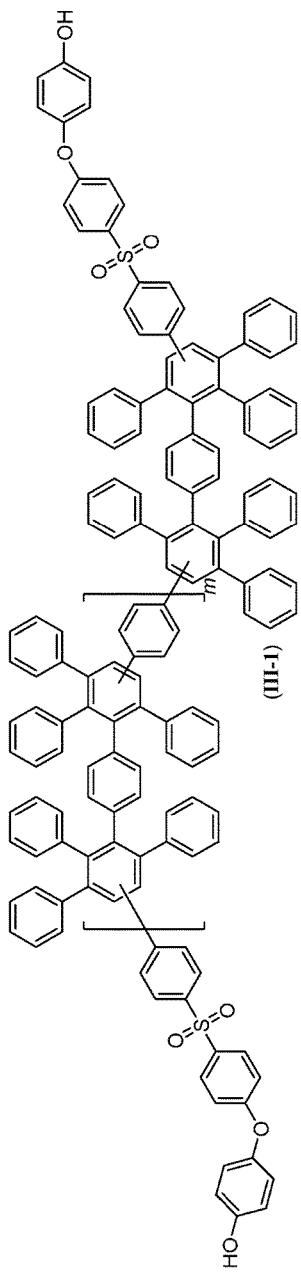

Thus, due to the close proximity of the nucleophilic hydroxyl group and the bulky poly(phenylene) repeat group (compound (4) in FIG. 12A), higher temperatures are generally required to couple with decafluorobiphenyl end-capped poly(sulfone), which can easily lead to gel formation. Herein, we describe the use of a long tether to lengthen the distance of the reactive handle $R^{H1}$ or $R^{H2}$ (e.g., a hydroxyl group) from the poly(phenylene) repeat unit (FIG. 12A). By employing this long tether, the compound (IA) should have an increased nucleophilic character, and reaction of this compound could allow for use of lower temperatures during polymer coupling. FIG. 12B shows an exemplary compound (III-1) including this long tether.

Figure 13A:
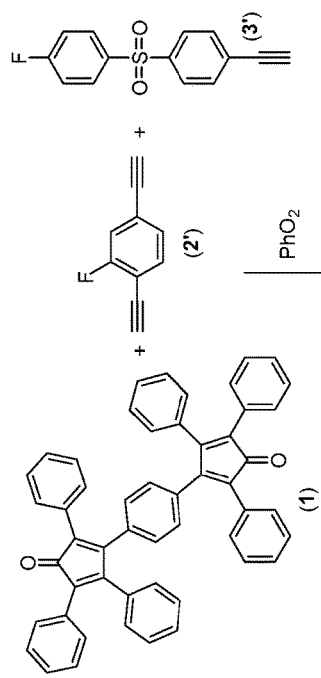
FIG. 13A-13C shows exemplary schematics for (A) a reaction to form an activated poly(phenylene) compound (V-1), (B) a further reaction to extend the linking segment for the compound (III-2), and (C) a polymerization reaction to form a copolymer (IV-6).
Figure 13A:
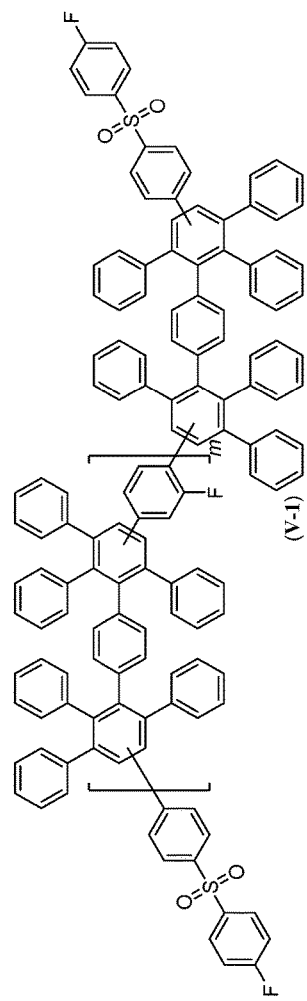
Figure 13B:
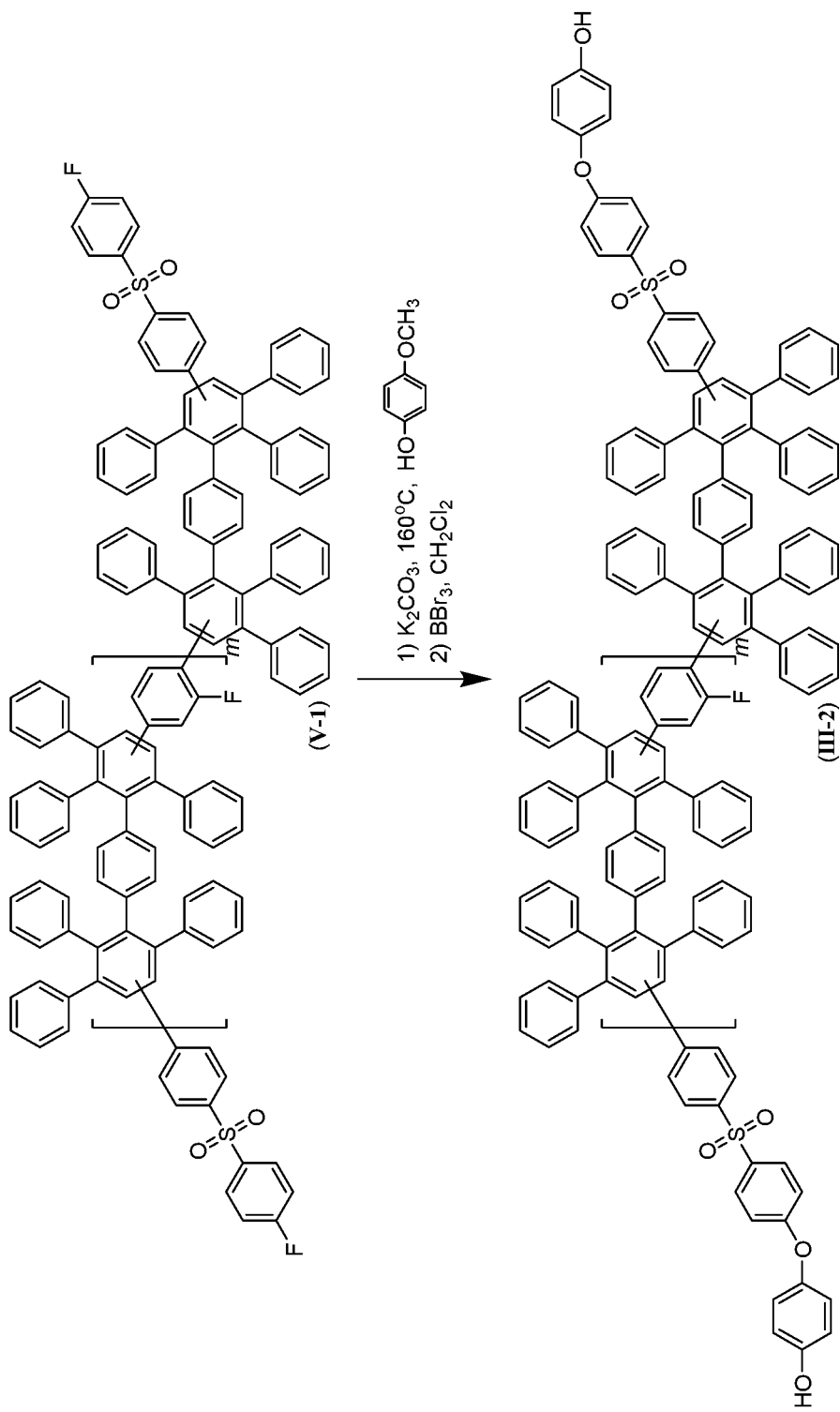

FIG. 13A-13B provides an exemplary synthetic route to provide a non-limiting, long tethered poly(phenylene) oligomer. As in the reaction including a methoxy-end capped poly(phenylene) oligomer in FIG. 10, the tetracyclone monomer (1) and 2-fluoro,1,4- bis(ethynyl) benzene monomer (2') are added at a specific mole ratio. The backbone fluorine is used as a reference so through $^{19}$F-NMR it is possible to determine the value of m, however it is not vital to incorporate the backbone fluorine. Instead of adding 4-methoxy anisole as an end cap, 4'-fluorophenyl,4"-ethynyl benzene sulfone (3') is employed as the end cap in FIG. 13A to provide compound (V-1).

FIG. 13B provides the next step to attach a further phenyl group, followed by generation of the reactive hydroxyl group through BBr3 to provide compound (III-2). As can be seen, compound (III-2) includes three phenyl groups in the linking segment, as well as a sulfone and an oxy between phenyl groups to provide a flexible linker.

Figure 13C:
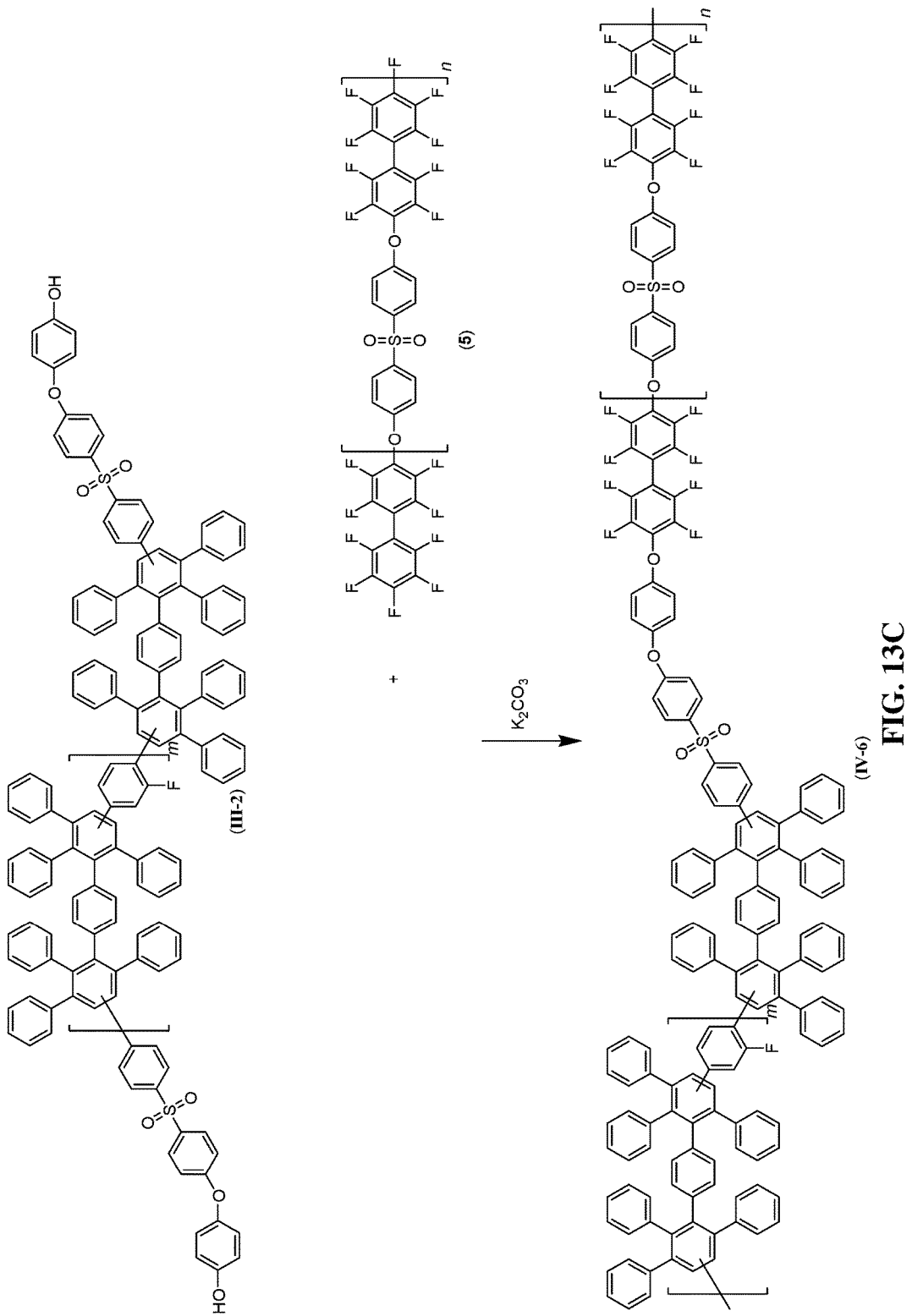

FIG. 13C provides a copolymer (IV-6) formed by reacting the long tethered oligomer. The long tethered poly(phenylene) oligomer (III-2) can be reacted with decafluorobiphenyl end-capped poly(sulfone) (5) at low temperatures between 40° C. to 50° C. Moreover, at these reaction temperatures, a gel or an insoluble solid was not observed.

Figure 14:
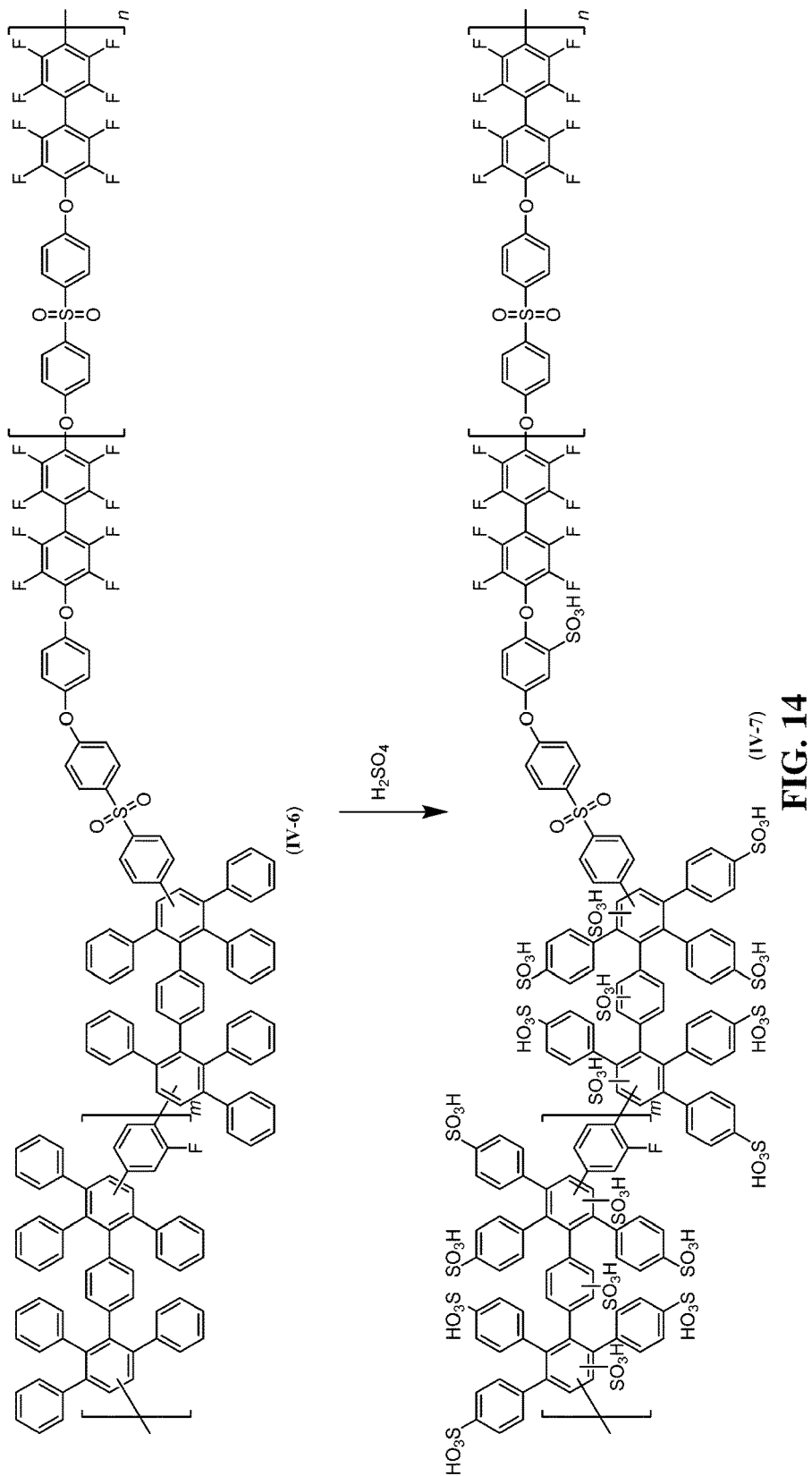
FIG. 14 shows an exemplary schematic for a reaction to functionalize a copolymer (IV-6) to form a functionalized copolymer including a plurality of acidic moieties (IV-7).

In non-limiting embodiments, the copolymer can be further reacted or functionalized. In one instance, the resultant block copolymers are further functionalized by sulfonating with sulfuric acid. The block copolymer (e.g., in powder form or film form) can be sulfonated in neat sulfuric acid. By sulfonating at temperatures near 50° C. for a few days (e.g., three to four days), the entire poly(phenylene) segment (pendent and/or backbone) (IV-6) can be sulfonated to provide high concentrations of acid moieties in the hydrophilic domain of the copolymer (IV-7) (FIG. 14). In one instance, if the poly(sulfone) segment is strongly electron-withdrawing, then this unit would have reduced reactivity towards sulfuric acid. These sulfonated block co-polymers have use in various electrochemical devices as separator membranes and is a strong candidate to replace Nafion.™

Other embodiments

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A composition comprising a structure having the formula (Ia):

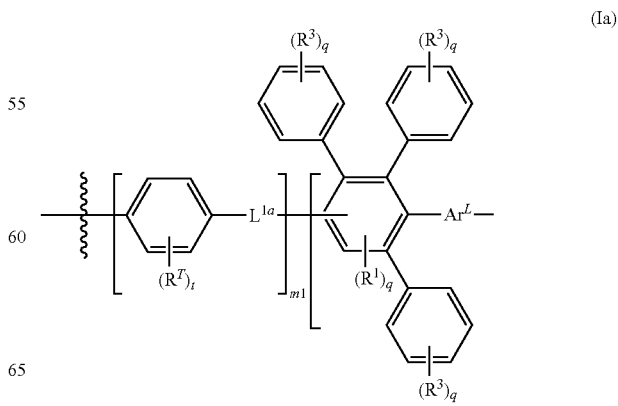

-continued

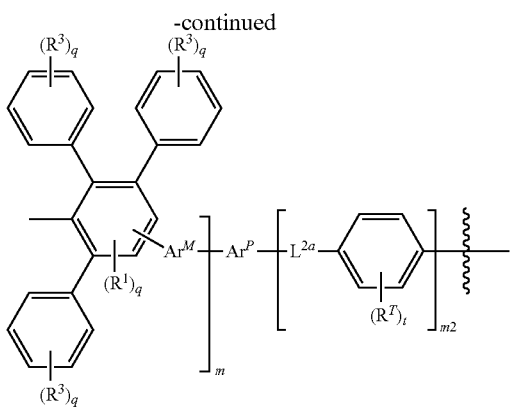

or a salt thereof, wherein:
each $R^1$ and $R^3$ is, independently, H, halo, optionally substituted $C_{1-12}$ alkyl, optionally substituted $C_{1-12}$ haloalkyl, optionally substituted $C_{1-12}$ perfluoroalkyl, optionally substituted $C_{1-12}$ heteroalkyl, $R^S$, $R^P$, $R^C$, or $R^F$, wherein $R^S$ is an acidic moiety comprising a sulfonyl group, $R^P$ is an acidic moiety comprising a phosphoryl group, $R^C$ is an acidic moiety comprising a carbonyl group, and $R^F$ is an electron-withdrawing moiety;
each $R^T$ is, independently, H, halo, optionally substituted $C_{1-12}$ alkyl, optionally substituted $C_{1-12}$ alkoxy, $R^S$, $R^P$, $R^C$, or $R^F$;
each $L^{1a}$ and $L^{2a}$ is, independently, a covalent bond, carbonyl, oxy, thio, azo, phosphonoyl, phosphoryl, sulfonyl, sulfinyl, sulfonamide, imino, imine, phosphine, nitrilo, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, or optionally substituted $C_{4-18}$ aryleneoxy;
each $Ar^L$ and $Ar^M$ is, independently, a bivalent linker comprising optionally substituted arylene;
each $Ar^P$ comprises an optionally substituted arylene or is a covalent bond;
each q is, independently, an integer of from 1 to 5;
each t is, independently, an integer of from 1 to 4;
each of m1 and m2 is, independently, an integer of from 3 to 10 from 1 to 10; and
m is an integer of from about 1 to 1000,
wherein at least one of $L^{1a}$ and/or $L^{2a}$ is not a covalent bond.

2. The composition of claim 1, wherein each $L^{1a}$ and $L^{2a}$ is, independently, carbonyl, oxy, thio, phosphonoyl, phosphoryl, sulfonyl, sulfinyl, sulfonamide, imino, imine, phosphine, nitrilo, optionally substituted $C_{1-12}$ alkylene, or optionally substituted $C_{1-12}$ heteroalkylene.

3. The composition of claim 1, wherein $Ar^P$ comprises a poly(phenylene).

4. The composition of claim 1, wherein the composition comprises a structure having any one of formulas (Ib) to (Id):

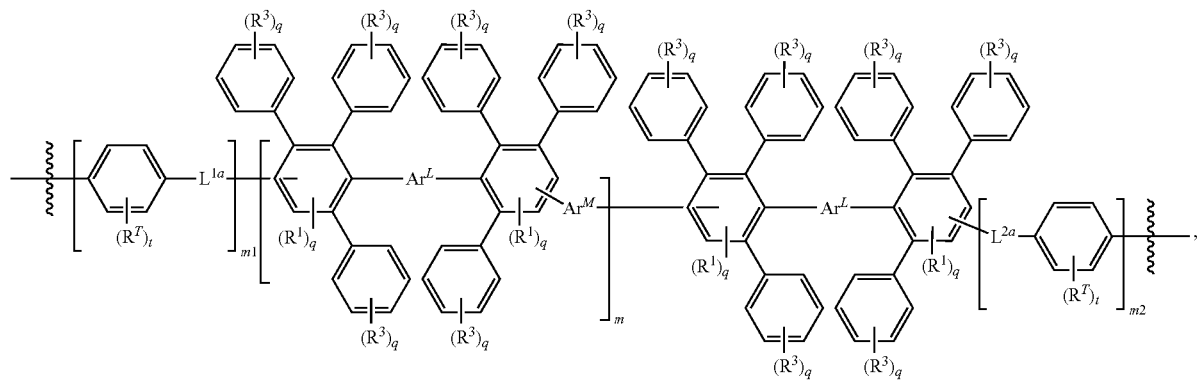

(Ib)

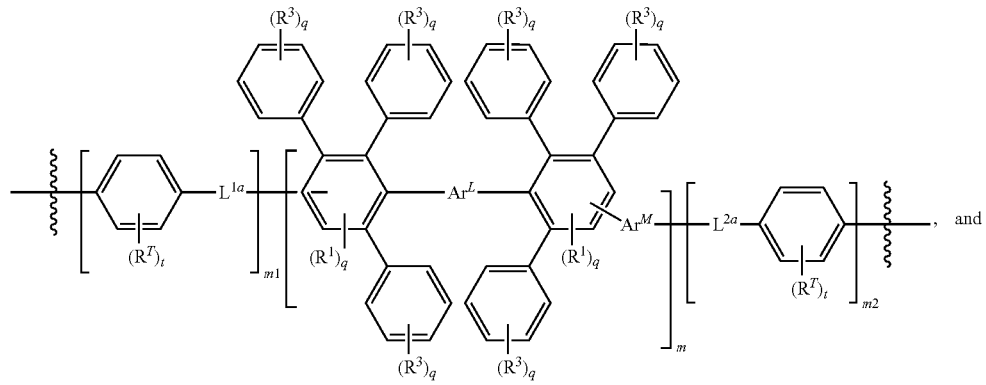

(Ic)

, and (Id)
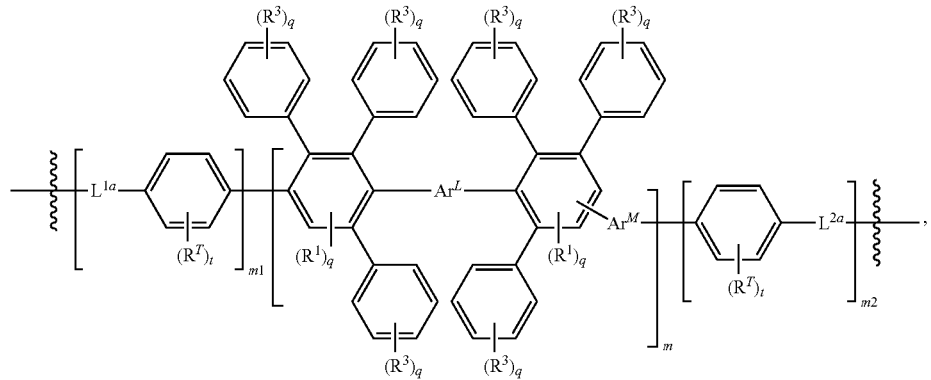
or a salt thereof.
5. The composition of claim 4, wherein the composition comprises a structure having any one of formulas (Ie) to (Ih), (I-2), and (I 6):
(Ie)
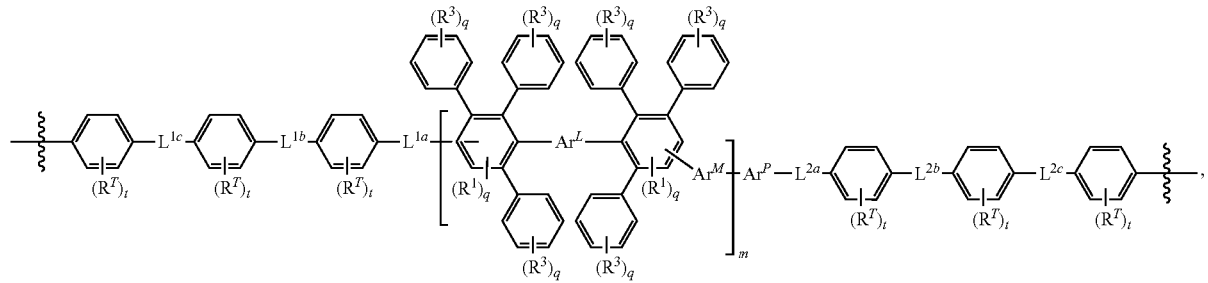
(If)
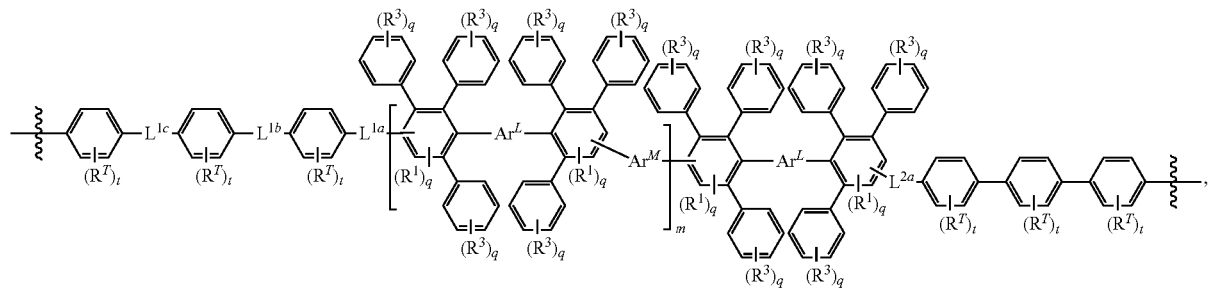
(Ig)
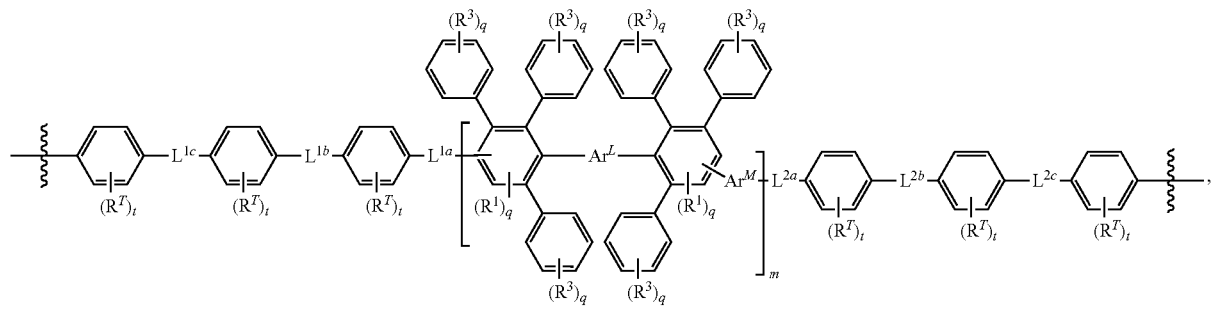

-continued

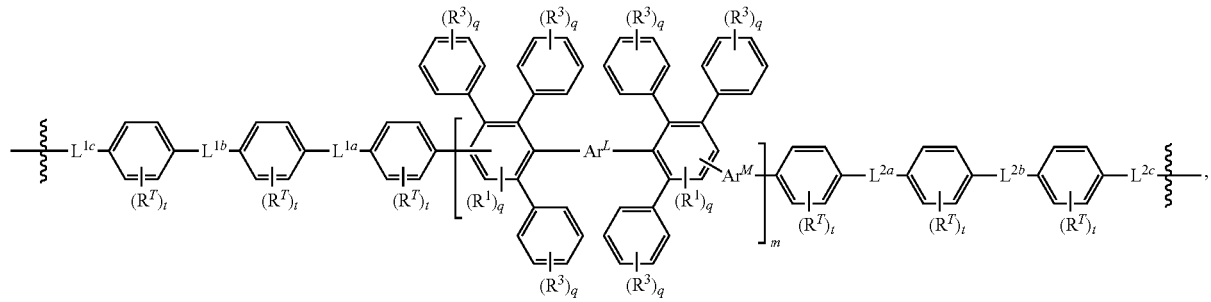

(Ih)

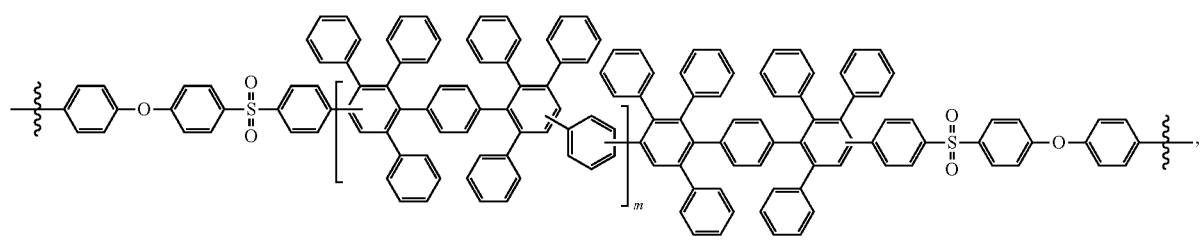

(I-2)

and

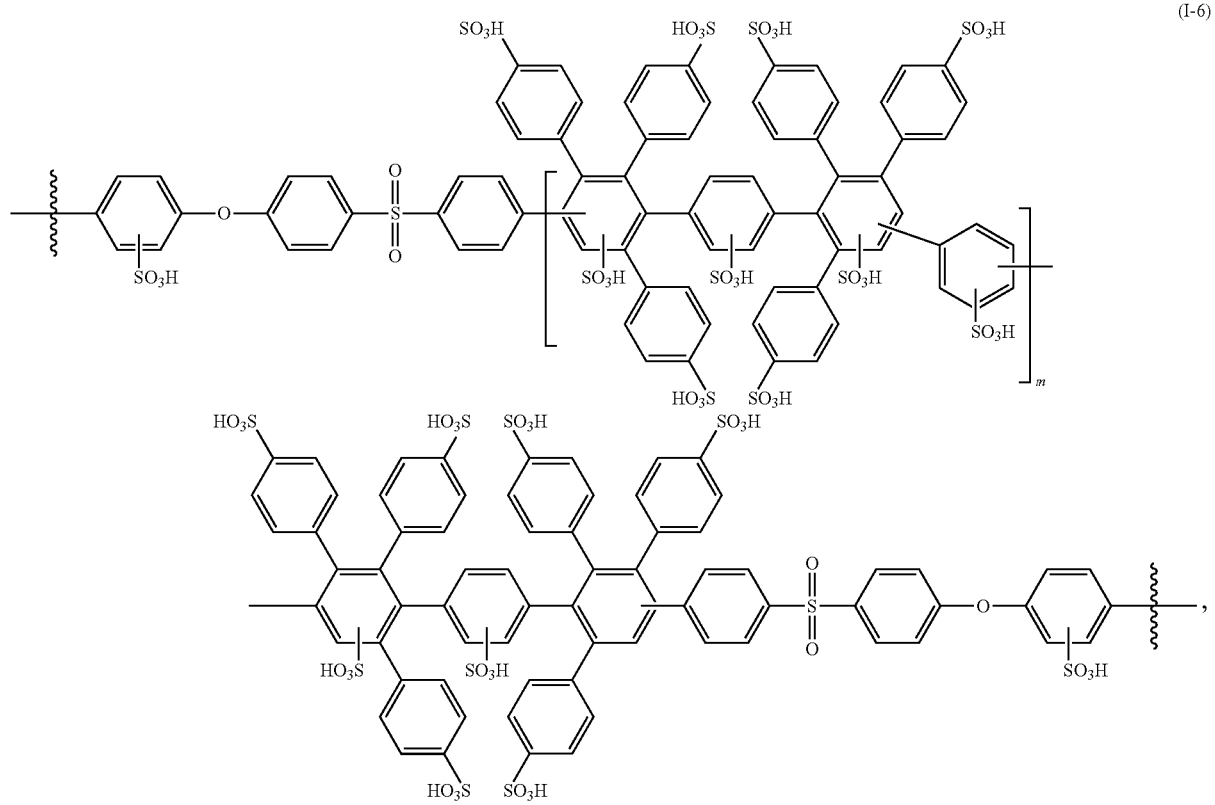

(I-6)

or a salt thereof; and wherein each $L^{1b}$, $L^{1c}$, $L^{2b}$, and $L^{2c}$ is, independently, a covalent bond, carbonyl, oxy, thio, azo, phosphonoyl, phosphoryl, sulfonyl, sulfinyl, sulfonamide, imino, imine, phosphine, nitrilo, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, or optionally substituted $C_{4-18}$ aryleneoxy.

6. The composition of claim 1, wherein:
$R^S$ is $-SO_2-R^{S1}$ or $-SO_2-NR^{N1}-R^{S2}$ or $-SO_2-NR^{N1}-SO_2-R^{S3}$, wherein each $R^{S1}$ is, independently, H, optionally substituted alkyl, optionally substituted haloalkyl, optionally substituted perfluoroalkyl, optionally substituted aryl, optionally substituted alkaryl, or hydroxyl; each $R^{N1}$ is, independently, H or optionally substituted $C_{1-12}$ alkyl, optionally substituted aryl, or optionally substituted alkaryl; each $R^{S2}$ is, independently, H, hydroxyl, optionally substituted alkyl, optionally substituted alkylsulfonyl, optionally substituted aryl, or optionally substituted alkaryl; and each $R^{S3}$ is, independently, H, hydroxyl, optionally substituted alkyl, optionally substituted $C_{1-12}$ haloalkyl, optionally substituted perfluoroalkyl, optionally substituted aryl, or optionally substituted alkaryl;

$R^P$ is —P(O)(OH)$_2$ or —O—PO(OH)$_2$ or —P(O)<$R^{P1}R^{P2}$ or —P(O)<$R^{Ar}R^{P2}$ or —P(O)<$R^{Ar}R^{Ar}$, and wherein each of $R^{P1}$ and $R^{P2}$ is, independently, optionally substituted alkyl, optionally substituted alkoxy, optionally substituted aryl, optionally substituted alkaryl, optionally substituted aryloxy, hydroxyl, or H; and each of $R^{Ar}$ is, independently, optionally substituted aryl, optionally substituted alkaryl, or optionally substituted aryloxy;

$R^C$ is —CO$_2$H, —C(O)—$R^{C1}$, or —$R^{CA}$—C(O)—$R^{C1}$, and wherein each $R^{C1}$ is, independently, optionally substituted alkyl, optionally substituted alkoxy, optionally substituted aryl, optionally substituted alkaryl, optionally substituted aryloxy, hydroxyl, or H; and each $R^{CA}$ is, independently, oxy, optionally substituted alkylene, or optionally substituted heteroalkylene; and $R^F$ is optionally substituted aryloyl, carboxyaldehyde, optionally substituted alkanoyl, or optionally substituted alkyl.

7. The composition of claim 1, wherein $Ar^L$ and/or $Ar^M$ is optionally substituted phenylene, optionally substituted naphthylene, or optionally substituted phenanthrylene.

8. The composition of claim 7, wherein the optional substitution for $Ar^L$ or $Ar^M$ is $R^S$, $R^P$, $R^C$, $R^F$, or a label.

9. A membrane comprising the composition of claim 1.

10. The copolymer of claim 1.

* * * * *